United States Patent
Sun et al.

(10) Patent No.: US 8,410,979 B2
(45) Date of Patent: Apr. 2, 2013

(54) DIGITAL FRONT END IN SYSTEM SIMULTANEOUSLY RECEIVING GPS AND GLONASS SIGNALS

(75) Inventors: Qinfang Sun, Cupertino, CA (US); Justin Huang, Hsinchu (TW); Wen-Chang Yeh, Hsinchu County (TW)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 12/754,543

(22) Filed: Apr. 5, 2010

(65) Prior Publication Data

US 2011/0181468 A1 Jul. 28, 2011

Related U.S. Application Data

(60) Provisional application No. 61/298,187, filed on Jan. 25, 2010.

(51) Int. Cl.
*G01S 19/33* (2010.01)
*G01S 19/36* (2010.01)

(52) U.S. Cl. .............................. 342/357.73; 342/357.76

(58) Field of Classification Search ............. 342/357.51, 342/357.72, 357.73, 357.76; 701/468, 483
See application file for complete search history.

(56) References Cited

U.S. PATENT DOCUMENTS

| | | | |
|---|---|---|---|
| 5,101,416 A | 3/1992 | Fenton et al. | |
| 5,923,287 A | 7/1999 | Lennen | |
| 5,949,372 A | 9/1999 | Lennen | |
| 6,081,691 A | 6/2000 | Renard et al. | |
| 6,163,685 A | 12/2000 | Dilling et al. | |
| 6,346,911 B1 | 2/2002 | King | |
| 6,816,539 B1 | 11/2004 | Rog | |
| 6,967,992 B1 | 11/2005 | Rabaeijs et al. | |
| 7,155,340 B2 | 12/2006 | Churan | |
| 7,358,896 B2 | 4/2008 | Gradincic et al. | |
| 7,551,127 B2 | 6/2009 | Dubash et al. | |
| 7,801,481 B2 | 9/2010 | Knight | |
| 8,018,379 B1 | 9/2011 | Sun et al. | |
| 8,134,502 B2 * | 3/2012 | Lennen .................... | 342/357.74 |
| 2005/0157826 A1 | 7/2005 | Vaananen | |
| 2005/0186925 A1 | 8/2005 | Rofougaran et al. | |
| 2006/0098721 A1 | 5/2006 | Rabaeijs et al. | |
| 2006/0281425 A1 | 12/2006 | Jungerman | |
| 2007/0285308 A1 | 12/2007 | Bauregger et al. | |
| 2008/0119157 A1 | 5/2008 | Watanabe | |
| 2008/0309550 A1 | 12/2008 | Sairo et al. | |
| 2009/0115659 A1 | 5/2009 | Watanabe et al. | |
| 2009/0167601 A1 | 7/2009 | Reis | |
| 2009/0219204 A1 | 9/2009 | Yoo et al. | |

(Continued)

FOREIGN PATENT DOCUMENTS

WO    2009036434 A2    3/2009

OTHER PUBLICATIONS

International Search Report—PCT/US2010/033634, International Searching Authority, ISA/US, Oct. 15, 2010.

(Continued)

*Primary Examiner* — Dao Phan
(74) *Attorney, Agent, or Firm* — Bever, Hoffman & Harms, LLP

(57) ABSTRACT

A receiver for receiving both GPS signals and GLONASS signals is provided. This receiver includes an analog front end (AFE), a GPS digital front end (DFE) and a GLONASS DFE for receiving an output of the AFE, and a dual mode interface (DMI) for receiving outputs of the GPS and GLONASS DFEs. Search engines are provided for receiving outputs of the DMI. Notably, certain front-end components of the AFE are configured to process both the GPS signals and the GLONASS signals.

35 Claims, 43 Drawing Sheets

U.S. PATENT DOCUMENTS

| | | |
|---|---|---|
| 2009/0289849 A1 | 11/2009 | Baddini Mantovani |
| 2010/0013706 A1 | 1/2010 | Sun |
| 2010/0048155 A1 | 2/2010 | Wang |
| 2010/0048157 A1 | 2/2010 | Carrera et al. |
| 2010/0127925 A1 | 5/2010 | Conroy et al. |
| 2010/0141519 A1 | 6/2010 | Rodal |
| 2010/0176991 A1 | 7/2010 | Webber et al. |
| 2011/0057837 A1 | 3/2011 | Lin |
| 2011/0181467 A1 | 7/2011 | Samavati et al. |

OTHER PUBLICATIONS

International Search Report—PCT/US2010/033638, International Searching Authority, ISA/US, Jun. 29, 2010.

* cited by examiner

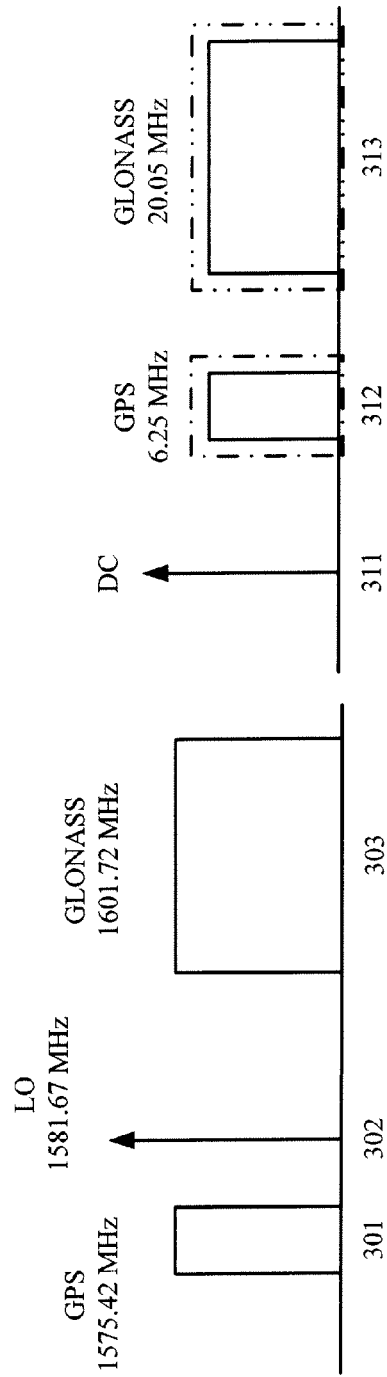
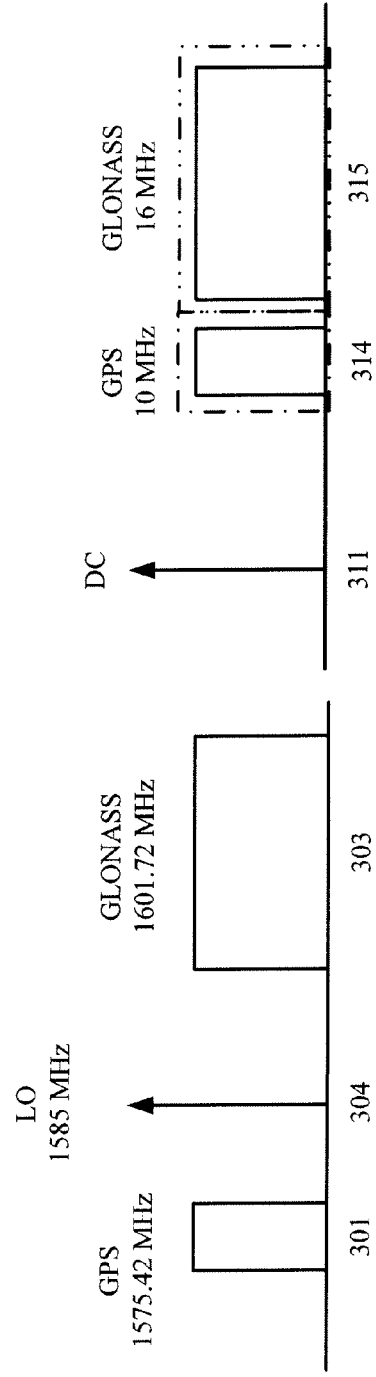
FIG. 3A
FIG. 3B
FIG. 3C
FIG. 3D

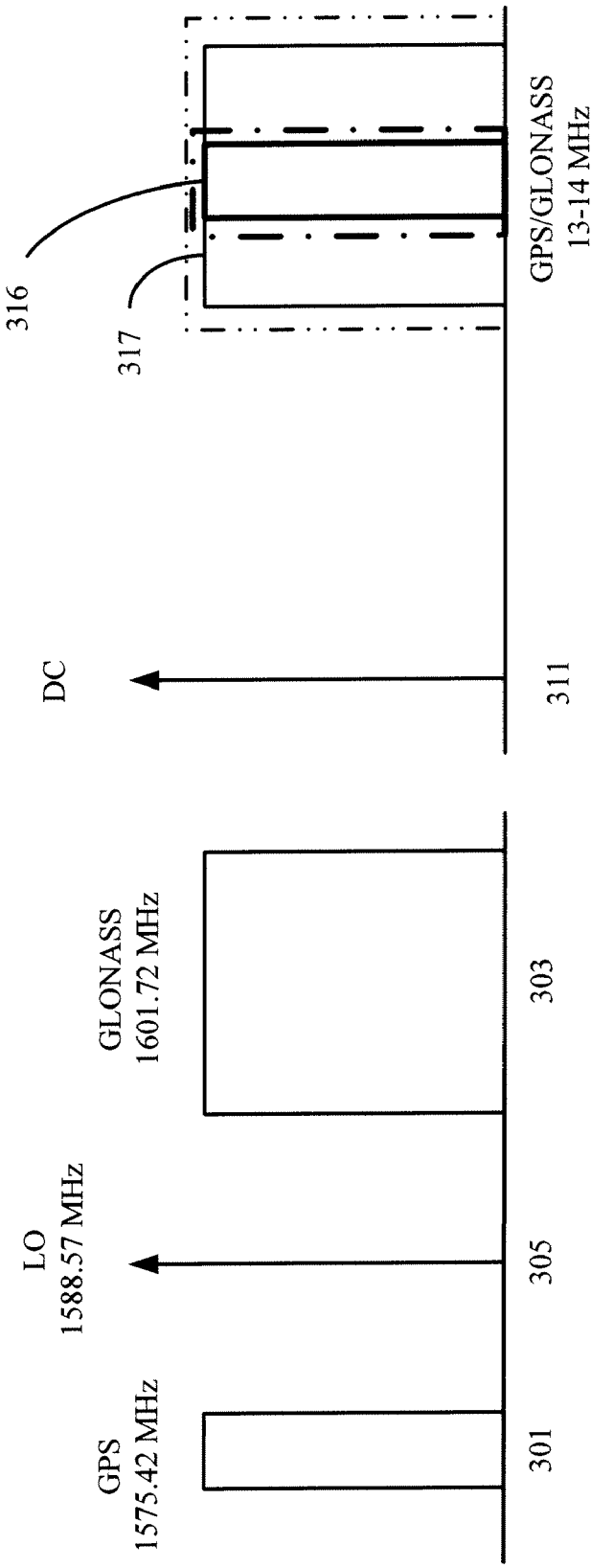

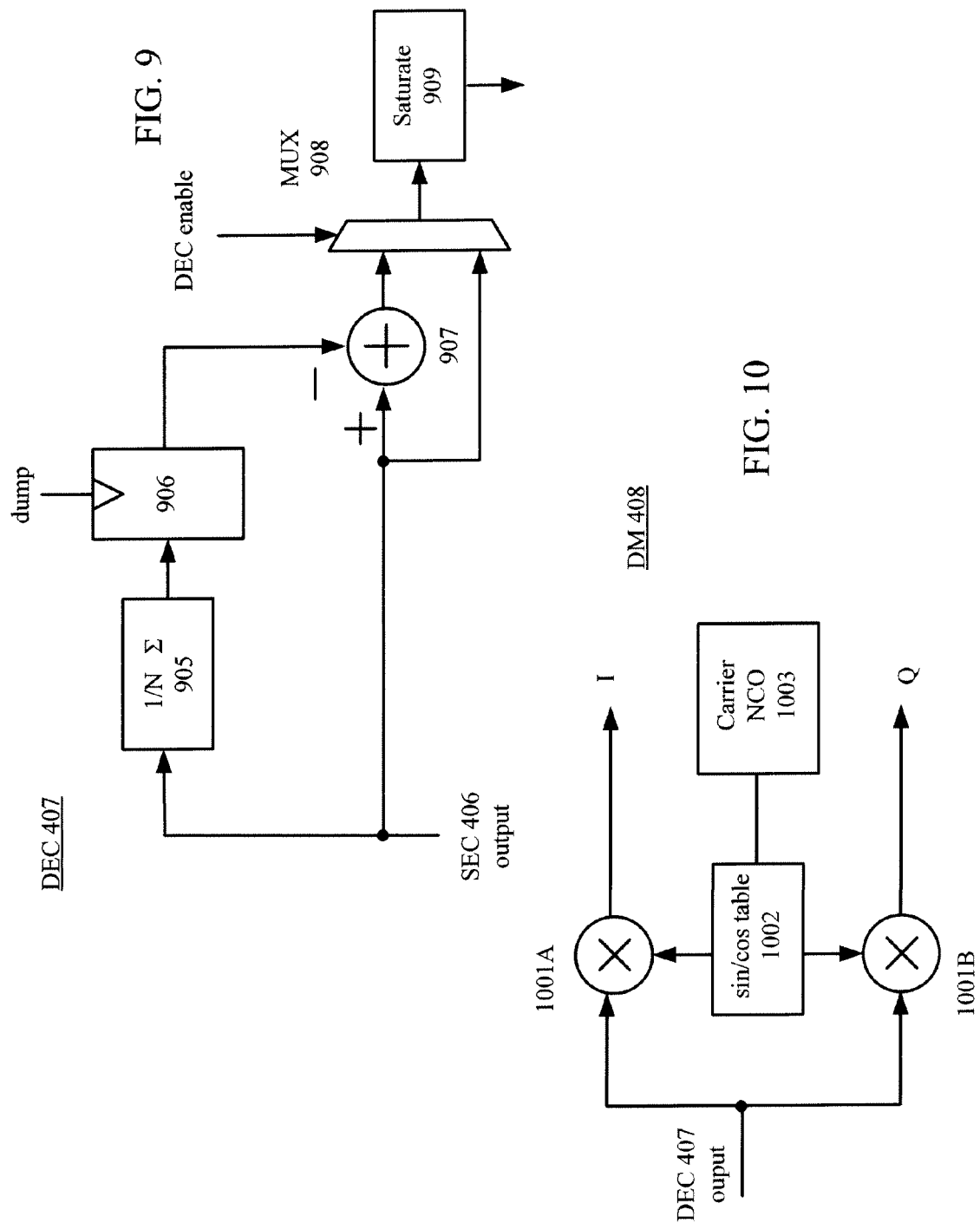

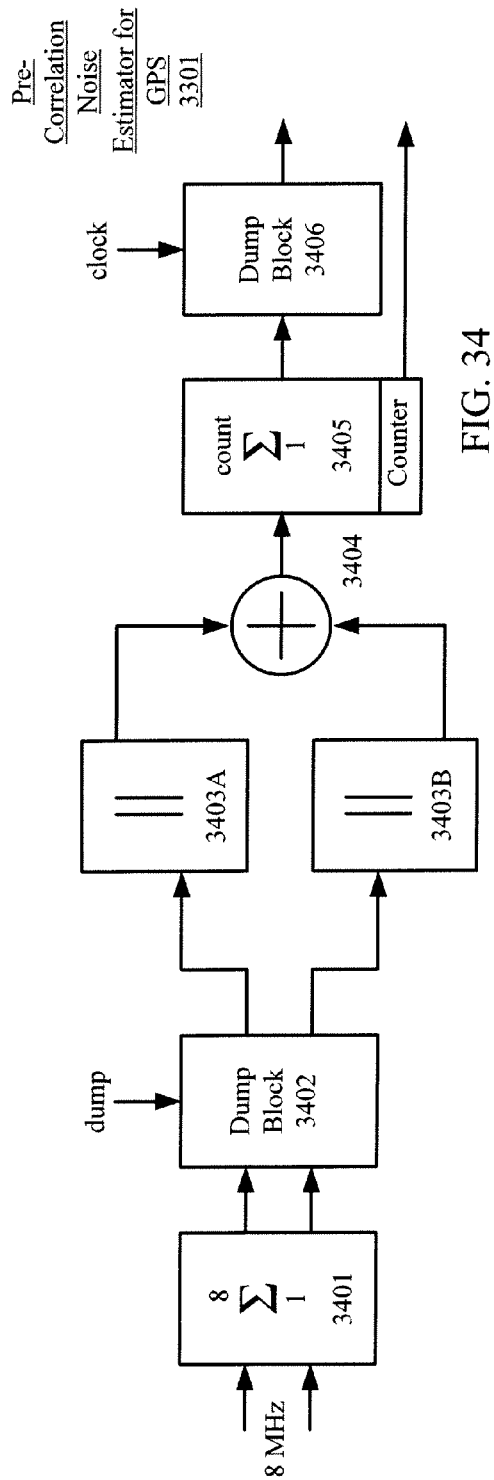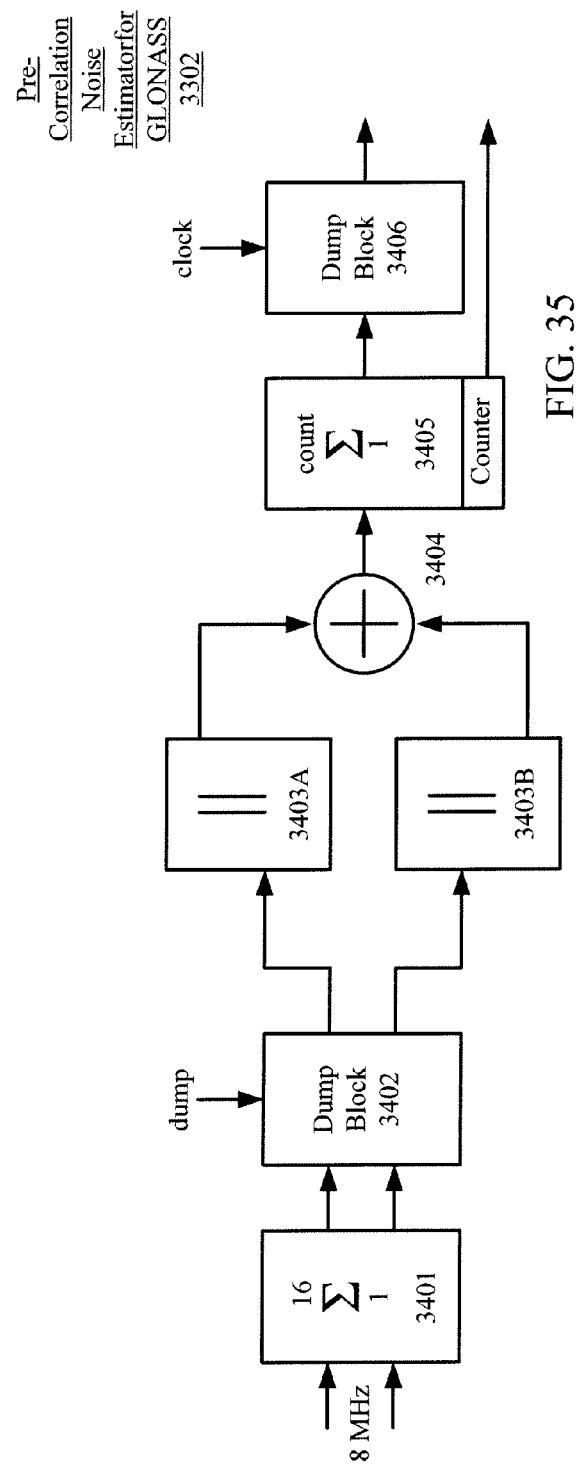

DIGITAL FRONT END IN SYSTEM SIMULTANEOUSLY RECEIVING GPS AND GLONASS SIGNALS

RELATED APPLICATIONS

This application claims priority of U.S. Provisional Patent Application 61/298,187, entitled "System And Method For Simultaneously Receiving GPS And GLONASS Signals" filed Jan. 25, 2010.

BACKGROUND OF THE INVENTION

1. Field of the Invention

The present invention relates to satellite systems that facilitate position determination, and in particular to a system and method that allows satellites from GPS and GLONASS satellite systems to simultaneously provide real-time position determination.

2. Related Art

GPS (global positioning system) is radio-based satellite system developed and operated by the United States. GPS became fully operational in 1995. To provide global coverage, GPS uses between 24-32 satellites. Assuming the minimum number of 24 satellites, 4 satellites are deployed in each of six orbits. The six orbital planes' ascending nodes are separated by 60 degrees. In this configuration, a minimum of six satellites should be in view from any given point at any time.

All GPS satellites transmit at 1575 MHz, wherein a receiver can distinguish signals from different satellites because each signal is encoded with a high-rate pseudo-random (PRN) sequence of 1023 "chips" that are unique for each satellite. These chips, also called a coarse acquisition (CA) code, are continuously repeated to allow the search engines of the receiver to identify the satellites available for position determination. For example, GPS has a chipping rate of 1023 chips/ms. A CA phase, which refers to the position within the repeating CA code, can also be used to determine the satellites in view. Depending on the error correction in the receiver, GPS can provide a positioning accuracy between 1 cm and 15 meters.

GLONASS (global navigation satellite system) is a radio-based satellite system developed by the former Soviet Union and now operated by Russia. As of 2009, GLONASS has global coverage. To provide this global coverage, GLONASS includes 24 satellites, wherein 21 satellites can be used for transmitting signals and 3 satellites can be used as spares. The 24 satellites are deployed in three orbits, each orbit having 8 satellites. The three orbital planes' ascending nodes are separated by 120 degrees. In this configuration, a minimum of five satellites should be in view from any given point at any time.

All GLONASS satellites transmit the same standard precision (SP) signal, but with each satellite transmitting on a different frequency. Specifically, GLONASS uses a 15 channel FDMA (frequency division multiple access) centered on 1602.0 MHz. Therefore, each satellite transmits at 1602 MHz+(N×0.5625 MHz), wherein N is a frequency channel number (N=−7, −6, −5, . . . 5, 6). GLONASS has a chipping rate of 511 chips/ms. GLONASS can provide a horizontal positioning accuracy within 5-10 meters, and a vertical positioning accuracy within 15 meters.

With the advent of GLONASS satellites now being available to provide position information, it is desirable to have a system that includes the capability of using both GPS and GLONASS signals for position determination. Current systems include separate receive paths for each type of signal. For example, U.S. Publication 2007/0096980, filed by Gradincic et al. on Oct. 30, 2006 (and published on May 3, 2007), describes an RF receiver including a plurality of independent signal paths, each signal path including a separate IF and baseband down-converter. Each signal path is tuned to a specific IF band by selection of external IF filters.

Therefore, a need arises for a system and method for receiving both GPS and GLONASS signals that minimizes components while allowing both sets of signals to be used in the position determination, thereby improving position accuracy.

SUMMARY OF THE INVENTION

A receiver for receiving both GPS signals and GLONASS signals is provided. This receiver includes an analog front end (AFE), a GPS digital front end (DFE) and a GLONASS DFE for receiving an output of the AFE, and a dual mode interface (DMI) for receiving outputs of the GPS and GLONASS DFEs. Search engines and tracking engines are provided, each receiving outputs of the DMI. Notably, certain front-end components of the AFE are configured to process both the GPS signals and the GLONASS signals.

Exemplary front-end components configured to process both GPS and GLONASS signals can include a low noise amplifier (LNA) and a single mixer set (i.e. a single I/Q mixer pair). In one preferred embodiment, the front-end components can include a single local oscillator (LO). This LO can be tuned, either statically or dynamically.

The AFE can include a GPS polyphase filter and a GLONASS polyphase filter. In one embodiment, the LO frequency and the filter center frequency for the GPS polyphase filter and/or the GLONASS polyphase filter can be tunable (statically or dynamically). In this configuration, the LO can be implemented with an integer-N synthesizer or a fractional-N synthesizer. In another embodiment, the passbands of the GPS and GLONASS polyphase filters can be selectable to be one of positive frequencies and negative frequencies (statically or dynamically). In yet another embodiment, the filter bandwidth for each of the GPS and GLONASS polyphase filters can be tunable (statically or dynamically). In one embodiment, the polyphase function of these filters can be switched, thereby converting the polyphase filters to standard intermediate frequency (IF) filters.

In one embodiment, the frequency of the LO can be set between the GPS and the GLONASS frequencies. For example, in a preferred embodiment, the frequency of the LO can be set such that the GPS IF is below the GLONASS IF. In one embodiment, the LO frequency can be used to optimize the GPS signal. Specifically, when the frequency of the LO is approximately 1581.67 MHz, the resulting IF frequency of a GPS signal is approximately 6 MHz. The downconverted GPS signal occupies a finite bandwidth around this IF, e.g. 4 to 8 MHz. Generally, if a down-converted signal spectrum lands in a band between 1 to 6 MHz, then the IF is high enough to avoid DC offset and 1/f noise, but low enough to maximize filter performance. Therefore, in this configuration, the optimization of the GPS filter is effectively given priority over the GLONASS filter.

The GPS DFE can include a low pass filter (LPF) and a multiplexer. The LPF can filter and decimate the output signal of the AFE. The multiplexer can select either the output signal of the AFE or an output signal of the LPF. In one embodiment, the multiplexer can select the output of the LPF when the output signal of the AFE is 64 MHz, wherein the LPF includes a 2:1 decimator that generates a 32 MHz signal. The GPS DFE can also include a bandpass filter for filtering out interference from an output signal of the multiplexer.

The GPS DFE can further include at least one spur estimation cancellation (SEC) block for cancelling a known spur frequency from the output signal of the multiplexer. Each SEC block can include a numerically-controlled oscillator (NCO) for generating a phase of a spur based on a sample, the sample being a spur frequency/analog-to-digital converter (ADC) frequency. A sin/cos table can generate a four quadrant phasor based on the phase provided by the NCO. A conjugate multiplier can multiply a conjugate of the four quadrant phasor and an output signal of the AFE. A summation block can average the results of the conjugate multiplier over a large block size. A complex-by-complex multiplier can multiply a dumped value from the summation block and the four quadrant phasor. An adder can add the output signal of the AFE and a real result of the complex-by-complex multiplier to generate an SEC block output.

The GPS DFE can further include a DC estimation and cancellation block for performing an accumulator function, which is normalized by sample counts. An output signal of the DEC can advantageously include fractional bits to reduce quantization error.

The GPS DFE can further include a digital mixer for converting an intermediate frequency (IF) signal to a baseband signal. The digital mixer can advantageously provide a residual frequency offset after converting that is greater than a maximum Doppler frequency. In one embodiment, the digital mixer has a one path in, two path (I/Q) out configuration.

The GPS DFE can further include an integrate and dump decimation (ID2) block that receives output signals of the digital mixer. In one embodiment, the ID2 block includes a 2:1 decimator that generates a 16 MHz signal.

The GPS DFE can further include a quantizer block that converts output signals of the ID2 block into a sign bit and a magnitude bit. The quantizer can combine the sign and magnitude bits in a two-bit format compatible with legacy devices. Notably, the magnitude bits can be compared with a threshold, which is based on parameters including a desired signal power relative to a maximum power at an output of the GPS DFE, and a desired signal power relative to a maximum power at an input of the quantizer.

The GLONASS DFE can include at least one spur estimation cancellation (SEC) block for cancelling a known spur frequency, a digital mixer, a LPF, and a quantizer. In one embodiment, the SEC block, the digital mixer, and the LPF can be substantially the same as those provided for the GPS SEC block. The quantizer block is also substantially the same as that for the GPS DFE, except that the threshold can be based on parameters including a desired signal power relative to a maximum power at an output of the GLONASS DFE, and a desired signal power relative to a maximum power at an input of the quantizer.

This receiver can advantageously include an automatic gain control (AGC) block in which at least portions of the AGC block provide common control of a gain applied to both the GPS signals and the GLONASS signals. In one embodiment, the gain is associated with a low noise amplifier (LNA). Providing AGC can include optimizing gains in the GPS signal path, and then adjusting gains in the GLONASS signal path. Specifically, for the AFE, providing AGC can include initializing GPS-specific amplifiers, GLONASS-specific amplifiers, and shared GPS/GLONASS amplifiers. Then, a gain of GPS-specific amplifiers and a shared GPS/GLONASS amplifier can be corrected using outputs of the GPS DFE. Following a GPS AGC lock, the gain of GLONASS-specific amplifiers can be corrected using outputs of the GLONASS DFE. In one embodiment, correcting the gain of GPS-specific amplifiers and shared GPS/GLONASS amplifiers as well as correcting the gain of GLONASS-specific amplifiers can be performed by an interface counter device (ICD). Notably, the outputs of the GPS DFE and the GLONASS DFE can be quantized outputs in which only magnitude bits are counted. In one embodiment, the ICD can be debugged by measuring other quantized outputs in the receiver.

A method of operating this receiver can include processing a GPS signal and a GLONASS signal using a same search engine. Notably, the search engine can perform both coherent integration and non-coherent integration, and send resulting maximum output values to software for acquisition determination.

This receiver can further include a GPS pre-correlation noise estimator configured to receive GPS-specific signals from the dual mode interface, and a GLONASS pre-correlation noise estimator configured to receive GLONASS-specific signals from the dual mode interface. Note that the GPS pre-correlation noise estimator and the GLONASS estimator can be separate from any training engines. Each of the GPS and GLONASS pre-correlation noise estimators can include a first integrate and dump block to remove out-of-band noise for both I and Q components of an incoming signal. Absolute value blocks can provide absolute values of the outputs from the first integrate and dump block. An adder can add outputs of the absolute value blocks. A second integrate and dump block can process an output of the adder and generate a noise estimate output. Each of the GPS and GLONASS pre-correlation noise estimators can further include a counter that counts each dump. Note that the bit widths for the absolute value blocks and the adder of the GPS pre-correlation noise estimator may be different than bit widths for the absolute value blocks and the adder of the GLONASS pre-correlation noise estimator.

A tap generator for this receiver can include a shift register, five multiplexers, and a control circuit. The shift register can be configured to shift when a new chip is generated. Each register of the shift register can store a different chip, wherein a middle register can provide a prompt code. Each multiplexer, which can be configured to select one of the chips stored by the shift register, can output a noise (N) code, a very early (VE) code, an early (E) code, a late (L) code, or a very late (VL) code. The control circuit can control the five multiplexers. In one embodiment, the control circuit can include five adders and five floor blocks. Each adder can add a relative tap spacing (RTS) for a tap N, a tap VE, a tap E, a tap L, or a tap VL, and a truncated code phase. Each floor block can be configured to floor one of the five sums generated by the five adders, and generate a control signal for one of the five multiplexers.

This receiver can be calibrated such that the delays of filters in the receiver are corrected to cause a latency of the GPS and GLONASS signals to be equivalent. In one embodiment, the correction can be done for the AFE, e.g. in a surface acoustic wave (SAW) filter. In one embodiment, a temperature sensor can be used to determine when calibration is required and/or adjust a correction amount. The filters can include intermediate frequency (IF) filters. In one embodiment, a calibration signal can be used to calculate a difference in delay that is to be corrected. The correction can be done in the DFE, e.g. in the baseband filters. In one embodiment, the correction can be done using live GPS signals.

In one embodiment, calibrating IF filters can include disconnecting the IF filters from any preceding components of the receiver. At this point, a complex tone can be generated for input to the IF filters. The complex tone can be filtered by the IF filters. The resulting filtered signals can be propagated through components subsequent to the IF filters, including the analog-to-digital converts (ADCs). The outputs of the ADCs and the complex tone can be correlated. A delay calibration value can then be generated based on the correlating. This delay calibration value can be used for calibrating the IF filters.

In one embodiment, calibrating digital processing chains of the receiver can include building a look-up table (LUT) for a plurality of digital components of the digital processing chains. The LUT can include a latency for each digital component as measured by an analog-to-digital clock cycle.

In one embodiment, a signal can be blanked when strong interference at an input to the receiver is detected. Blanking can be controlled by a peak detector of a low noise amplifier (LNA) in the receiver, a transmit indicator of a Bluetooth system coexisting with the receiver, a transmit indicator of a WiFi system, and/or a transmit indicator of a cell phone. In one embodiment, the peak detector and at least one of the transmit indicators can have an enable/disable feature. Blanking can be applied to at least one of: the AGC, a tracking channel, and a search engine.

In one embodiment, an operation mode from one of a GPS-only mode, a GPS and GLONASS fixed mode, and a GPS and GLONASS dynamic mode can be selected. The GPS and GLONASS fixed mode has GPS and GLONASS always on, whereas the GPS and GLONASS dynamic mode has one of GPS and GLONASS always on, and the other system on based on predetermined conditions.

In one embodiment, deactivation circuitry for the receiver can be provided. This deactivation circuitry can deactivate dedicated circuitry of a first system (i.e. GPS or GLONASS) when (1) a corresponding signal from the first system is not needed or (2) signals solely from a second system provide accurate position determination. This deactivation circuitry can be controlled by a navigation engine.

BRIEF DESCRIPTION OF THE DRAWINGS

FIG. 3A-3F illustrate various positions for the local oscillator (LO) frequency relative to the given GPS and GLONASS frequencies, and the effect of those LO frequencies after mixing.

FIG. 9 illustrates an exemplary DC estimation and cancellation (DEC) block for the GPS DFE.

FIG. 10 illustrates an exemplary digital mixer (DM) for the GPS DFE.

FIG. 34 illustrates an exemplary GPS pre-correlation noise estimator.

FIG. 35 illustrates an exemplary GLONASS pre-correlation noise estimator.

DETAILED DESCRIPTION OF THE DRAWINGS

A receiver capable of receiving both GPS and GLONASS signals is described. This receiver can be advantageously configured to share components, thereby significantly reducing receiver size. This receiver can also advantageously allow both sets of signals to be simultaneously used in the position determination, thereby improving position accuracy of the receiver.

Receiver Overview

Figure 1:
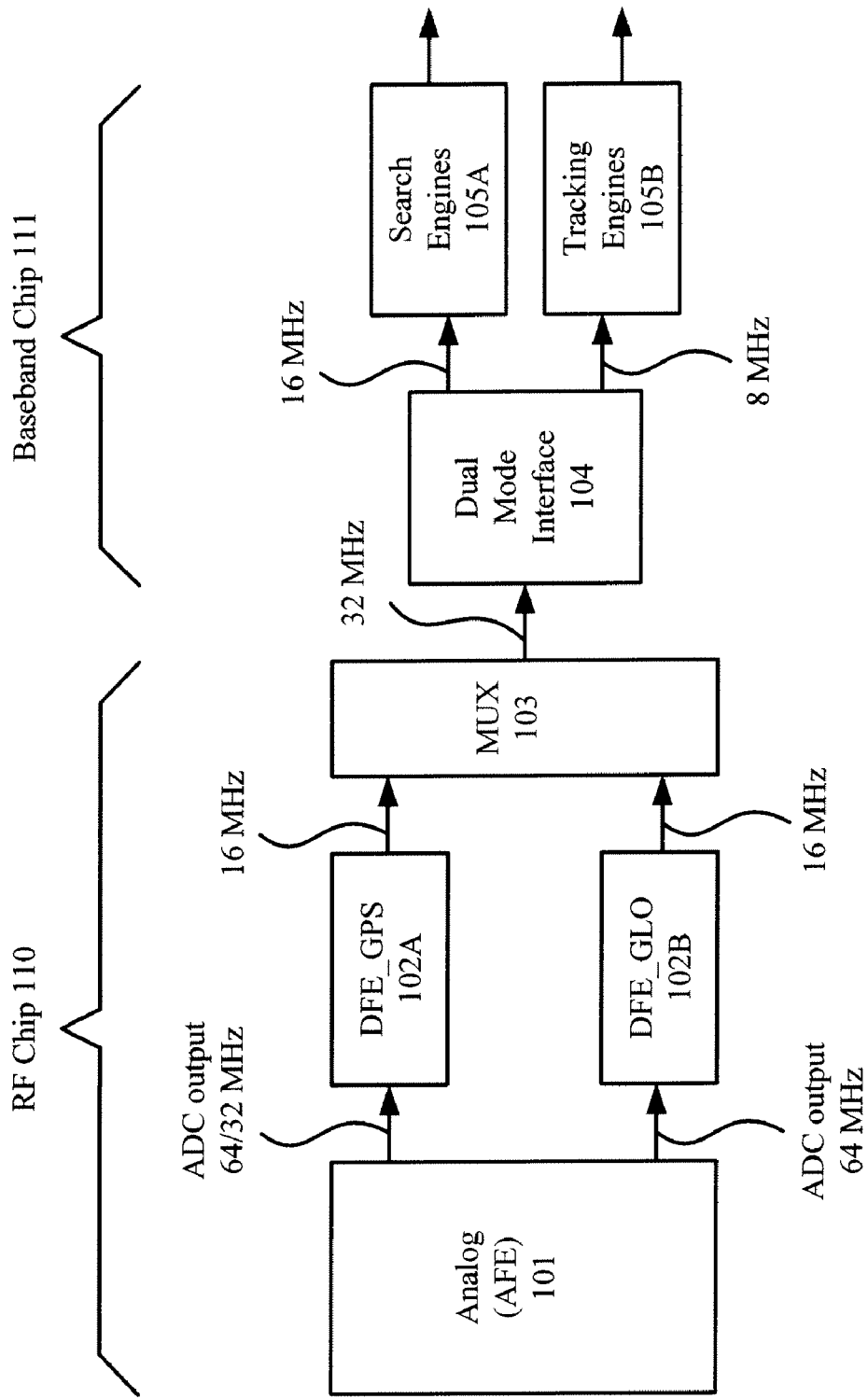
FIG. 1 illustrates an exemplary receiver for receiving and decoding signals for both GPS and GLONASS.

FIG. 1 illustrates an exemplary receiver for receiving and decoding signals for both GPS and GLONASS. In one embodiment, the receiver can include a two chip (i.e. integrated circuit) solution, e.g. an RF chip 110 and a baseband chip 111. RF chip 110 can include an analog front end (AFE) 101, a digital front end for GPS (DFE_GPS) 102A, a DFE for GLONASS (DFE_GLO 102B), and a multiplexer (MUX) 103.

AFE 101 outputs an analog to digital converter (ADC) signal at 32 or 64 MHz for a received GPS signal, and outputs an ADC signal at 64 MHz for a received GLONASS signal. The DFE outputs of DFE_GPS 102A and DFE_GLO 102B are both sampled at 16 MHz. MUX 103 can multiplex these two outputs to 32 MHz to generate a single signal at the output of RF chip 110, thereby saving pins of the chip.

Baseband chip 111 can include a dual mode interface 104, a plurality of search engines 105A, and a plurality of tracking engines 105B. Dual mode interface 104 can receive the output of MUX 103 and generate signals for search engines 105A (e.g. at 16 MHz) as well as for tracking engines 105B (e.g. at 8 MHz). In one embodiment, baseband chip 111 can be implemented with a standard chip performing these functions.

Analog Front End

Figure 2A:
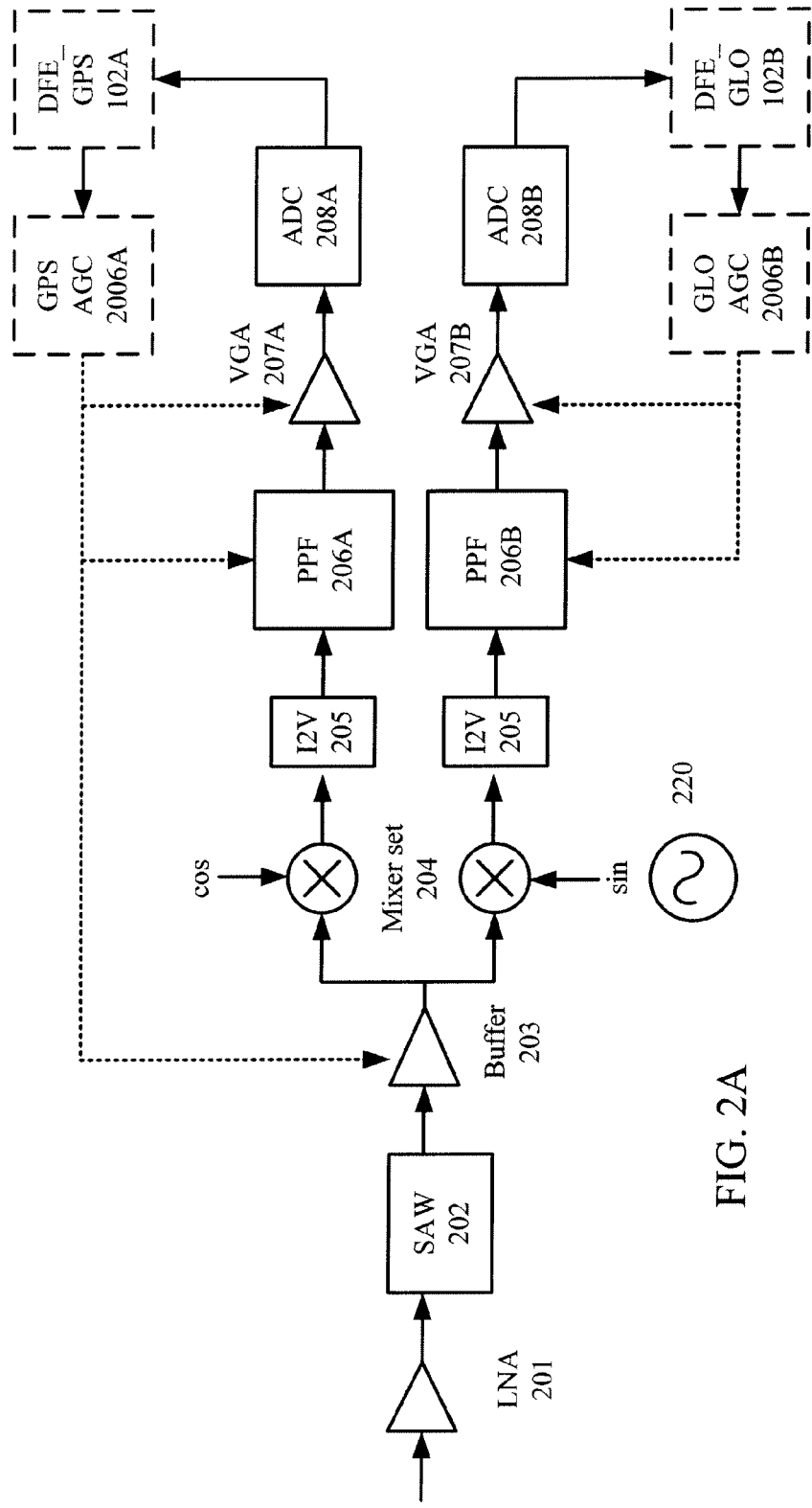
FIG. 2A illustrates an exemplary analog front end for the receiver of FIG. 1.

FIG. 2A illustrates an exemplary AFE including a low noise amplifier (LNA) 201 that receives a signal (GPS and/or GLONASS). A surface acoustic wave (SAW) filter 202 can receive the output of LNA 201 and provide bandpass filtering. A buffer 203 can receive the output of SAW filter 202 and provide its buffered signal to single mixer set (i.e. a single I/Q mixer pair) 204, wherein one mixer of set 204 further receives a cos signal from a local oscillator and the other mixer of set 204 further receives a sin signal from the local oscillator. These mixer outputs, which are converted from current mode to voltage mode by current-to-voltage blocks (I2V) 205, are then provided to polyphase filters (PPFs) 206A and 206B. Note that PPFs 206A and 206B have complex inputs (I/Q), typically remove the image signal, and have real output (I). Voltage gain amplifiers (VGAs) 207A and 207B receive the outputs of PPFs 206A and 206B, respectively. Analog to digital converters (ADCs) 208A and 208B (e.g. two 8 bit ADCs) receive the amplified outputs of VGAs 207A and 207B, respectively, and then provide signals to DFE-GPS 102A and DFE_GLO 102B (shown for context in FIG. 2A).

Thus, in the above-described configuration, GPS and GLONASS share a front-end receiver path, i.e. LNA 201, SAW filter 202, buffer 203, and mixer set 204. However, after mixer set 204, GPS and GLONASS use different PPFs, AGCs, and ADCs.

In one preferred embodiment, a single local oscillator (LO) 220 can be used to generate both the cos and sin signals for mixer set 204. In one embodiment, the RF frequency of LO 220 can be set to obtain predetermined IF frequencies for the GPS and GLONASS signals. For example, referring to FIG. 3A, an RF frequency 302 of the LO can be set to 1581.67 MHz, which is between a GPS frequency 301 at 1575.42 MHz and a GLONASS frequency 303 at 1601.72 MHz. After mixer set 204, the resulting GPS and GLO IF frequencies would be 6.25 MHz (312) and 20.05 MHz (313), respectively, as shown in FIG. 3B (DC 311 shown for context).

In another embodiment shown in FIG. 3C, the LO RF frequency 304 can be set to 1585 MHz. In this case, after mixer set 204, the GPS and GLO mixed frequencies are 10 MHz (314) and 16 MHz (315), respectively, as shown in FIG. 3D. Note that as the LO frequency is moved closer to the GLONASS frequency, the resulting GPS and GLONASS IF frequencies are closer.

In yet another embodiment shown in FIG. 3E, the LO RF frequency 304 can be set to a middle frequency between GPS frequency 301 and GLONASS frequency 303. In this case, after mixer set 204, the GPS mixed frequency 316 and the GLONASS mixed frequency 317 are overlapping at approximately 13-14 MHz, as shown in FIG. 3F. Note that this setting yields the lowest IF frequency for GLONASS.

Notably, the setting of the LO frequency can impact the filter implementation for GPS or GLONASS (e.g. for polyphase filters 206A and 206B). Specifically, setting the frequency of the LO higher (for example, using frequency 304 instead of frequency 302) may make the GPS filter (i.e. polyphase filter 206A) more expensive and difficult to implement, and the GLONASS filter (i.e. polyphase filter 206B) less expensive and easier to implement. On the other hand, setting the LO frequency lower (for example, using frequency 302 instead of frequency 304) can make the GPS filter less expensive and easier to implement and the GLONASS filter more expensive and difficult to implement.

Note that in the case of LO frequency 305, polyphase filters 206A and 206B can distinguish between GPS and GLONASS signals based on positive or negative frequencies. That is, although FIG. 3F indicates that the signals appear to be overlapping, the GPS signal is actually a negative frequency, whereas the GLONASS signal is actually a positive frequency. Therefore, polyphase filters 206A and 206B can have tailored filter bandwidths for GPS and GLONASS signals (see dashed-dot line for GPS and dashed-double-dot line for GLONASS). However, note that this LO setting can potentially result in I/Q mismatch, which in turn can cause signal coupling to another signal path. This signal coupling can significantly reduce receiver performance.

Note that by using either LO frequency 302 or LO frequency 304, polyphase filters 206A and 206B can also be advantageously tailored for the GPS and GLONASS bandwidths (see dashed-dot line for GPS and dashed-double-dot line for GLONASS in FIGS. 3B and 3D). Additionally their IF frequency separation can mitigate I/Q mismatch, thereby ensuring better receiver performance. However, note that this LO setting in the presence of I/Q mismatch may cause signal coupling between Glonass and GPS paths.

In a preferred embodiment, the LO frequency 302 is used to optimize the GPS signal. Specifically, an ideal IF frequency of GPS signal is between approximately 1-6 MHz, which is high enough to avoid DC offset and 1/f noise, but low enough to maximize filter performance. In one embodiment, the optimization of polyphase filter 106A can be given priority over polyphase filter 106B. For example, LO frequency 302 can provide a low GPS IF frequency, thereby ensuring a low cost, easily implemented GPS filter, while not making the GLONASS filter too expensive or difficult to implement. Note also that the filter bandwidths shown in FIG. 3B are distinctly separate and therefore can provide better receiver performance than those shown in FIG. 3D.

In one embodiment, both the LO frequency and the polyphase filter center frequency can be tuned. This tuning can be advantageously used to avoid spurs and/or accommodate different crystal reference frequencies. This tuning feature allows LO 220 to be implemented with an integer-N synthesizer with arbitrary crystal frequencies. An integer-N synthesizer has the advantages of simple implementation and minimal phase noise. In one embodiment, the tuning of the LO and polyphase filter center frequencies can be performed dynamically during normal receiver operation.

In another embodiment, the polyphase filter bandwidth can also be tunable. This bandwidth tuning can advantageously allow tradeoffs in interference rejection vs. sensitivity to be considered for optimizing receiver performance. For example, if the bandwidth is made wide, then there is very little attenuation of the desired signal, but more interference is allowed. On the other hand, if the bandwidth is made narrow, then interference is minimized, but the desired signal may be partially attenuated. This filter bandwidth tuning can be performed in a static or a dynamic manner.

In one embodiment, the passband of each of the polyphase filters can be selected as either positive frequencies or negative frequencies. For example, in one embodiment, the GPS polyphase filter passband can be switched to positive frequencies (and the GLONASS polyphase filter polarity can be switched to negative frequencies). Such switching may be used to avoid a spur that would otherwise interfere with one of the GPS and GLONASS signals. This passband selection can be performed in a static or a dynamic manner.

Note that if filtering is not performed by polyphase filtering, e.g. if conventional IF filters are used, then the filter bandwidth can be adjusted to the wider signal (i.e. the GLONASS signal) (dashed-dot line only). A conventional IF filter configuration would be simpler than that for a polyphase filter. Moreover, a conventional filter configuration can save power compared to a polyphase filter. However, a conventional filter configuration may also be susceptible to increased I/Q mismatch and thus undesirable signal coupling. Moreover, some signal-to-noise (SNR) degradation (e.g. on the order of 3 dB) may occur by using a conventional filter configuration.

Figure 2B:
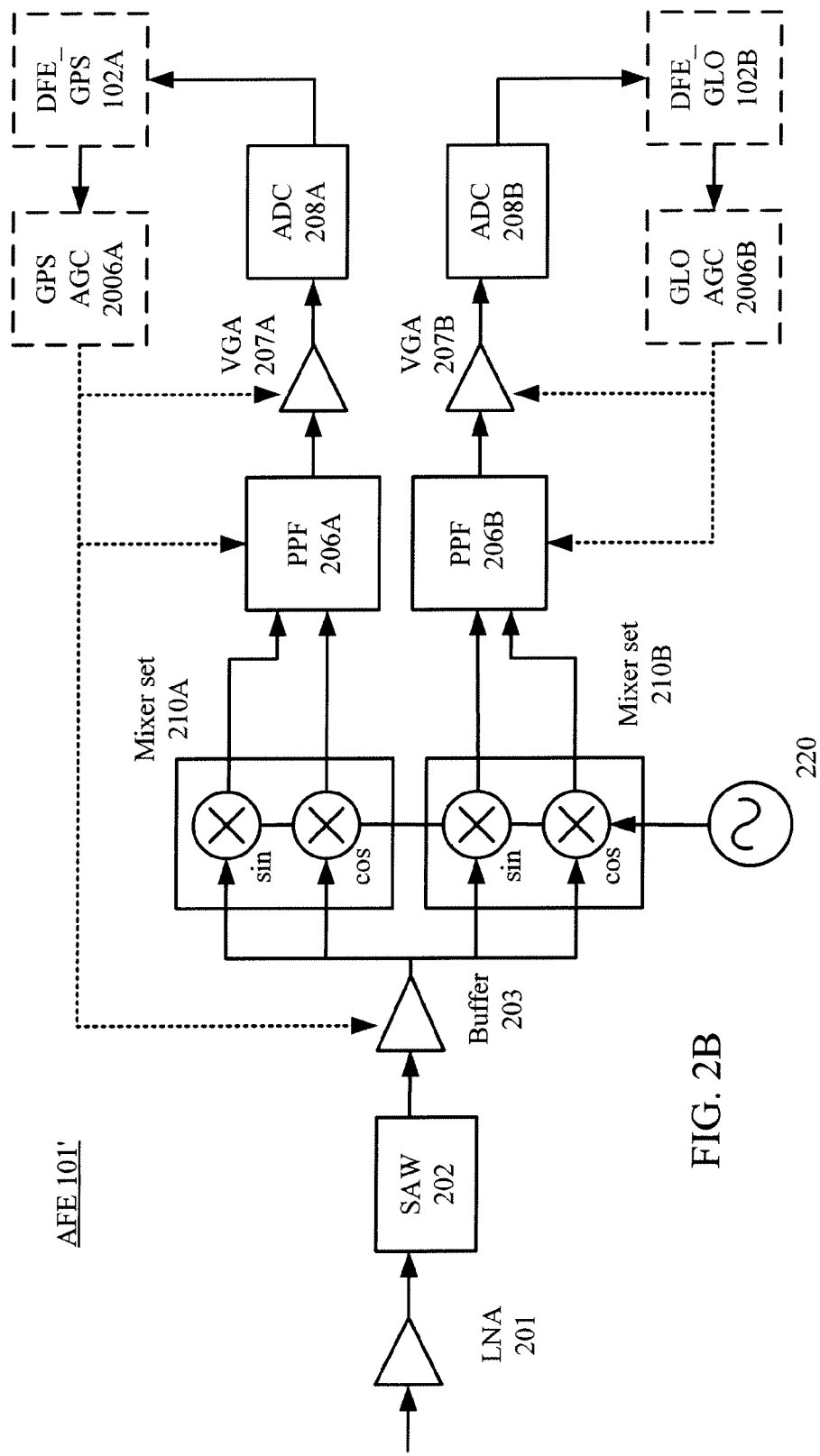
FIG. 2B illustrates another exemplary analog front end for the receiver of FIG. 1.

FIG. 2B illustrates another exemplary embodiment of an AFE 101'. In this embodiment, I2V blocks 205 are eliminated and mixer set 204 is replaced by mixer sets 210A and 210B. In this configuration, the mixers of each mixer set are provided directly to their respective PPFs. Note that LO 220 can still be provided to each mixer in mixer sets 210A and 210B. AFE 101' may provide better linearity and noise performance than AFE 101 (FIG. 2A). However, AFE 101 has lower loading of LNA 201, which can potentially provide higher gain.

In one embodiment, the GPS automatic gain control (AGC) block 2006A and the GLO AGC block 2006B (off-chip, shown for context) can receive inputs from DFE_GPS 102A and DFE_GLO 102B, respectively. In one embodiment, the AGC inputs can be 16 MHz complex (I/Q) 2 bit samples from the DFEs. GPS AGC 2006A controls the gain of buffer 203, PPF 206A, and VGA 207A. In contrast, GPS AGC 2006B controls the gain of PPF 206B and VGA 207B.

GPS Digital Front End (DFE)

A conventional GPS receiver generally uses a 1 or 2 bit ADC, which is sufficient because the received GPS signal is usually below the thermal noise floor. For example, the thermal noise power is about −110 dBm with a typical analog filter, while the received power of a GPS signal is −130 dBm and below. In this case, as long as the quantization noise introduced by the ADC is negligible compared to the thermal noise, the overall performance is not degraded.

As noted above, it is assumed that only the GPS signal and thermal noise are present at the ADC input. However, if there is also an interference signal at the ADC input, then some of the ADC dynamic range must be allocated for the interference to avoid severe clipping. As a result, the desired signal is sized smaller, the quantization noise relative to the thermal noise increases, and the performance degrades.

In actual use, the frequency spectrum is packed with all kinds of RF signals, some of which are only a few tens of MHz away from the protected GPS band. Additionally, RF leakage or harmonics of a digital clock in the chip may appear very close or even in the GPS band. Unfortunately, to make the signal interference-free at the ADC input is very costly in analog circuit design and consumes considerable power and area.

In accordance with one embodiment of an improved AFE, the analog design requirements can be relaxed. Specifically, a multi-bit ADC (e.g. an 8 bit implementation for each of ADC 208A and 208B, FIG. 2A) can be used, thereby allowing some interference to pass through. This interference can then be suppressed digitally. Notably, this implementation is commercially preferred because the DFE is smaller and lower power compared to the AFE. Moreover, compared to the AFE, the DFE scales better as the integrated circuit technology continues to shrink to smaller geometry.

In general, the DFE can be characterized as being located between the ADC and the rest of the baseband modules. The DFE described hereafter can be configured to remove one or more spurs, DC offset, and blockers. In one embodiment, the DFE can reduce a multiple bit input to a 2 bit output. Notably, the output bit width can be truncated to a standard number of ADC bits so that the area and power of the core digital circuit can be maintained.

Figure 4:
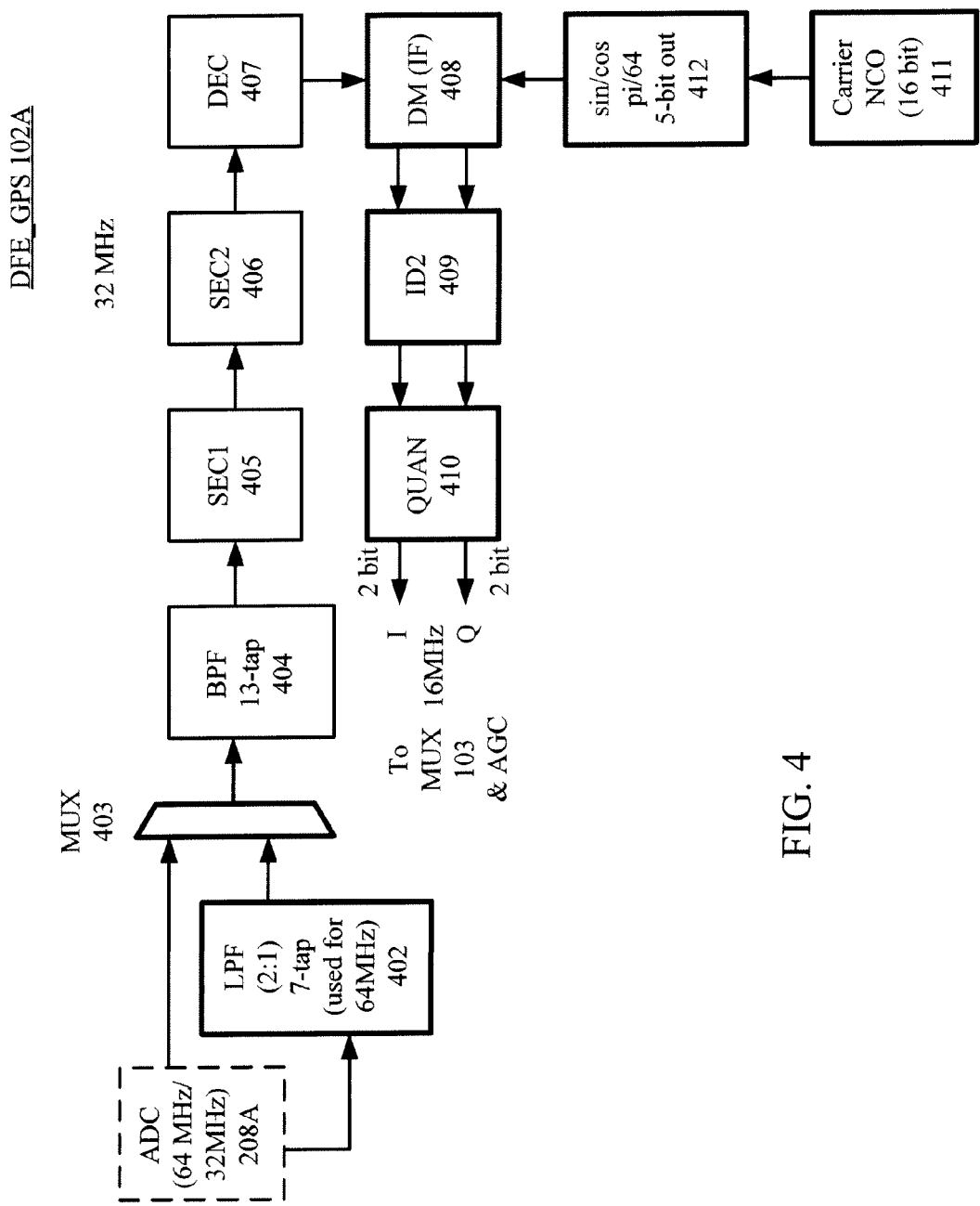
FIG. 4 illustrates an exemplary digital front end (DFE) for GPS.

FIG. 4 illustrates an exemplary DFE_GPS 102A (FIG. 1) that can include a low pass filter (LPF) 402, a multiplexer (MUX) 403, a bandpass filter (BPF) 404, spur estimation and cancellation (SEC) blocks 405-406, a DC estimation and cancellation (DEC) block 407, a digital mixer (DM) 408, an integrate and dump decimation block 409, and a quantizer 410. In one embodiment, BPF 404, SECs 405 and 406, DEC 407, and DM 408 can run at 32 MHz in both 32 MHz and 64 MHz ADC modes.

In this embodiment of DFE_GPS 102A, MUX 403 can receive inputs from ADC 208A (shown for context) and LPF 402 (which receives its input from ADC 208), and can provide an output to a bandpass filter (BPF) 404. Note that the ADC sample frequency can run at 32 or 64 MHz (two operation modes) to avoid aliasing.

When ADC 208 runs at 64 MHz, LPF 402 can be used to suppress the image at 25-27 MHz. In one embodiment, a 2:1 decimator in LPF 402 can reduce the clock to 32 MHz. In contrast, when ADC 208 runs at 32 MHz, LPF 402 can be bypassed using MUX 402. In either case, BPF 404 (running at 32 MHz) can filter out interference.

In one embodiment, LPF 402 can be implemented as a fixed coefficient 7-tap filter (shown in greater detail in FIG.

5). LPF 402 can be configured to suppress the image at 25-27 MHz (for IF=5-7 MHz) by 30 dB before the 64 MHz to 32 MHz decimation.

Figure 5:
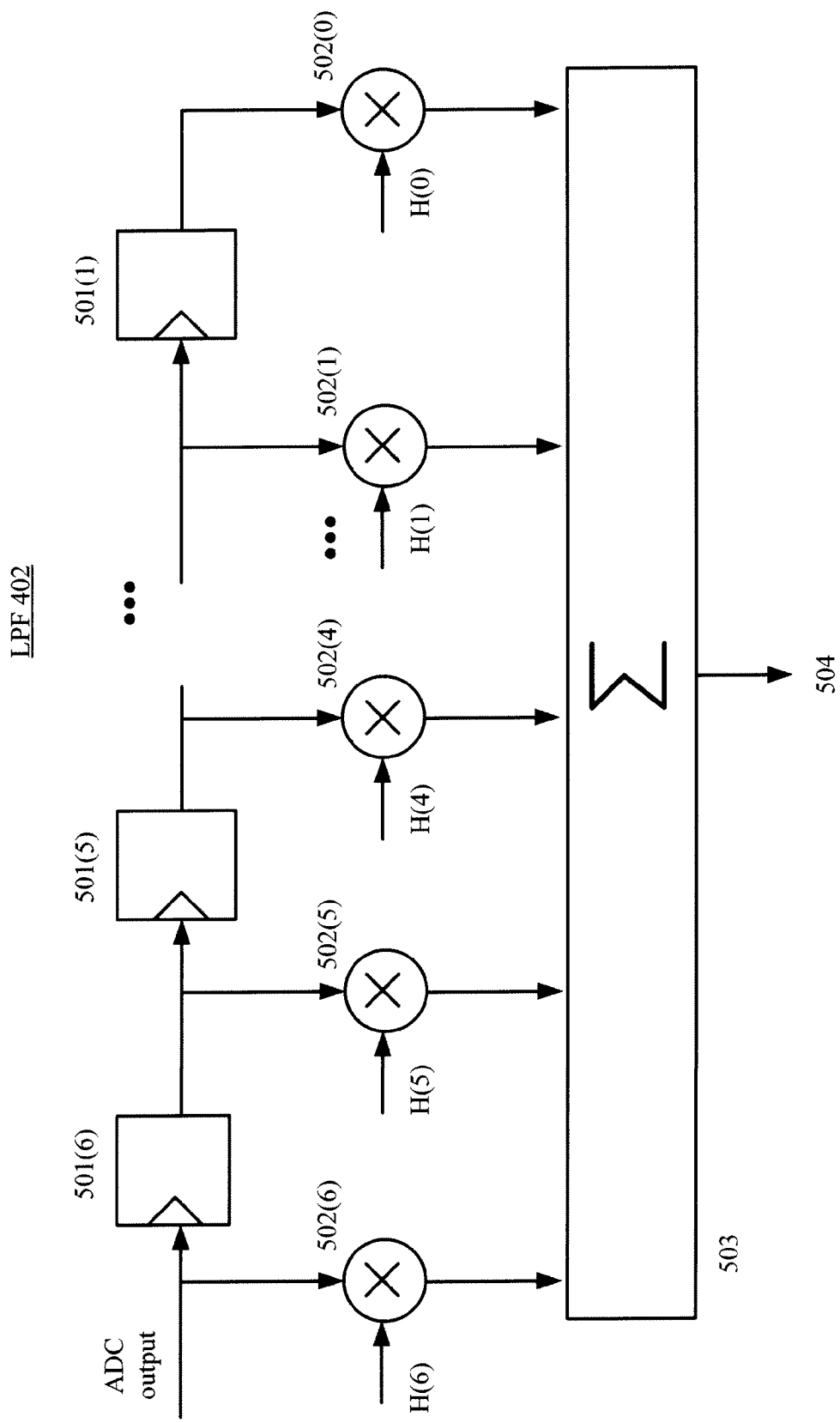
FIG. 5 illustrates an exemplary low pass filter (LPF) for the GPS DFE.

FIG. 5 illustrates an exemplary LPF 402 including a plurality of registers 501(1)-501(6) in a daisy chain and a plurality of multipliers 502(0)-502(6), wherein an input to each register is also provided to its associated multiplier (e.g. an input to latch 501(5) is also provided to multiplier 502(5). Multipliers 502(0)-502(6) further receive filter coefficients H(0)-H(6), respectively. In one embodiment, the filter coefficients can be fixed and symmetric about the center tap. The multiplication can be implemented by bit shifts and additions. The output of each tap (i.e. each mixer) is provided to a summation block 503, which in turn generates an output 504. Note that due to the 2:1 decimation, only 1 out of every 2 output samples needs to be computed. The decimation can take place at the input by splitting the filter coefficients into two sets (two phases).

Figure 6:
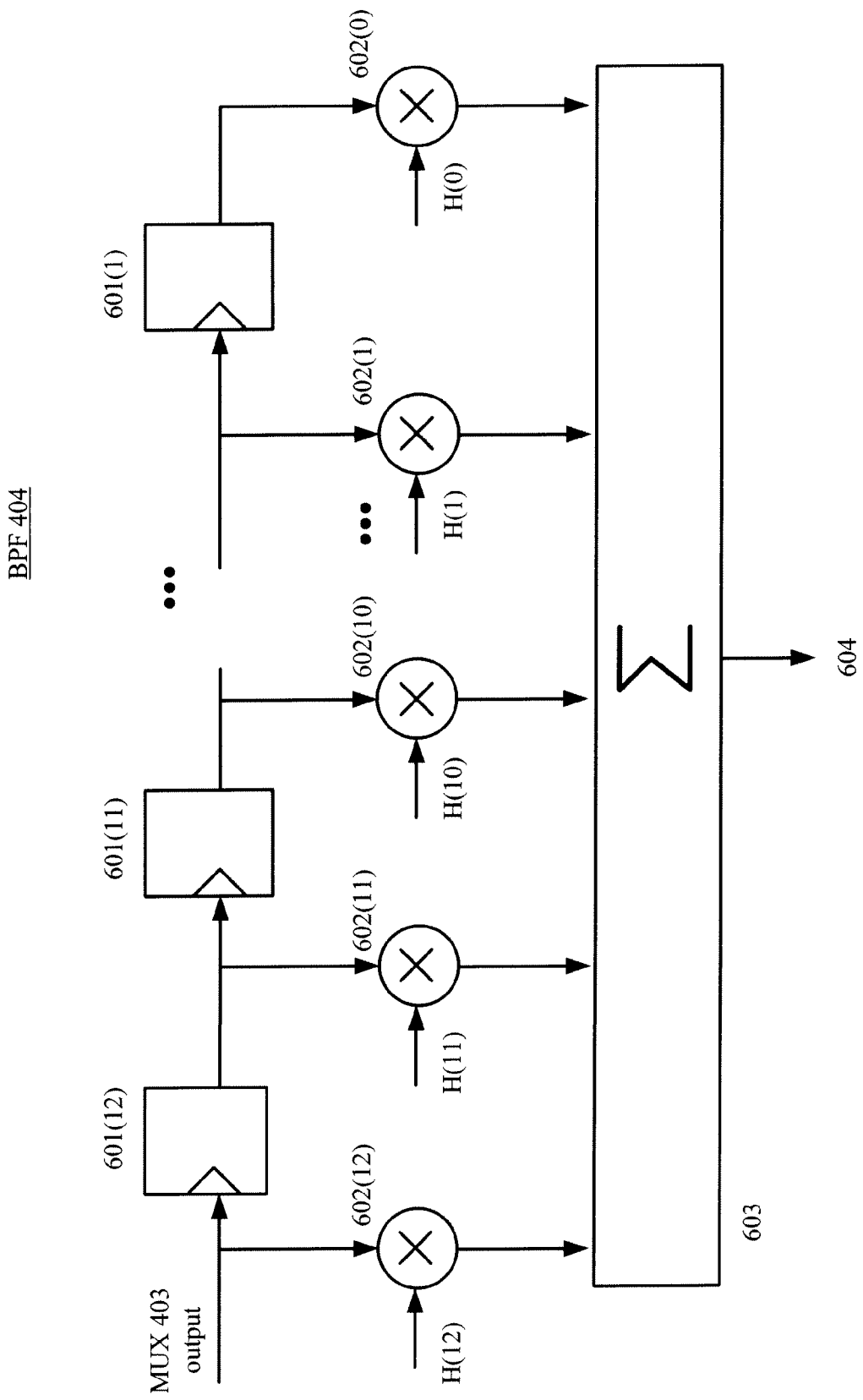
FIG. 6 illustrates an exemplary band pass filter (BPF) for the GPS DFE.

FIG. 6 illustrates an exemplary BPF 404 including a plurality of registers 601(1)-601(12) in a daisy chain and a plurality of multipliers 602(0)-602(12), wherein an input to each register is also provided to its associated multiplier (e.g. an input to register 601(11) is also provided to multiplier 502 (11). Multiplier 502(0)-502(11) further receive filter coefficients H(0)-H(12), respectively. The multiplication can be implemented by bit shifts and additions. The outputs of the taps are provided to a summation block 603, which in turn generates an output 604.

BPF 404, which is configured to suppress out-of-band blockers and noise, can be centered at the IF frequency, and specified by a pass band and stop band. Because the IF frequency may change depending on the reference crystal, and the pass band and stop band may change depending on the required sharpness of correlation peak and interference rejection, the filter coefficients can be configured by software. For this reason, general-purpose multipliers can be used instead of hard coded taps. In one embodiment, BPF 404 can be bypassed if there is no out-of-band interference.

Figure 7:
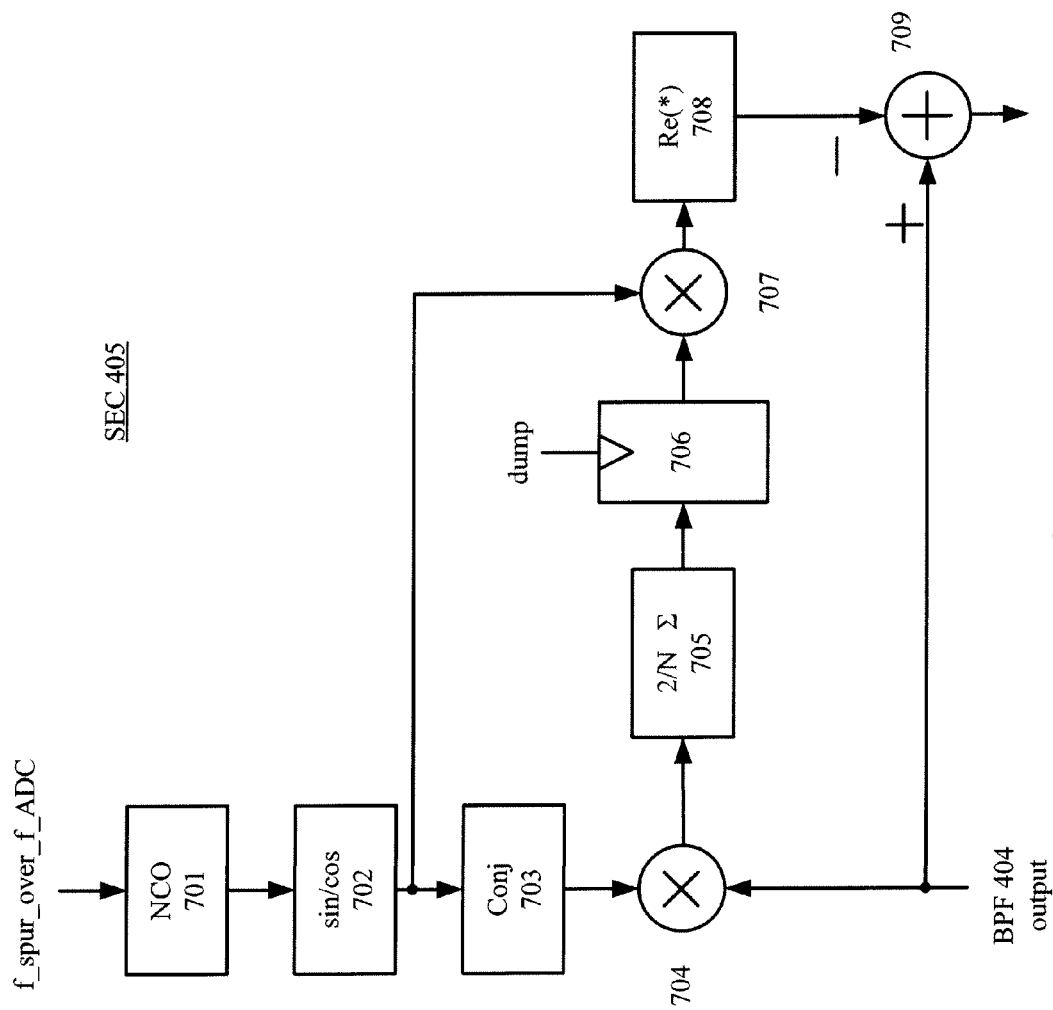
FIG. 7 illustrates an exemplary spur estimation and cancellation (SEC) block for the GPS DFE.

FIG. 7 illustrates an exemplary SEC 405. In this embodiment, SEC 405 assumes the spur is a single tone, tries to estimate its amplitude and phase, reconstructs the spur, and subtracts out the spur. Note that although phase noise may smear the spur and create a 'skirt' around the tone, the residual error after canceling the single tone is negligible and therefore can be ignored by SEC 405. Further note that this single spur estimation/subtraction works better than passing the signal through a notch filter, because it is very difficult to build a narrow notch filter without distorting the signal when the notch is in band.

In SEC 405, a numerically controlled oscillator (NCO) 701 can be used to generate the phase of the spur using a received spur frequency (f_spur_over_f_ADC). In one embodiment, the maximum sample rate in SEC 405 can be set to 32 MHz. For a target frequency error of 0.01 Hz (i.e. 3.6 degrees of phase error in 1 second), 32 bits can be used in the NCO (e.g. log 2(32e6/0.01)−1=31 bits, increased to 32 bit for convenience).

To get a clean cancellation (e.g. with a residual less than −130 dBm), accurate estimations of the spur amplitude and phase are needed. Therefore, the requirement of the resolution of the sin/cos table 702 is thus more stringent than that of a Doppler wiper (known by those skilled in the art and therefore not explained in detail herein). Note that in one embodiment, the spur estimation and reconstruction may use some fractional bits.

The algorithm of spur estimation can be computed as follows. Assume the spur in the incoming signal is:

$$x(t) = a\cos(\omega t + \theta)$$

This value can be multiplied by the conjugate of the spur phasor (computed by conjugate generator 703) to obtain:

$$s(t) = \exp(-j\omega t)$$

Therefore, the output of a multiplier 704 is:

$$y(t) = a\cos(\omega t + \theta) \cdot \exp(-j\omega t) =$$
$$\frac{a}{2}(\exp(j(\omega t + \theta)) + \exp(-j(\omega t + \theta))) \cdot \exp(-j\omega t) =$$
$$\frac{a}{2}(\exp(j\theta) + \exp(-j(2\omega t + \theta)))$$

This result can be averaged (by accumulator 705 and stored in block 706)) over a large block size. In one embodiment, a default size can be N=4096 samples, with a maximum size being $2^{18}$=262144 samples or 8 ms (note that the estimation is updated when the dump signal is asserted to block 706). During this averaging, the second term diminishes and the first term (which is a constant) remains. The resulting complex value generated by the equation below represents the amplitude and phase of the spur:

$$\frac{2}{N}\sum_{t=1}^{N} y(t) = \exp(j\theta)$$

To cancel the spur, this complex value can be multiplied with the spur phasor (using multiplier 707), wherein the real part (stored by block 708) is represented by:

$$\hat{x}(t) = Re(a\exp(j\theta) \cdot \exp(j\omega t)) = a\cos(\omega t + \theta)$$

This value represents the reconstructed spur, which when subtracted from the original signal (using adder 709) can effectively cancel the spur.

In this embodiment, multiplier 704 can be a complex-by-complex multiplier. Accumulator 705 can be in a format that can support the maximum block size. Multiplier 707 can be implemented as a complex-complex multiplier for spur cancellation. The format of adder 709 can be include some fractional, signed bits, depending on whether SEC 406 is in use, as discussed below). In one embodiment, saturation can be used (as described in reference to FIG. 8).

Figure 8:
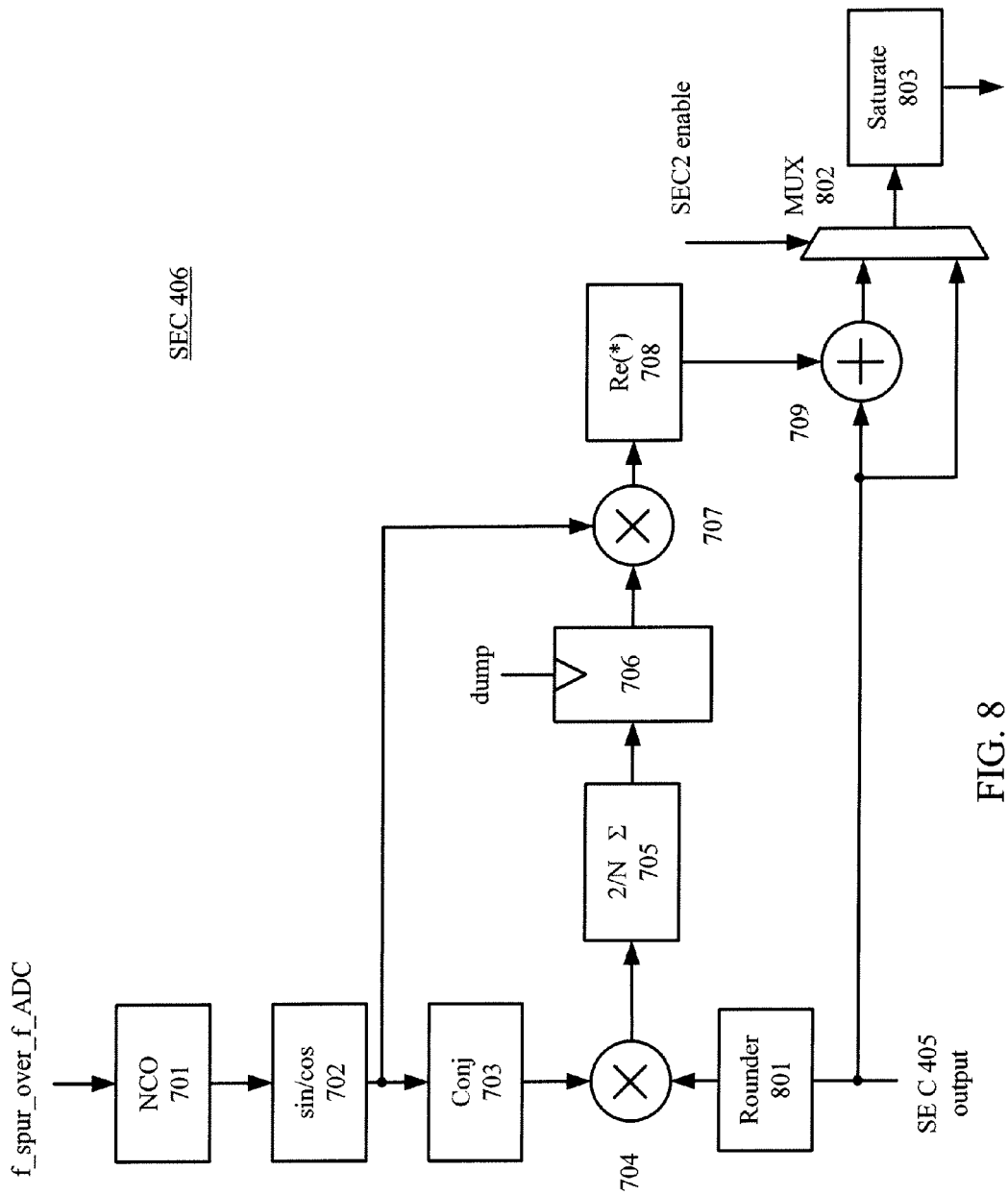
FIG. 8 illustrates another exemplary SEC block for the GPS DFE.

In the embodiment shown in FIG. 4, DFE_GPS 102A includes two SECs, i.e. SEC 405 and SEC 406. Concatenating SECs 405 and 406 can allow for estimating and cancelling two separate spurs. FIG. 8 illustrates an exemplary SEC 406 that, in addition to the components described for SEC 405, further includes a rounder block 801, a multiplexer 802, and a saturate block 803. In this embodiment, the received signal from SEC 405 can be rounded (by rounding block 801) and eliminating fractional bits for spur estimation. This rounding allows reusing the same multiplier as in SEC 405. Notably, SEC performance does not deteriorate despite rounding because the fractional bits represent energy at the first spur frequency.

If both SEC 405 and SEC 406 are used (as determined by the SEC2 enable signal), then MUX 802 selects the output of adder 709 for its output. On the other hand, if only SEC 405 is used, then MUX 802 selects the received signal for its output (i.e. bypassing adder 709). Keeping the full range at the SEC 405 output allows a strong spur to be cancelled at SEC 406 (otherwise clipping/distortion may occur), and makes the input format of SEC 405 and SEC 406 similar. After SEC 406, the signal size can be reduced significantly. Therefore, in one embodiment, saturate block 803 can generate a reduced bit set for its output. Notably, the estimation of the second spur occurs only after the first spur has been estimated and cancellation has started. Therefore, this technique can ensure the stability of the estimation and cancellation process.

In one embodiment, if no spur is present, both SEC 405 and 406 can be bypassed using a multiplexer bypass (not shown, but similar to that shown in FIG. 8). In this case, the MSBs can be saturated and the LSBs can be padded with zeros.

If spur estimation and cancellation is enabled, then a new estimation can be performed after hardware reset and any gain change. The estimation/cancellation takes one block of signal and is available immediately after the block. Note that the estimation/cancellation can run continuously or periodically. If run periodically, the period can be determined based on an acceptable accumulate phase error. For example, 746 ms gives about 1 degree of phase error toward the end with the 32 MHz sample rate and a 32 bit NCO. Therefore, in this case, the cancellation should be run continuously. In one embodiment, the most recent spur amplitude and phase estimation can be used until the next estimation is available.

FIG. 9 illustrates an exemplary DEC 407 that can provide DC estimation and cancellation. In this embodiment, DEC 407 can include an accumulator 905, which is normalized by the sample counts. DC is estimated using one block of samples (default N=4096, maximum size is $2^{15}$=32768 or 1 ms)(stored by block 906 and triggered by the dump signal), and the result can be applied immediately after the block.

In one embodiment, fractional bits can be kept in the block average to reduce the quantization error. For example, note that there is a systematic −0.5*LSB bias in the output of an 8-bit ADC due to the asymmetric code words (−128 to 127). When the GPS signal is sized small to leave sufficient headroom for blockers, this 0.5 LSB may not be negligible compared to the GPS signal itself. In this case, if it is not removed, 2-bit quantizer (QUAN) 410 may generate biased output as well, thereby adversely affecting performance. Notably, allowing fractional bits can advantageously provide enough resolution to remove such small but non-negligible DC values.

Note that when BPF 404 is enabled, the DC component can be suppressed by 30 dB by design. In this case, DEC 407 can be bypassed. If DEC 407 is used (as determined by the DEC enable signal), then MUX 908 can select the output of adder 907 for its output. On the other hand, if DEC 407 is to be bypassed, then MUX 908 can select the received signal (e.g. from SEC 406) for its output. In one embodiment, a saturate block 909 can receive the output from MUX 908 and generate an output. When DEC 407 is used, a new estimation can be performed after hardware reset and any gain change. DEC estimation can run continuously or periodically. If run periodically, the period should be determined by the drifting characteristics of the DC. In one embodiment, the cancellation can run continuously with the most recent estimation. Note that when DEC 407 is bypassed, any zero fractional bits can be padded.

FIG. 10 illustrates an exemplary DM 408 including two mixers 1001A and 1001B that receive the output of DEC 407. In one embodiment, DM 408 can run at 32 MHz (i.e. twice the speed of the DFE_GPS 102A output sampling rate in AFE 101). DM 408 can convert the pass-band signal centered at IF ($f_0$) to baseband. A carrier NCO 1003 can be 16 bits wide. The step size of the input frequency is $f_{step}$=32 MHz/$2^{16}$=488.28125 Hz. Suppose the required residual frequency offset after conversion is at least Δf, where Δf is usually greater than the maximum Doppler frequency. The rounded IF frequency can then be computed as:

$$\tilde{f}_0 = \lfloor (f_0 - \Delta f)/f_{step} \rfloor \cdot f_{step}$$

This computation ensures that the residual frequency $f_{residual}$=$f_0$−$\tilde{f}_0$ is greater than Δf. As noted in FIG. 10, DM 408 has one path (I) input and two paths (I/Q) output. The I path can be multiplied with $\cos(2\pi\tilde{f}_0 t)$, and the Q path can be multiplied with $-\sin(2\pi\tilde{f}_0 t)$.

Figure 11:
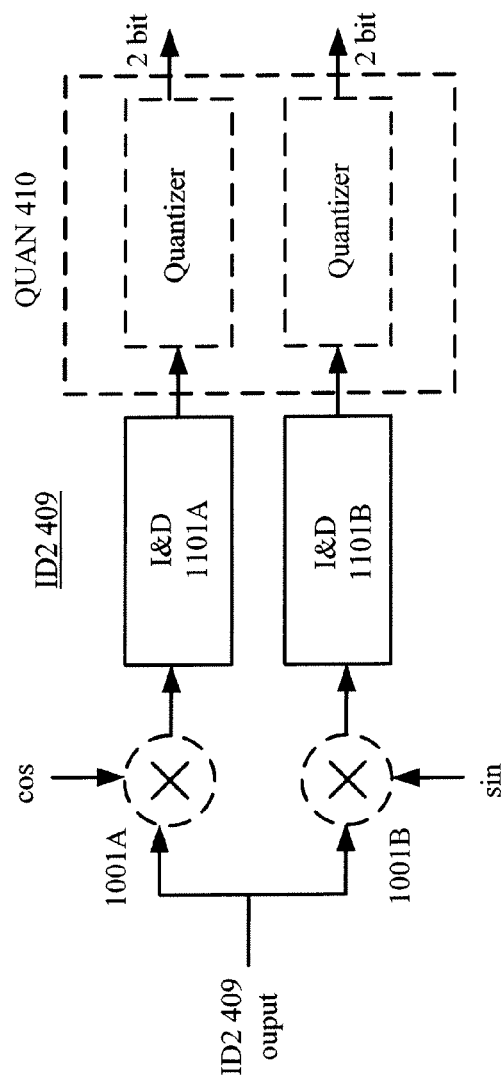
FIG. 11 illustrates an exemplary integrate and dump (I&D) set (ID2) for the GPS DFE.

FIG. 11 illustrates an exemplary ID2 409 that can include two integrate and dump blocks 1101A and 1102B receiving inputs from multiplexers 1001A and 1001B, respectively (shown for context). In one embodiment, each of I&D blocks 1101A and 1101B can be implemented using a simple 2:1 integrate and dump decimation to down sample the signal from 32 MHz to 16 MHz. Note that because the signal is already mixed to baseband, and the BPF rejection is 30 dB beyond +/−5 MHz. Therefore, no low pass filter is needed before the integration and dump. I&Ds 1101A and 1101B can each provide 2 bits to their respective quantizers of QUAN 410 (shown for context).

Figure 12:
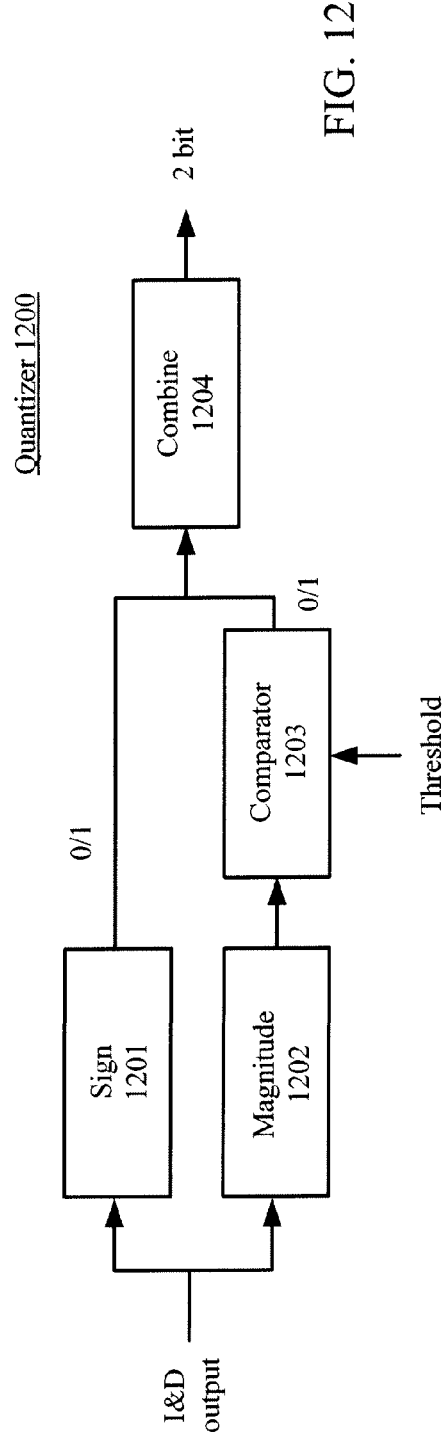
FIG. 12 illustrates an exemplary 2-bit quantizer for the GPS DFE.

FIG. 12 illustrates an exemplary 2-bit quantizer that can convert its input into a sign bit (generated by sign block 1201) and a magnitude bit (generated by magnitude block 1202). The sign bit is equal to "0" if it is positive and "1" if it is negative. The magnitude bit is compared with a threshold (using comparator 1203). If the magnitude is greater than or equal to the threshold, then comparator 1203 outputs a "1". Otherwise, comparator 1203 outputs a "0". In one embodiment, the sign and the magnitude can be combined (using combine block 1204) to represent 4 levels using a two-bit format (sign, mag), wherein 00=+1, 01=+3, 10=−1, and 11=−3 (which can be compatible with the 2-bit ADC output format). The quantization threshold can be determined from the desired signal size.

Figure 13A:
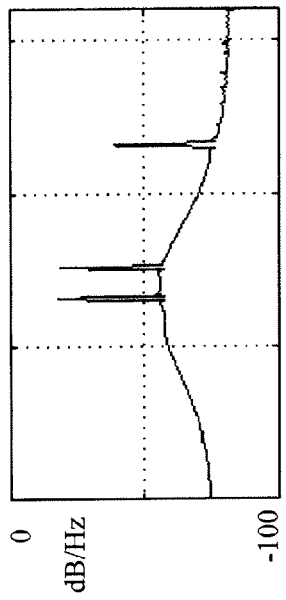
FIGS. 13A-13F illustrates exemplary simulation results for an ADC frequency of 64 MHz and an IF frequency of 6 MHz.
Figure 13B:
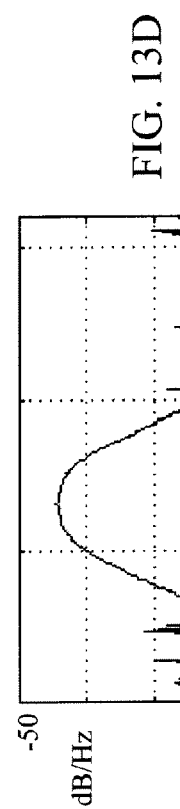
Figure 13C:
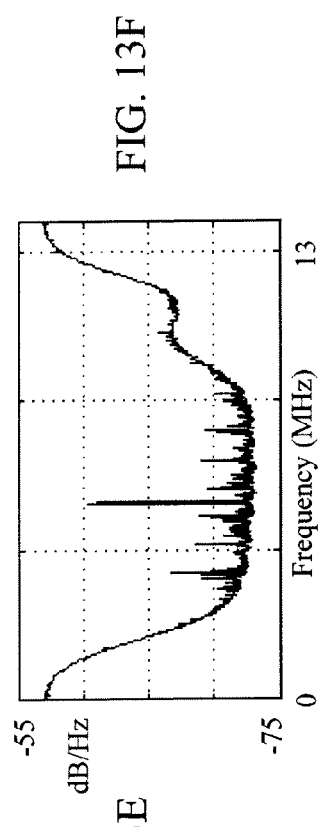
Figure 13D:
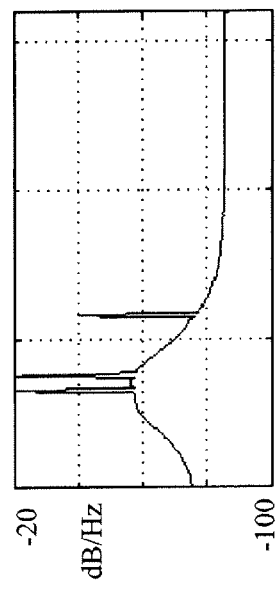
Figure 13E:
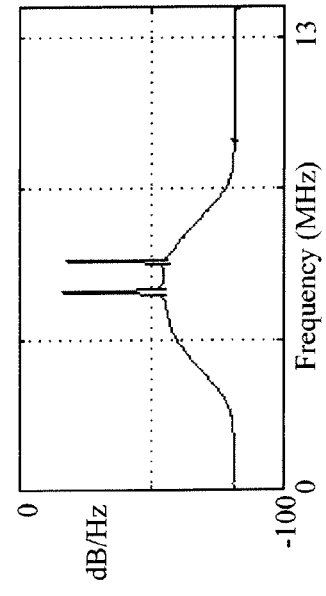
Figure 13F:
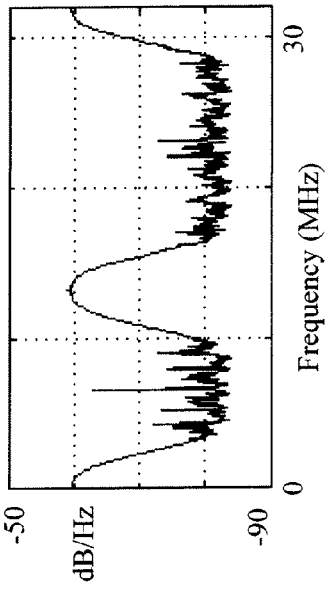
Figure 14A:
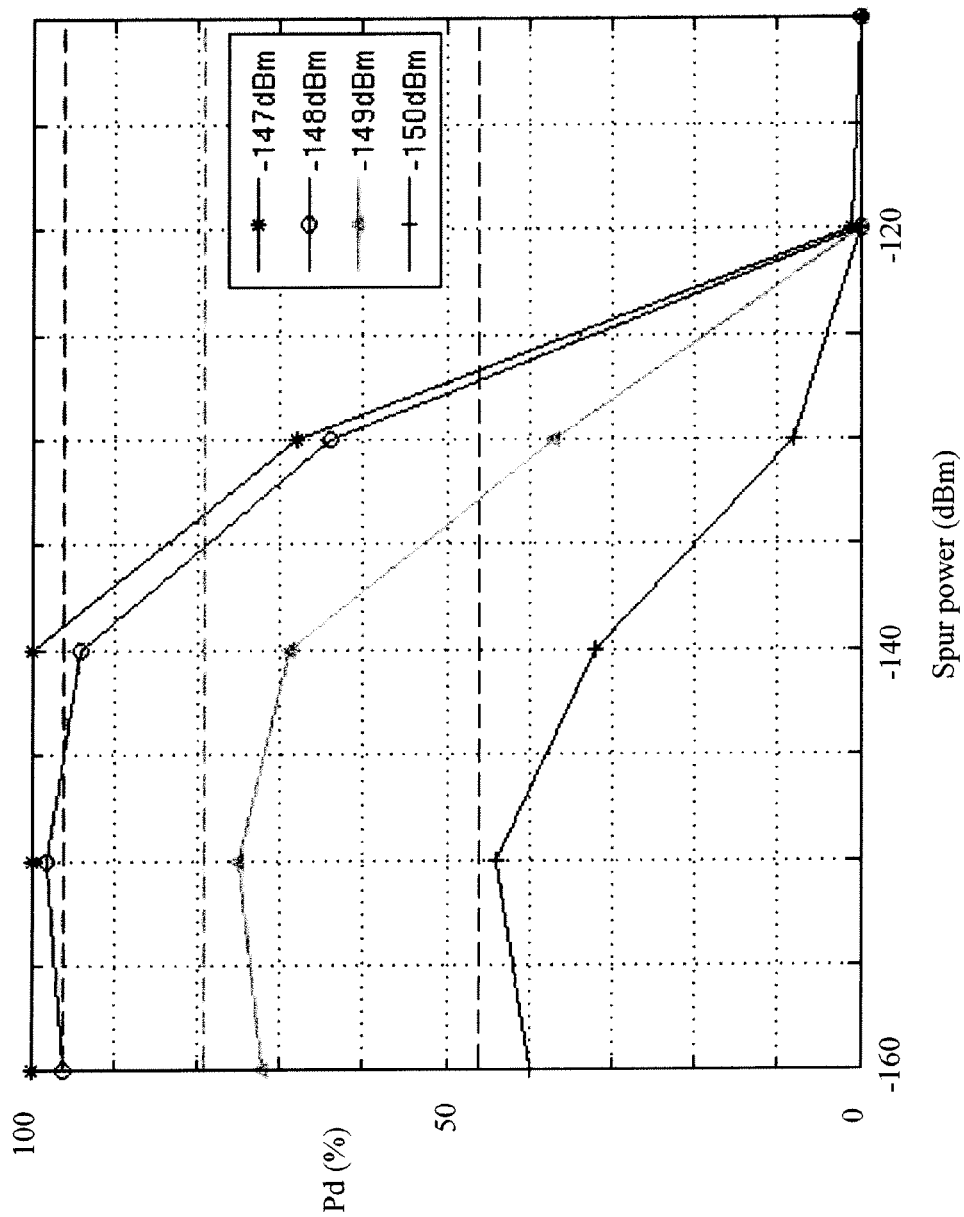
FIG. 14A is a plot showing the SE detection probability (Pd (%)) vs. spur power level for different signal powers.
Figure 14B:
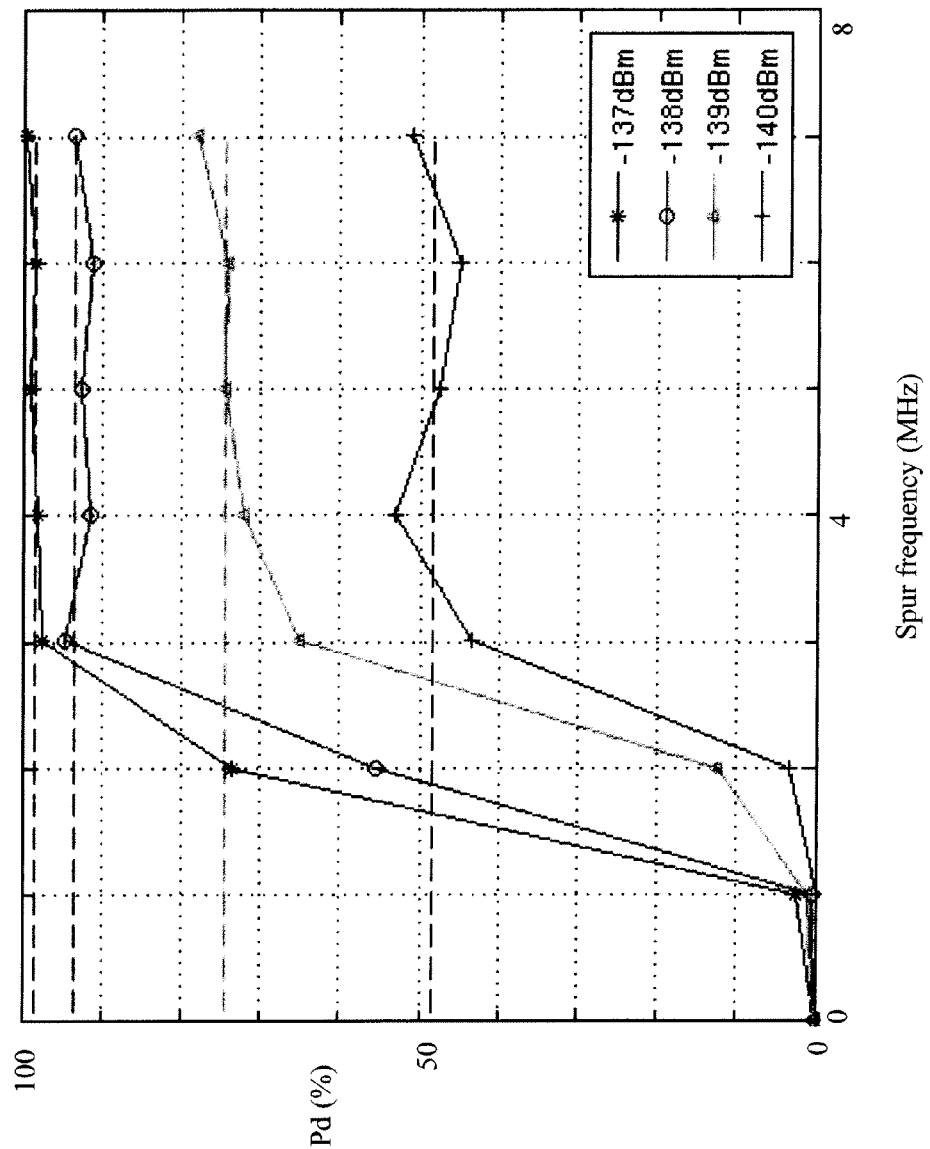
FIG. 14B is a plot showing the SE detection probability (Pd (%)) vs. spur frequency for 4 different signal power levels.
Figure 14C:
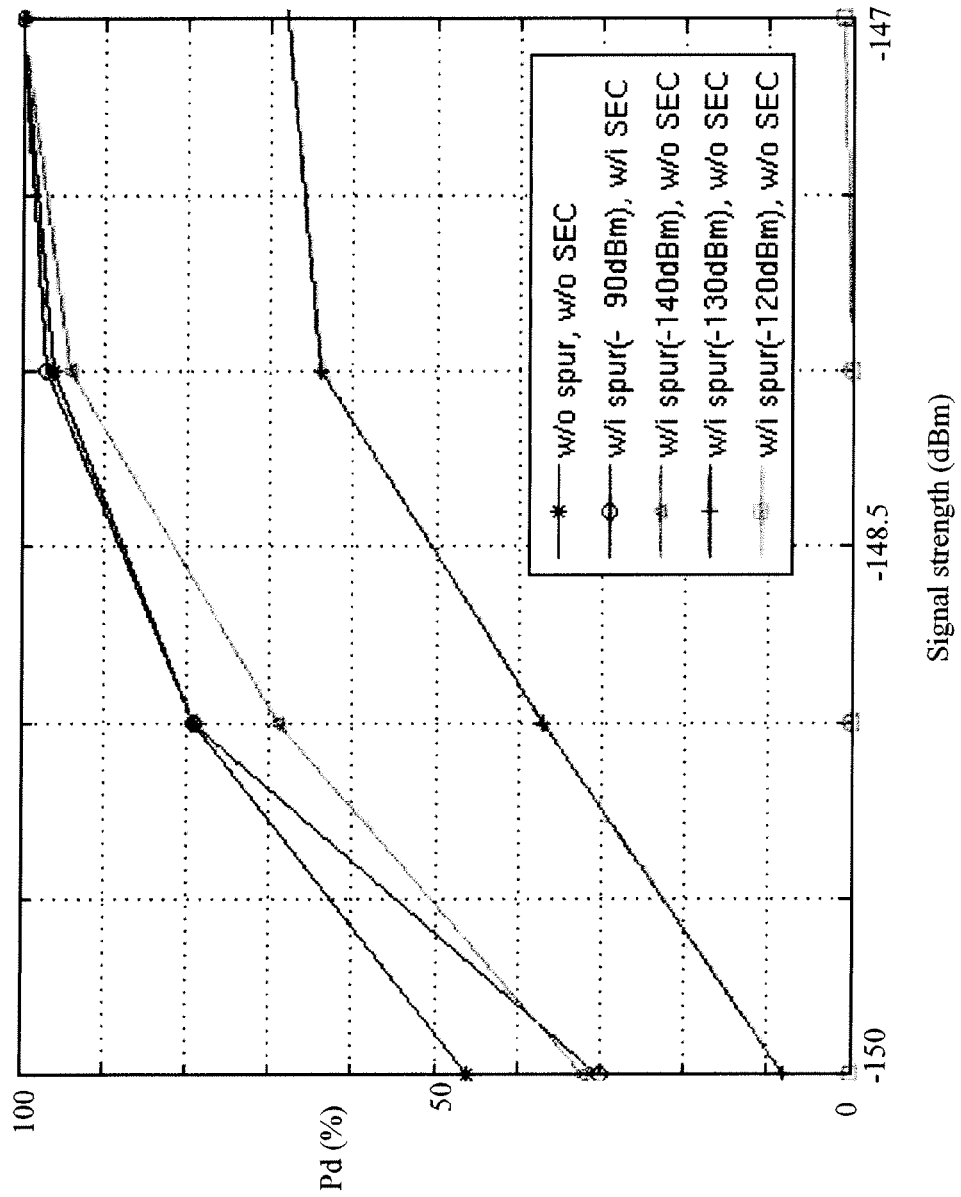
FIG. 14C is a plot showing the SE detection probability (Pd (%)) vs. the signal power (signal indicator) (dBm) for different spurs.
Figure 14D:
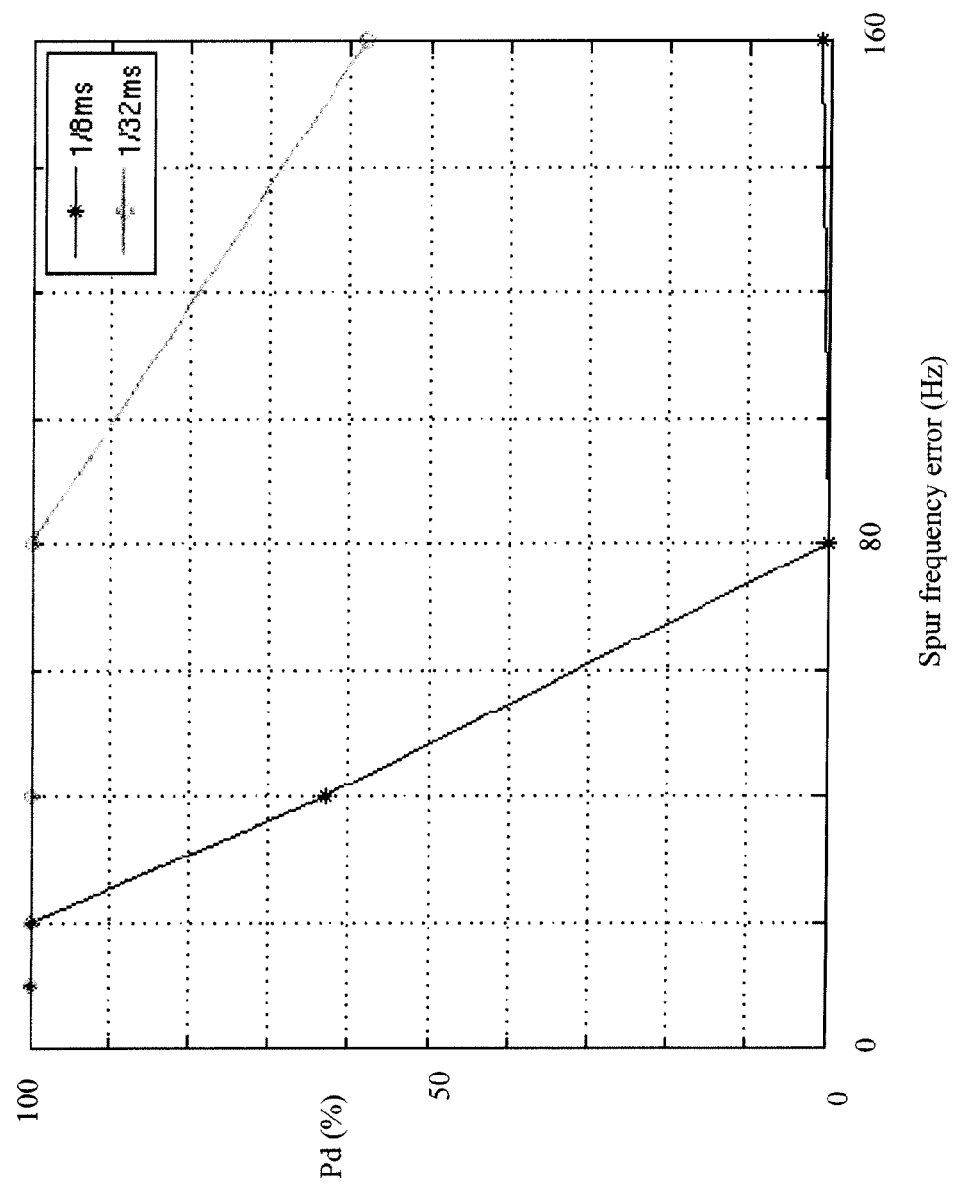
FIG. 14D is a plot showing the SE detection probability (PD(%)) vs. spur frequency error (Hz).

FIGS. 13A-13F illustrates exemplary simulation results for an ADC frequency of 64 MHz and an IF frequency of 6 MHz. In this simulation, there are three spurs in the received signal: at 0, 1, and 5 MHz away from IF, all at the same level of −85 dBm. FIG. 13A is a first plot showing the power spectrum density (PSD) at the output of ADC. FIG. 13B is a second plot showing the PSD at the output of LPF. FIG. 13C is a third plot showing the PSD at the output of the BPF, where the 5 MHz spur is already suppressed by the BPF. FIG. 13D is a fourth plot showing the PSD at the SEC, which is configured to estimate and cancel the two spurs at 0 and 1 MHz away from the carrier. Note that the spurs are barely visible after the cancellation. A few out-of-band spurs at much lower power are created due to the quantization noise in the reconstructed spur. FIG. 13E is a fifth plot showing the PSD at the DM output. The signal at −6 MHz is rotated to DC, and the image at +6 MHz is rotated to +12 MHz. FIG. 13F is a sixth plot showing the PSD at the output of the DFE, where ID2 and 2-bit quantization have taken place. At this point, the signal has been down sampled from 32 Msps to 16 Msps. The noise floor is raised due to the quantization. The bump around 12 MHz (or −4 MHz) is caused by the image noise, but does not affect the in-band signal.

GLO Digital Front End (DFE)

Figure 15:
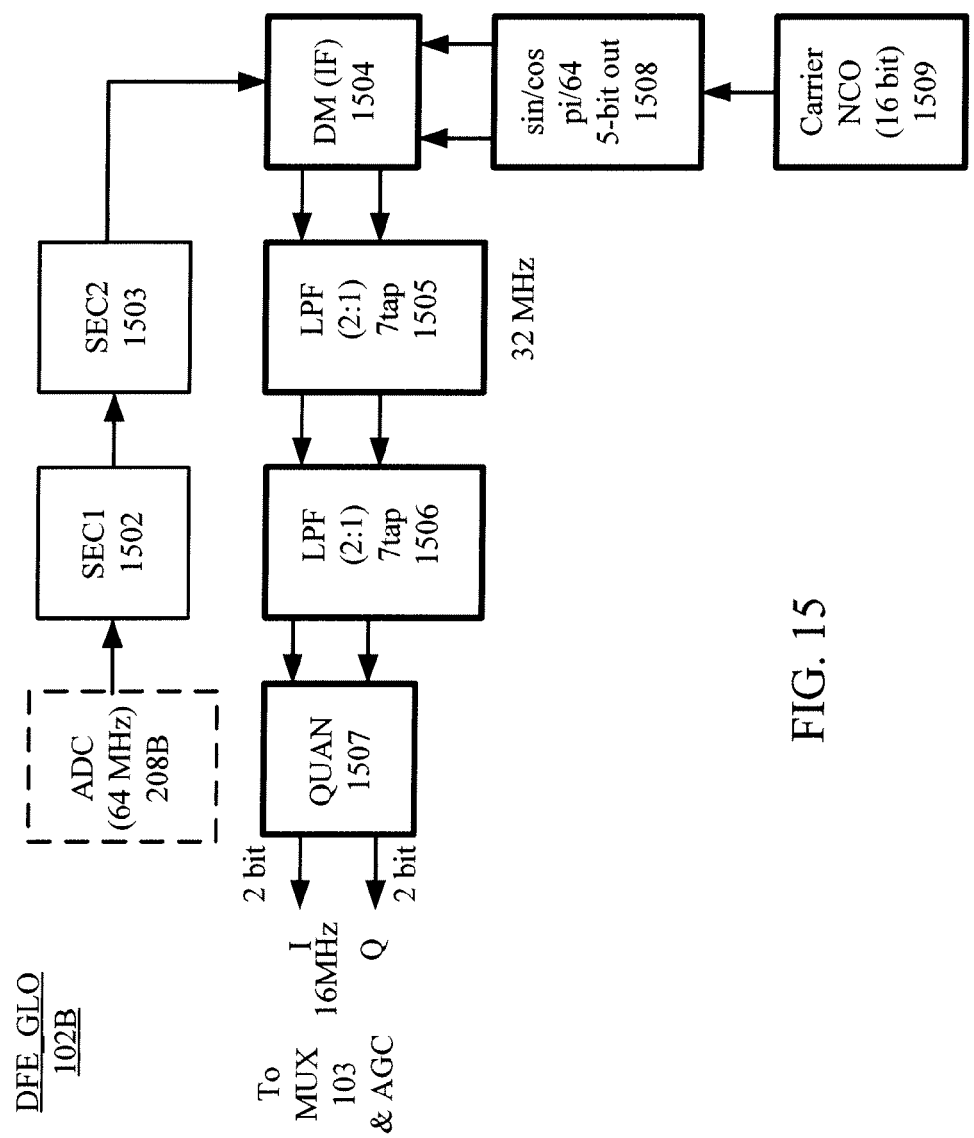
FIG. 15 illustrates an exemplary GLONASS DFE.

FIG. 15 illustrates an exemplary DFE_GLO 102B that has an IF frequency between 19 MHz and 21 MHz, and an ADC sample frequency of 64 MHz. In this embodiment, DFE_GLO 102B (FIG. 1) can include spur estimation and cancellation (SEC) blocks 1502-1503, a digital mixer (DM) 1504, low pass filters 1505-1506, and a quantizer (QUAN) 1507, all coupled in series. Note that SEC 1502 can receive the output of ADC 208B (shown for context). In one embodiment, SECS 1502-1503 can be enabled/disabled independently, as needed, whereas DM 1504, LPFs 1505-1506, and QUAN 1507 can be always enabled.

Figure 16:
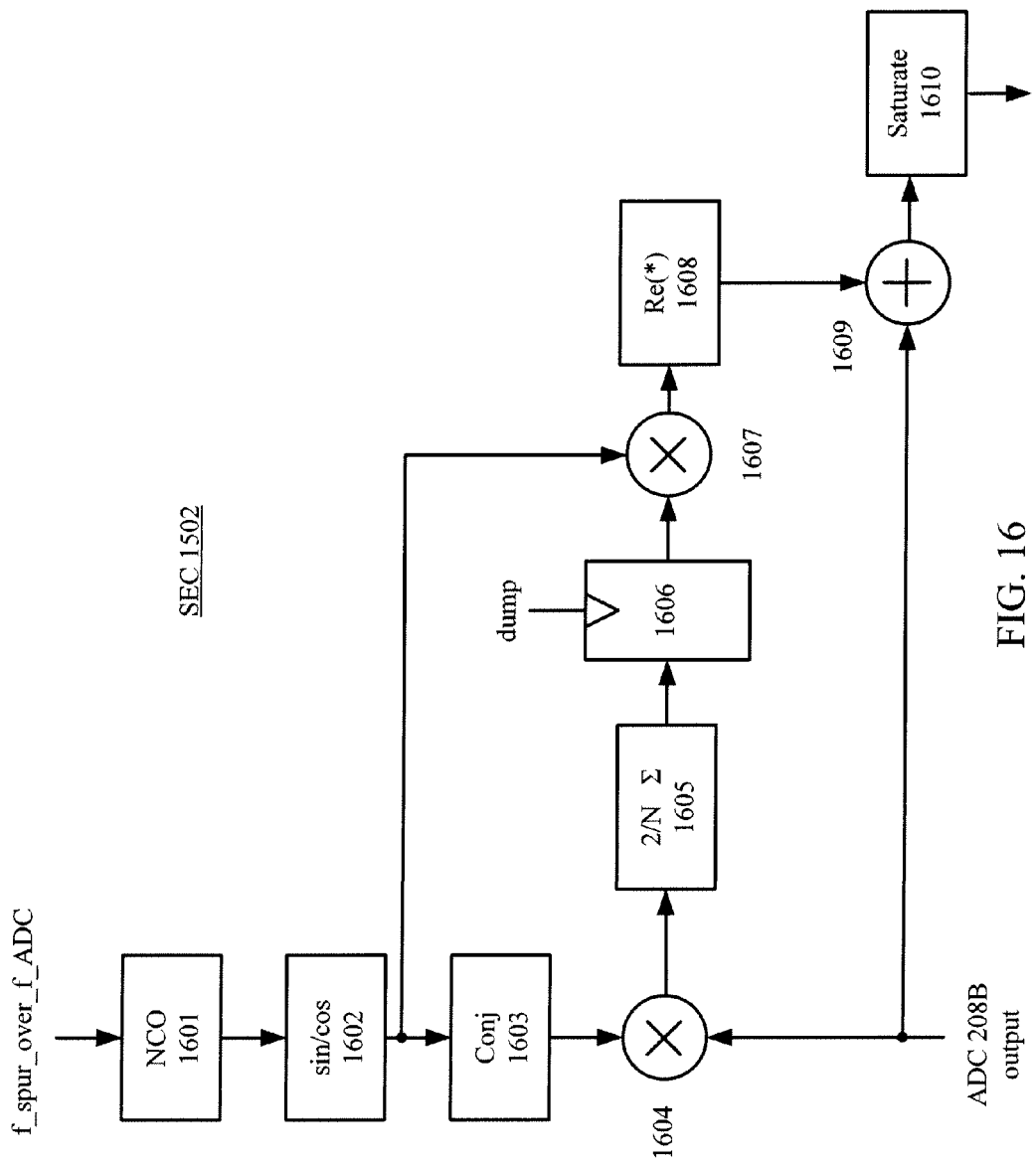
FIG. 16 illustrates an exemplary SEC block for the GLONASS DFE.

FIG. 16 illustrates an exemplary SEC 1502. Note that SEC 1502 can be configured to remove large spurs to reduce the signal dynamic range, but can leave a larger residual spur than the GPS SEC. That is, because GLONASS is FDMA, a bad channel (with higher residual spur power) can be more easily discarded. Keeping full range at the outputs of SECS 1502 and 1503 allows strong out-band spurs and blockers to be suppressed at LPF 1505 and LPF 1506.

In SEC 1502, a numerically controlled oscillator (NCO) 1601 (e.g. 32 bits) can be used to generate the phase of the spur using a received spur frequency. In one embodiment, the maximum sample rate in SEC 1502 can be set to 64 MHz. Note that the spur frequency is signed and no greater than half of the sample frequency.

To get a clean cancellation (e.g. with a residual less than −130 dBm), accurate estimations of the spur amplitude and phase are needed. In one embodiment of a sin/cos table 1602, the angle resolution can be (pi*2)/512, or 128 levels for one quadrant, and the output bit width can be 8. Note that sign extension can be used to cover four quadrants in sin/cos table 1602.

After computing the algorithm of the spur estimation using sin/cos table 1602, this value can be multiplied by the conjugate of the spur phasor (conjugating performed by conjugate generator 1603, and multiplying performed by multiplier 1604). The output of multiplier 1604 can be averaged (by accumulator 1605 and stored in block 1606). In one embodiment, a default size can be N=8192 samples, with a maximum size being $2^{19}$=524288 samples or 8 ms (note that the estimation is updated when the dump signal is asserted to block 1606). To cancel the spur, the complex value stored by block 1606 can be multiplied with the spur phasor using multiplier 1606. The real part of the reconstructed spur (provided by block 1608) can be subtracted from the original signal using adder 1609.

In this embodiment, multiplier 1604 can be implemented by a complex-by-complex multiplier for spur estimation. Accumulator 105 can be in a format that supports the maximum block size. Multiplier 1607 can be implemented by a complex-complex multiplier for spur cancellation. In one embodiment, saturation (block 1610) can be used to round the output of adder 1609 from a value including fractional bits to only integer bits, thereby reducing the bit-width of the downstream DFE_GLO modules (e.g. the DM and the LPFs).

Note that SEC 1503 can be implemented using similar components in a similar configuration as those described above for SEC 1502. Concatenating SECs 1502 and 1503 can allow for estimating and cancelling two separate spurs. If both SECs 1502 and 1503 are enabled, then the spur estimation only occurs after the first spur has been estimated and cancellation has started, thereby ensuring the stability of the estimation and cancellation process.

Figure 17:
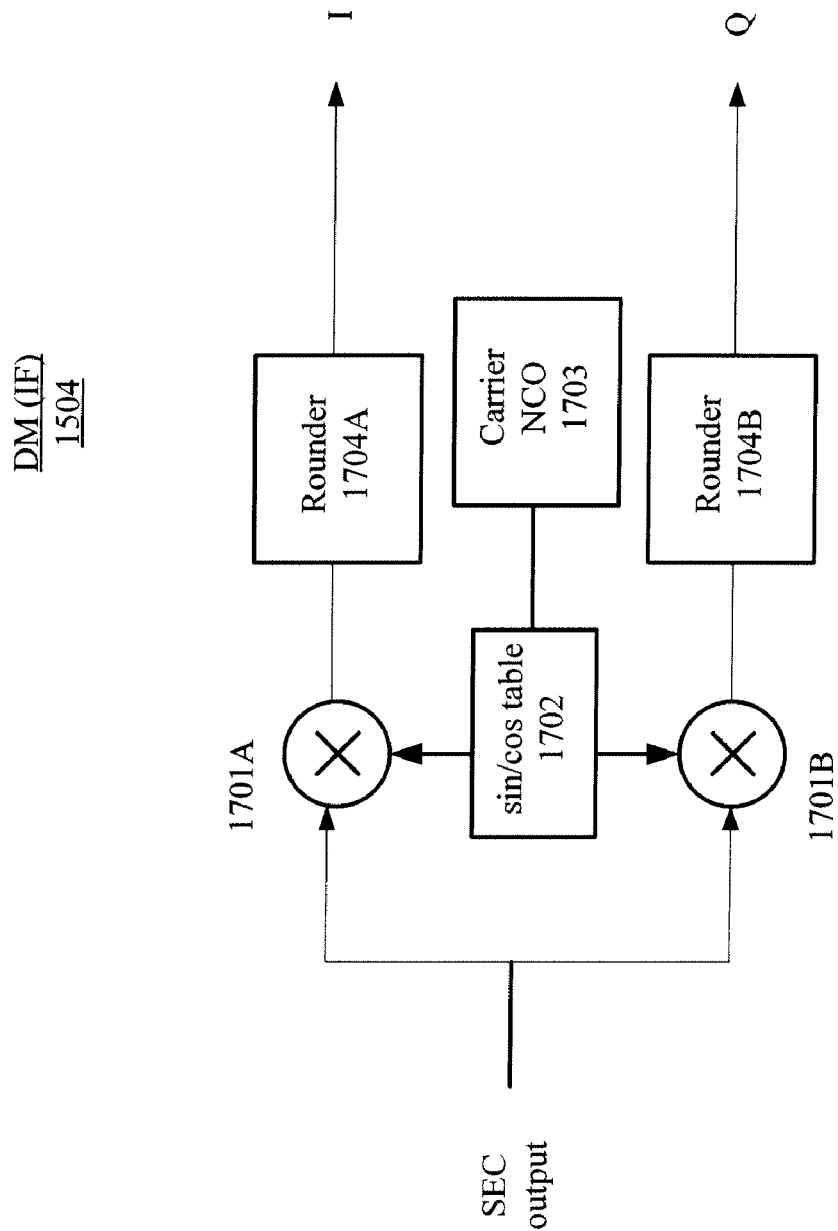
FIG. 17 illustrates an exemplary DM for the GLONASS DFE.

FIG. 17 illustrates an exemplary DM 1504 including two mixers 1701A and 1701B that receive the output of SEC 1503. DM 1504 can convert the pass-band signal centered at IF ($f_0$) to baseband. In one embodiment, a carrier NCO 1703 can be 16 bits wide. The step size of the input frequency can be $f_{step}$=64 MHz/$2^{16}$=976.5625 Hz. Frequency $f_0$ can be set to the middle of the GLONASS band, i.e. midway between channel −1 and channel 0 (20.05 MHz). The minimum post-DM residual frequency offset may be 300 kHz. The digital IF frequency can be computed as:

$$\tilde{f}_0 = \lfloor f_0/f_{step} \rfloor \cdot f_{step}$$

The residual IF frequency due to rounding can be generated by rounding blocks 1704A and 1704B based on the outputs of mixers 1701A and 1701B, respectively, in the dual mode interface.

As shown in FIG. 17, the input signal can be duplicated as an I-path and a Q-path. The I-path is multiplied with cos($2\pi \tilde{f}_0 t$), and the Q-path is multiplied with −sin($2\pi \tilde{f}_0 t$).

Figure 18:
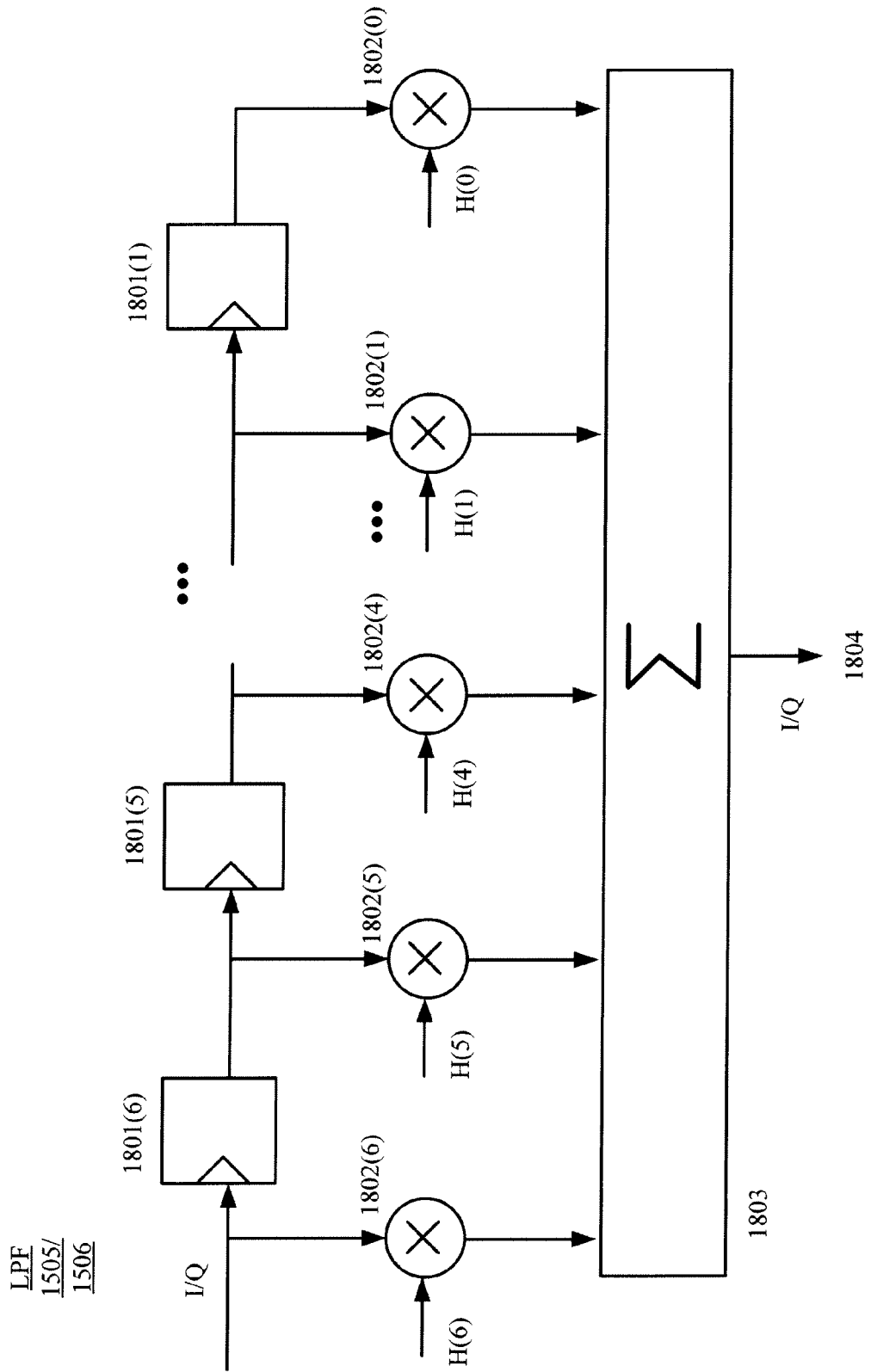
FIG. 18 illustrates an exemplary LPF for the GLONASS DFE.

LPFs 1505 and 1506 can be configured to suppress out-of-band (e.g. 12-32 MHz) blockers and noise by 30 dB. FIG. 18 illustrates an exemplary LPF 1505 including a plurality of registers 1801(1)-1801(6) in a daisy chain and a plurality of multipliers 1802(0)-1802(6), wherein an input to each register is also provided to its associated multiplier (e.g. an input to register 1801(5) is also provided to multiplier 1802(5). Multipliers 1802(0)-1802(6) further receive filter coefficients H(0)-H(6), respectively. In one embodiment, the filter coefficients can be fixed and symmetric about the center tap. The multiplication can be implemented by bit shifts and additions. The output of each tap (i.e. each mixer) can be provided to a accumulation block 1803, which in turn generates an output 1804. Note that due to the 2:1 decimation, only 1 out of every 2 output samples needs to be computed. The decimation can take place at the input by splitting the filter coefficients into two sets (two phases).

LPF 1506 can be configured to provide further filtering at 12 MHz to 16 MHz by 30 dB before the 32 MHz to 16 MHz decimation. In one embodiment, LPF 1506 can have a similar configuration to LPF 1505, but the output of summation block 1813 may have relatively fewer bits. Note that after LPF2/DECI, the signal size can be reduced significantly, so fewer bits can be used for the output. In one embodiment, the fractional bits (in this case four fractional bits) can be kept at the output of LPF 1506 to increase the resolution of the downstream quantizer.

QUAN 1507 can be implemented using a similar configuration to that described for the GPS QUAN (e.g. FIGS. 11 and 12). For example, two 2-bit quantizers at 16 MHz can be used for the I and Q channels. In one embodiment, these 2-bit quantizers can always be on. These quantizers can convert their inputs into 4 levels using 2-bit format (sign, magnitude).

In one embodiment, the GLO C/A code may provide a 27 dB de-spreading gain. The de-spreading gain of a spur depends on its frequency. The maximum de-spreading gain can be achieved for a spur at n kHz away from the signal, where n is integer. The de-spreading gains for all of these n kHz frequency offsets are 13.5 dB.

Deactivation Circuitry

Figure 19:
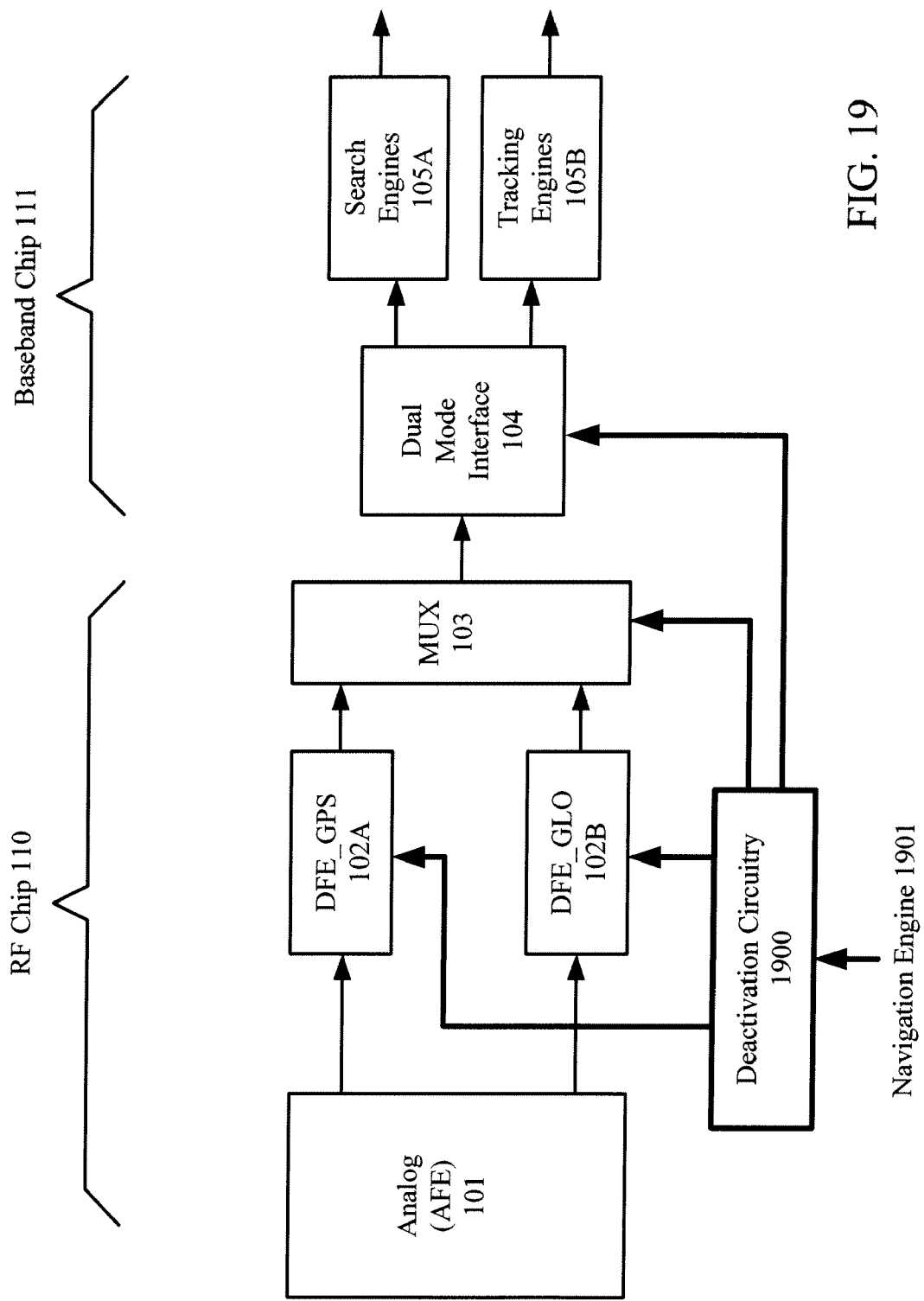
FIG. 19 illustrates deactivation circuitry that can control components of the receiver shown in FIG. 1.

FIG. 19 illustrates deactivation circuitry 1900 that can advantageously control components of the receiver shown in FIG. 1. In one embodiment, deactivation circuitry 1900 can control DFE_GPS 102, DFE_GLO 102B, MUX 103, and dual mode interface 104. Deactivation circuitry 1900 may, in turn, be controlled by a navigation engine 1901 (which is implemented in software). In one embodiment, deactivation circuitry 1900 can power down certain dedicated circuits provided in DFE_GPS 102A, DFE_GLO 102B, and/or dual mode interface 104 when only one of GPS or GLONASS signals are being used by the receiver.

Interface Counter Device & Automatic Gain Control

Figure 20:
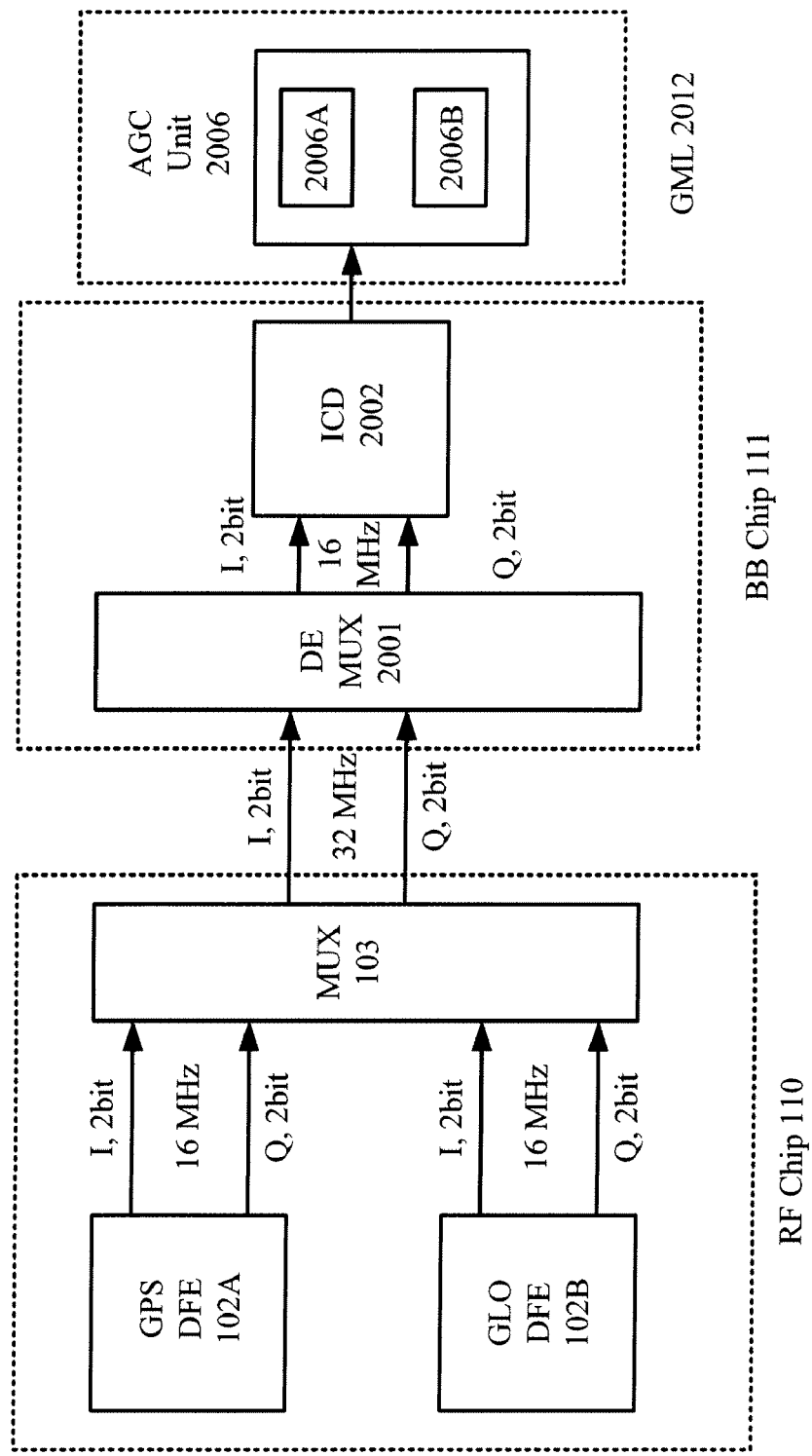
FIG. 20 illustrates a location determination system including multiple chips.

FIG. 20 illustrates a location determination system including RF chip 110 (described above), baseband (BB) chip 111, and a GML (GNSS Measurement Layer SW) 2012. BB chip 111 (in addition to the components described in reference to FIG. 1) can include a demultiplexer 2001 and an interface counter device (ICD) 2002. ICD 2002 can take either the GPS DFE two path (I/Q) 2-bit output, or the GLO DFE two path (I/Q) 2-bit output.

GML 2012 can include an automatic gain control (AGC) unit 2006, which in turn can include GPS AGC 2006A and GLO AGC 2006B (see FIG. 2A). AGC unit 2006 can continuously measure the signal power, compare the measured signal power to the desired target size, and update analog gain stages until the power achieves the target or the maximum number of gain changes is reached. In one embodiment, the AGC power measurement window size can be set from 0.25 ms to 32 ms. In one embodiment, GPS AGC 2006A and GLO AGC 2006B can operate the power measurement at 16 MHz using block lengths between 2048-65536.

ICD 2002 can count the number of +/−3's in a 2-bit data stream with values (−3, −1, +1, +3), and provide that number to GML 2012 for AGC power measurement. AGC unit 2006 can adjust the gain until the ratio of samples with magnitude=3 achieves the desired target. In normal operation (after multiplexing by MUX 103 and demultiplexing by DEMUX 2001), ICD 2002 can measure the I2Q2 output of GPS DFE 102A during GPS AGC operation, or the I2Q2 output of GLO DFE 102B during GLONASS AGC operation. Note that GPS and GLO AGC operations may be done serially, not concurrently, thereby allowing ICD 2002 to be shared by both GPS and GLONASS.

For debugging purpose, ICD 2002 can also be configured to measure the output of other 2-bit quantizers in the system, e.g. the I2Q2 output of the GLONASS channel select mixers (discussed in reference to FIGS. 24 and 25), and the I2Q2 output of the coarse Doppler wiper (see mixer 2603 in FIG. 26) in search engines 105A, to calibrate the 2-bit quantizer thresholds.

Figure 26:
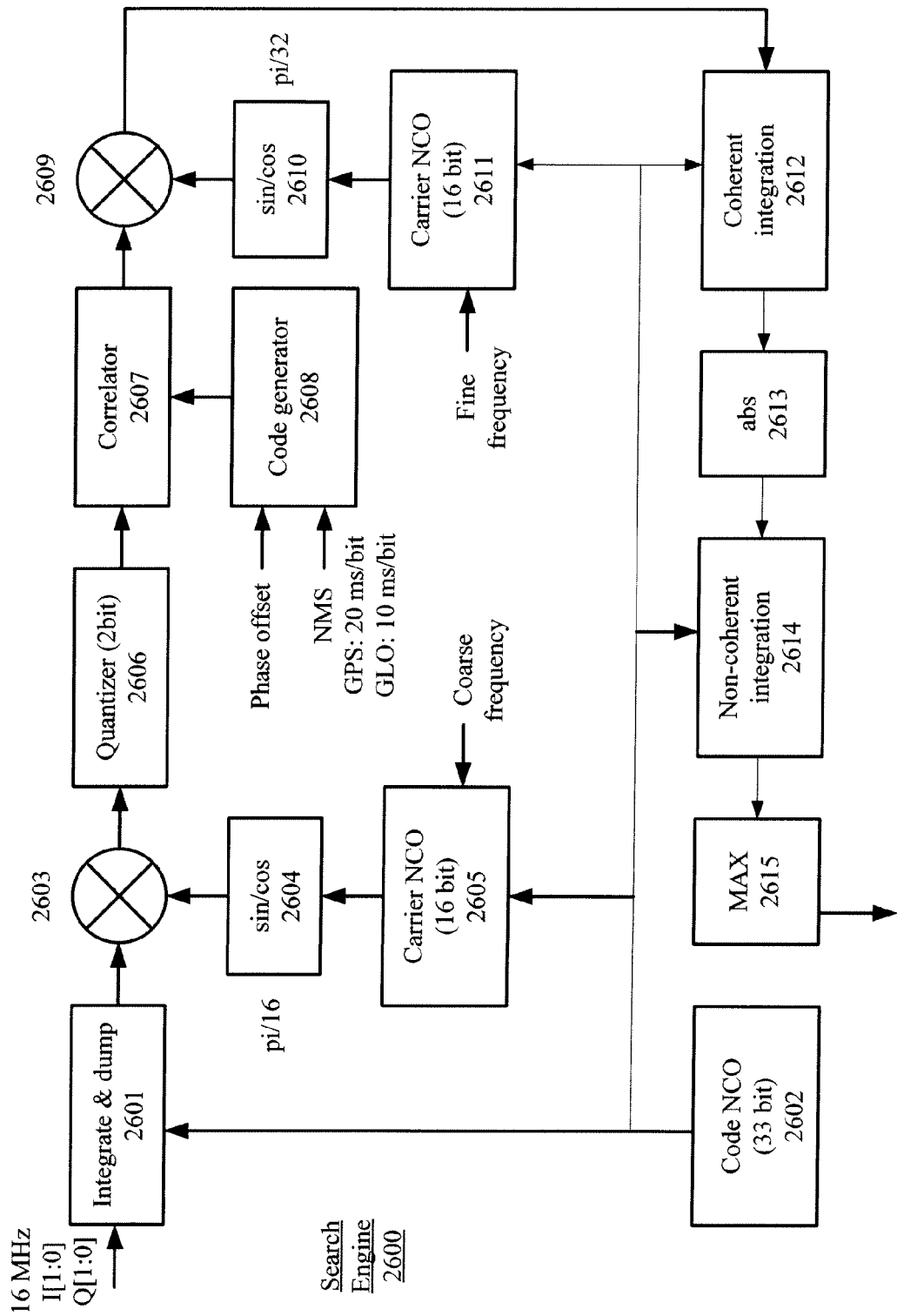
FIG. 26 illustrates an exemplary search engine.

For example, referring to an exemplary search engine 2600 shown in FIG. 26, a module inside search engines 2600 may quantize the coarse Doppler wiper 2603 (IR coarse mixer) output to 2 bits. The quantization threshold depends on the DFE and the search engine operation mode because the DFE and search engine operation mode changes the noise power spectrum density and thus the output signal size of an I&D block 2601 in search engine 2600. The more narrow band the noise is, the more correlated the samples are, and the higher the output is after integrate and dump (I&D). The higher the output at I&D block 2601, the higher the output at IR coarse mixer 2603, thereby needing a higher quantizer threshold. In one embodiment, a 2-bit quantization threshold (equal to the RMS of the input signal) can lead to approximately 33% of the output samples being +/−3. Thus, monitoring the output of quantizer 2606 can advantageously allow optimizing the threshold in hardware.

In one embodiment, a 4:1 multiplexer (not shown, used for debugging ICD 2002) can receive: (1) I2Q2 output of DFE_GPS 102A, (2) I2Q2 output of DFE_GLO 102B, (3) I2Q2 output of GLONASS channel select mixers 2403 (any of 12 mixers), and (4) I2Q2 output of the coarse Doppler wiper output (e.g. mixer 2603).

Figure 21:
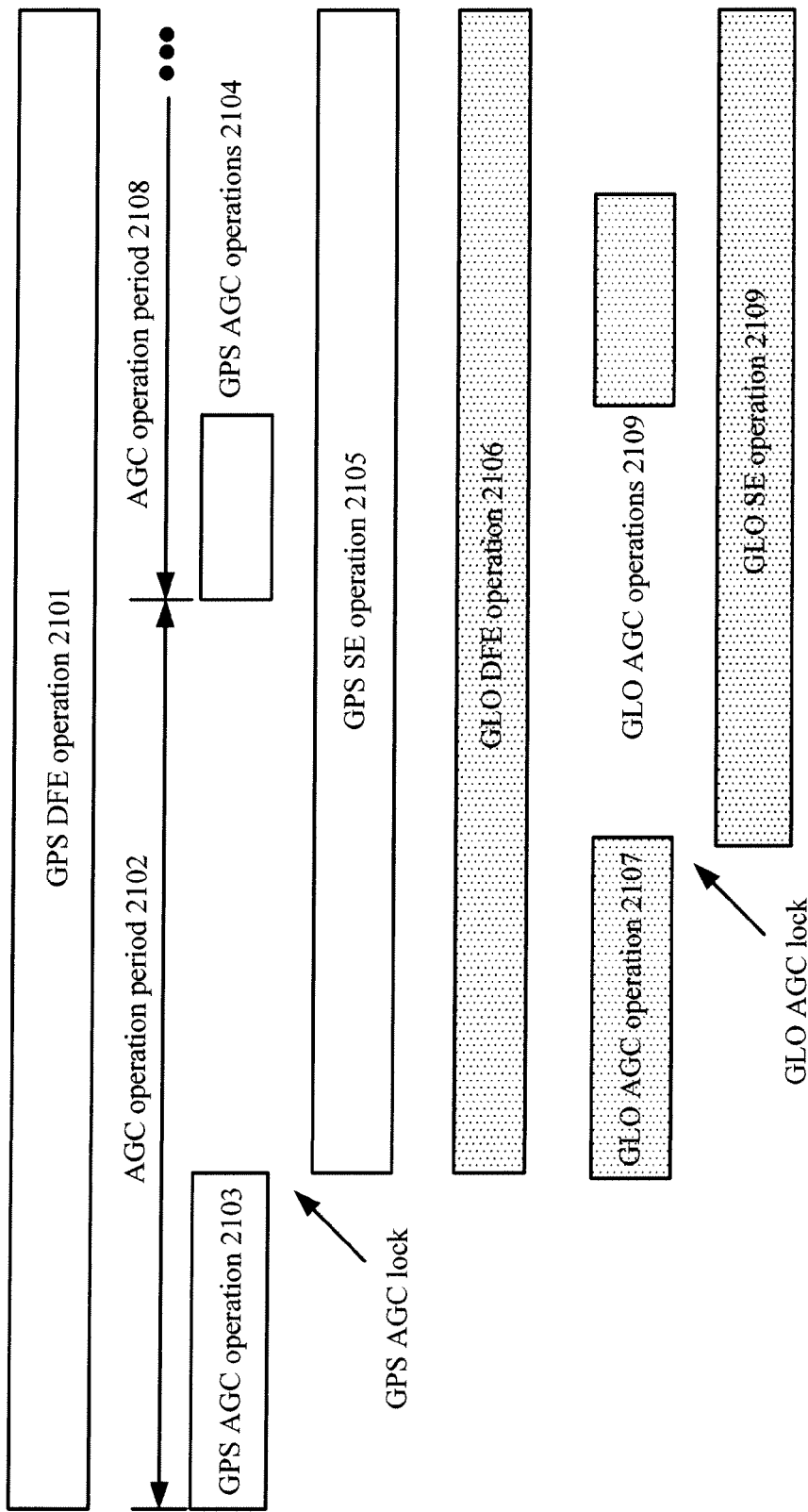
FIG. 21 illustrates an exemplary timing diagram of a GPS DFE operation and a GLO DFE operation.

FIG. 21 illustrates an exemplary timing diagram of a GPS DFE operation 2101 and a GLO DFE operation 2106. In one embodiment, the GPS AGC (e.g. GPF AGC 2006A) can control the gain of the LNA (e.g. LNA 201), which is shared by GPS and GLONASS. To avoid race conditions as well as performance degradation of the GPS AGC, the GLONASS AGC power measurement can occur after GPS AGC operation. For example, during one AGC operation period 2102, a GPS AGC operation 2103 can be performed. After a resulting GPS AGC lock, GPS spur estimation (SE) 2105 can begin. At the same time, a GLO DFE operation 2106 and a GLO AGC operation 2107 can begin. After a resulting GLO AGC lock, a GLO SE operation 2109 can begin.

Figures 22, 23:
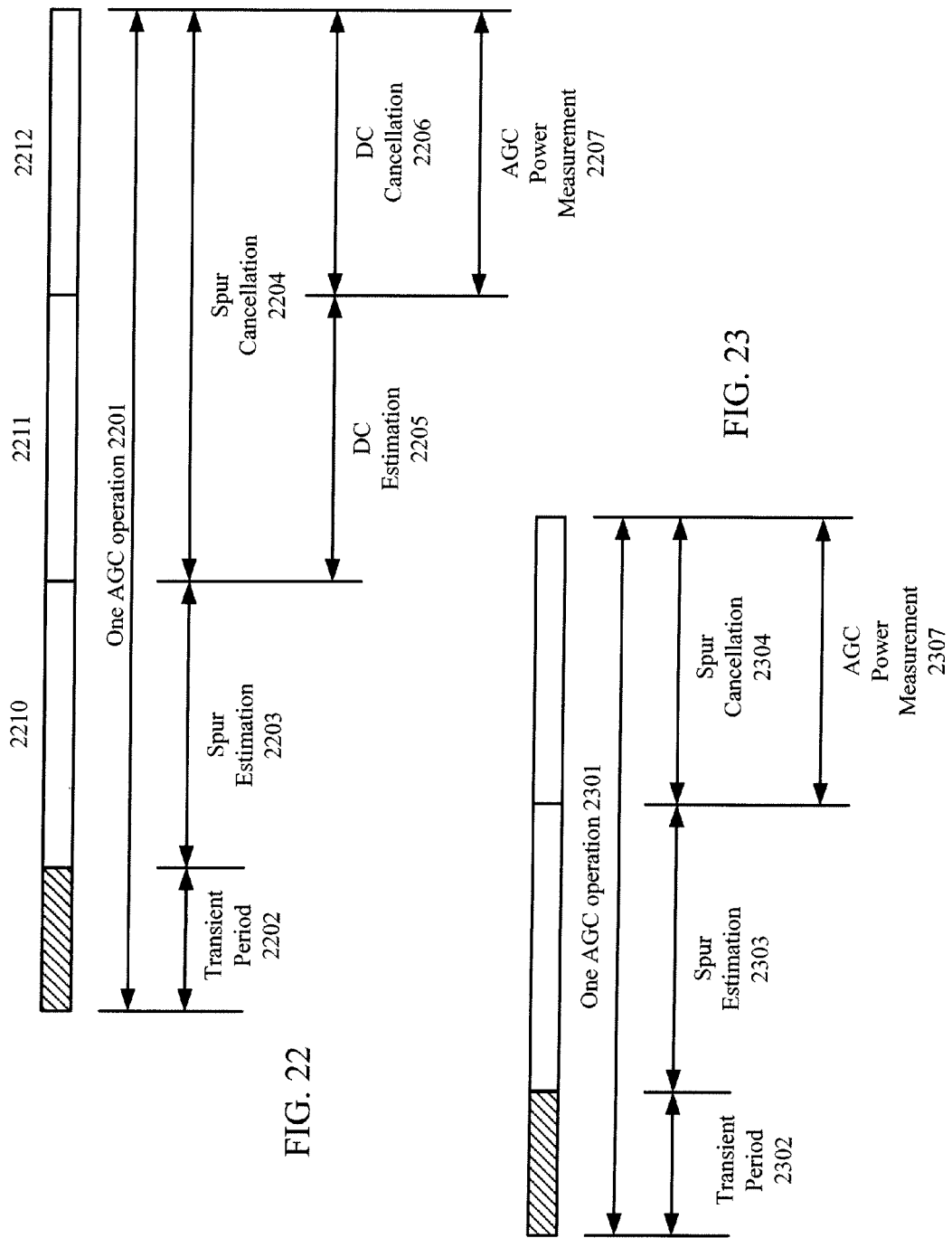
FIG. 22 illustrates an exemplary GPS AGC operation.
FIG. 23 illustrates an exemplary GLONASS AGC operation.

FIG. 22 illustrates an exemplary GPS AGC operation 2201. A transient period 2202 precedes a spur estimation period 2203 and a spur cancellation period 2204. Transient period 2202, which includes invalid data, occurs after hardware reset or a gain change. Therefore, DFE operations take place only after transient period 2202. In this embodiment, GPS DFE can include both spur estimation (and cancellation) as well as DC estimation (and cancellation). To avoid interference from spur estimation to DC estimation, which could be an issue when a spur is close to DC, DC estimation period 2205 occurs after spur estimation period 2203. DC cancellation period 2206 follows DC estimation period 2205. Thus, a first block of samples 2210 can be used for spur estimation, a second block of samples 2211 has spur cancellation can be used for DC estimation, and a third block of samples 2212 (and all subsequent blocks of samples) have both spur and DC cancellation and can be used during an AGC power measurement period 2207. Note that one spur estimation period 2203 and spur cancellation period 2204 are shown in FIG. 22 for simplicity. Thus, when both SEC units are used, a second spur estimation period would follow first spur estimation period 2203, wherein DC estimation and cancellation period would begin only after the second spur estimation period (i.e. during the second spur cancellation period).

FIG. 23 illustrates an exemplary GLONASS AGC operation 2301. A transient (invalid data) period 2302 precedes a spur estimation period 2303 and a spur cancellation period 2304. Note that the GLONASS DFE has no DC estimation or cancellation. Therefore, a GLONASS AGC power measurement period can occur after spur estimation period 2303 is complete (assuming that spur estimation is enabled). This timing can advantageously prevent spur interference with AGC power measurement.

In one embodiment, spur estimation for GPS and GLONASS, and DC estimation for GPS can be run after hardware reset and before every AGC power measurement. Subsequently, spur and DC estimation can be repeated periodically after a predetermined number of blocks. In one embodiment, if the predetermined number of blocks is set to 0, then the estimations are only run once and not repeated. If the period is 1, then the estimations are done for every block, or continuously.

The GPS and GLONASS AGC operations can be performed periodically. In one embodiment, these operations can be repeated during each subsequent AGC operation period. For example referring back to FIG. 21, during a subsequent AGC period 2108, a GPS AGC operation 2104 can precede a GLONASS AGC operation 2109 (other operations not shown for simplicity). Note that if any spur or DC estimation is on going at that time, then the spur or DC estimator can be reset and start a new estimation.

Dual Mode Interface

Figure 24:
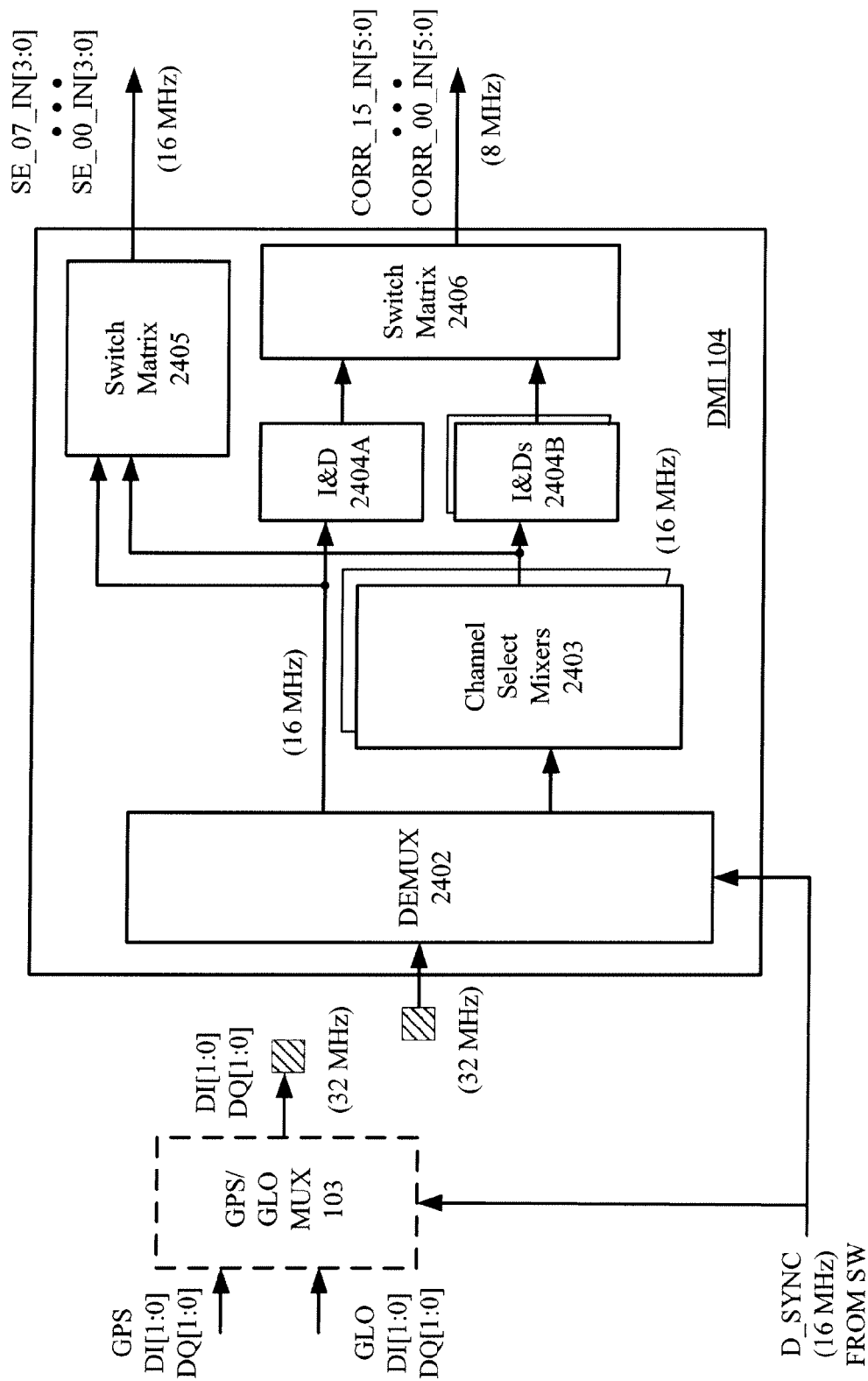
FIG. 24 illustrates an exemplary dual mode interface (DMI).

Referring back to FIG. 1, dual mode interface (DMI) 104 can provide the processed DFE output signals to search engines 105A and tracking engines 105B. FIG. 24 illustrates an exemplary DMI 104 including demultiplexer (DEMUX) 2402, channel select mixers 2403, two integrate and dump (I&D) units 2404A and 2404B, a first switch matrix 2405, and a second switch matrix 2406. MUX 103 (shown for context) multiplexes the two 16 MHz GPS and GLO signals together at the output of RF chip 110 (see FIG. 1). Therefore, DEMUX 2402 can separate the two signals at the input of baseband chip 111.

GLONASS is an FDMA system that supports 14 channels. Channel select mixers 2403 can be used to down-convert the GLONASS signals to baseband (e.g. at or substantially at DC). The center frequencies of those 14 channels are:

$$f_k = 1602 \text{ MHz} + (k \times 562.5) \text{kHz}$$

where k is −7, −6, −5, . . . , 5, 6.

The GLONASS channel spacing is 562.5 kHz. In one embodiment, the local oscillator (LO) frequency is 1581.67 Hz, and the DMI frequency is 20.05 MHz. Thus, the input frequency in front of each of channel select mixers 2403 is:

$$f_k = 280 \text{ MHz} + (k \times 562.5) \text{kHz}$$

where k is −7, −6, −5, . . . , 5, 6.

Figure 25:
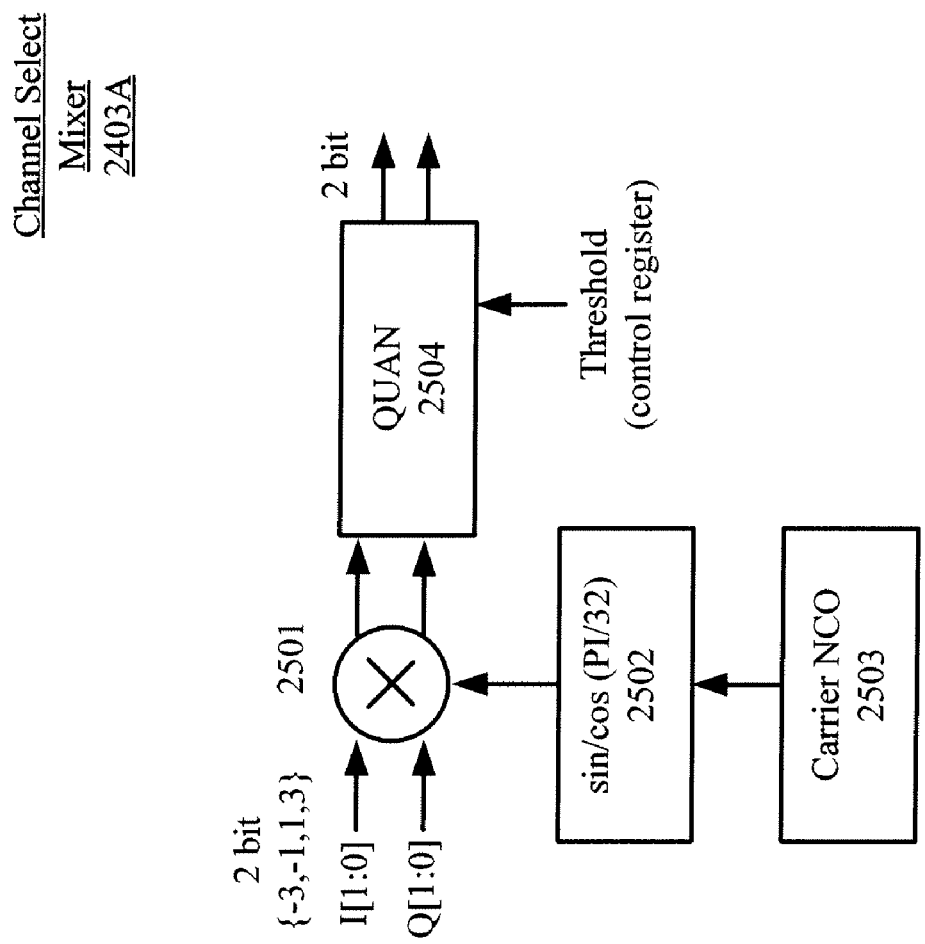
FIG. 25 illustrates an exemplary channel select mixer for the DMI.

FIG. 25 illustrates an exemplary channel select mixer 2403A that uses the 16 bits of a carrier NCO 2503 for convenience to give approximately 250 Hz resolution. The programmed channel frequency can be computed as follows:

$$f\_mixer\_floored_k = \lfloor (f_k - f\_mixer\_offset\_min) / f\_step \rfloor \times f\_step$$

$$f\_step = f\_in / 2^{16}$$

where f_in is the input sampling rate for channel select mixer 2403 (e.g. around 16 MHz).

Multiplier 2501 multiplies the I/Q signals by the 5 bits and provides that product to a quantizer (QUAN) 2504. FIG. 12 illustrates an exemplary configuration for QUAN 2504. Note that in this embodiment, only the magnitude bits are counted for a power determination. That is, in a conventional power determination, both the sign and the magnitude are squared and accumulated. Because only three levels are possible in GLONASS, this process can be advantageously simplified by counting only the magnitude bits and providing this information to multiplier 2501.

In one embodiment, the first (i.e. sign) bit is equal to "0" if it is positive, and equal to "1" if it is negative. The magnitude, which is the second bit, can be compared in QUAN 2504 with a threshold. If the magnitude is greater than the threshold, then the output is "1". Otherwise, the output is "0". The sign and the magnitude can be combined together to represent 4 levels using two-bit format (sign, magnitude), where 00=+1, 01=+3, 10=−1, and 11=−3. In one embodiment, an optimal the threshold of QUAN 2504 is 29. This threshold can be programmable via a control register.

Integrate and dump (I&D) blocks 2404A and 2404B can be implemented as 2 bit in and 3 bit out modules that perform 16 MHz to 8 MHz decimation on the outputs of DEMUX 2402 and channel select mixer 2403. In one embodiment, there is one I&D block 2404A for GPS, and 14 I&D blocks 2404B for GLONASS (i.e. one I&D block for each channel select mixer). Note that GLONASS has a lower chipping rate, i.e. 511 chips/ms, than GPS at 1023 chips/ms. Therefore, in one embodiment, I&D 2404A may have a different dump time than I&Ds 2404B. In another embodiment, both I&D 2404A and I&Ds 2404B may have a fixed 2:1 ratio, e.g. input 16 MHz, output 8 MHz. In one embodiment, the dump times can be programmable and determined by software.

Switch Matrix 2405 can be configured to generate the desired signal from the total number of paths (e.g. 15 paths: 1 for GPS, plus 14 for GLONASS) for each search engine. In one embodiment, switch matrix 2405 can be configured to receive the outputs of DEMUX 2402 and channel select mixers 2403 and select outputs SE_00_IN [3:0] through SE_07_IN [3:0] for the search engines. In one embodiment, the size of switch matrix 2405 can be 15×8 with 4 bits and 16 MHz for each element.

Switch matrix 2406 can receive the outputs of I&Ds 2404A and 2404B and generate outputs CORR_00_IN [5:0] through CORR_15_IN [5:0] for the tracking engines. In another embodiment, channel select mixers 2403 can be hard wired to each of the tracking engines because each channel selection mixer can be programmed to any channel. Note that the final number of channel select mixers, search engines, and tracking channels may change based on hardware cost. For example, in one embodiment, 14 channel selection mixers and 16 tracking engines can be used.

FIG. 26 illustrates an exemplary search engine 2600 that can form part of search engines 105A (FIG. 1). In this embodiment, search engine 2600 can include an integrated and dump (I&D) unit 2601, a mixer 2603, a quantizer 2606, a correlator 2607, a mixer 2609, a coherent integration block 2612, an absolute value block 2613, a non-coherent block 2614, and a MAX block 2615 (which provides an output of search engine 2600), all coupled in series. A code NCO 2602 can provide inputs to I&D 2601, two carrier NCOs 2605 and 2611, coherent integration block 2612, and non-coherent integration block 2614. Carrier NCOs 2605 and 2611 provide their outputs to sin/cos tables 2604 and 2610, respectively, which in turn provide their outputs to mixers 2603 and 2609, respectively. Exemplary operations performed by search engine 2600 (shown in further detail in FIG. 27) include: integrating/dumping, mixing with coarse carrier frequency, 2 bit quantizing, mixing with reference code and correlating, mixing with fine carrier frequency, coherent integration (including data shift), calculation of absolute value, non-coherent integration (including data shift), and calculation of maximum value.

In one embodiment, correlator 2607 can be implemented using a shift register delay line, which compares its stored bits to the C/A code bits received from code generator 2608 (i.e. GPS code generator 2608A or GLONASS code generator 2608B, described below in reference to FIGS. 29 and 30). Note that code generator 2608 receives a phase offset (i.e. selects certain outputs of the G2 generator for the phase selector, described below) as well as an NMS (navigation message sequencer). In one embodiment, correlator 2607 can provide a correlated result every 1 ms and coherent integration can be performed for less than 20 ms (otherwise, the coherent integration could interfere with a bit transition associated with a data signal).

In one embodiment, the NMS can allow a higher sensitivity acquisition mode. Specifically, when the bit boundary and the polarity of the data bits are known, then a longer coherent integration can be performed. Note that the signal-to-noise ratio (SNR) is boosted more efficiently by coherent integration compared to non-coherent integration (because the noise for coherent integration cancels out over time, but not for non-coherent integration). Therefore, given a set time for integration, coherent integration is typically preferred over non-coherent integration. As a result, if the bit polarity is known (and is provided by NMS), then the C/A code output by code generator 2608 can be modulated by the polarity of the bits before being correlated by 2607, thereby allowing longer coherent integration to be performed by coherent integration block 2612.

Note that because the code frequency for GLONASS is half the frequency of GPS, the output sampling rate of the first integrate and dump (associated with I&D block 2601) for GLONASS is half the output sampling rate of GPS. For example, for ½ chip resolution, the output sampling rate is 2 MHz for GPS and 1 MHz for GLONASS. For ¼ chip resolution, the output sampling rate is 4 MHz for GPS and 2 MHz for GLONASS.

A signal can be quantized by a quantizer 2606 after coarse Doppler wiper (i.e. mixer 2603) from multiple bits to 2 bits. One optimized 2-bit quantization threshold is equal to the root-mean-square (RMS) of the input signal. Note that a different noise shape may change the output signal size of I&D block 2601. The usage of LPF 402 and BPF 404 (FIG. 4) may change the noise power spectrum. The four configurations of DFE_GPS 102A that can change the noise shape are: ADC 208A runs at 64 MHz, LPF 402 is used, and BPF 404 is used; ADC 208A runs at 64 MHz, LPF 402 is used, and BPF 404 is bypassed; ADC 208A runs at 32 MHz, LPF 402 is bypassed and BPF 404 is used; ADC 208A runs at 32 MHz, LPF 402 is bypassed and BPF 402 is bypassed.

On the other hand, the % or ½ or ¼ I&D operation mode may affect the RMS of the output size of I&D block 2601. Therefore, I&D block 2601 can have four operation modes: in GPS ½ chip mode, I&D block 2601 can perform 16 MHz to 2 MHz conversion (8:1 decimation); in GPS ¼ chip mode, I&D block 2601 can perform 16 MHz to 4 MHz conversion (4:1 decimation), in GLO ½ chip mode, I&D block 2601 can perform 16 MHz to 1 MHz conversion (16:1 decimation), and in GLONASS ¼ chip mode, I&D block 2601 can perform 16 MHz to 2 MHz conversion (8:1 decimation).

Figure 27:
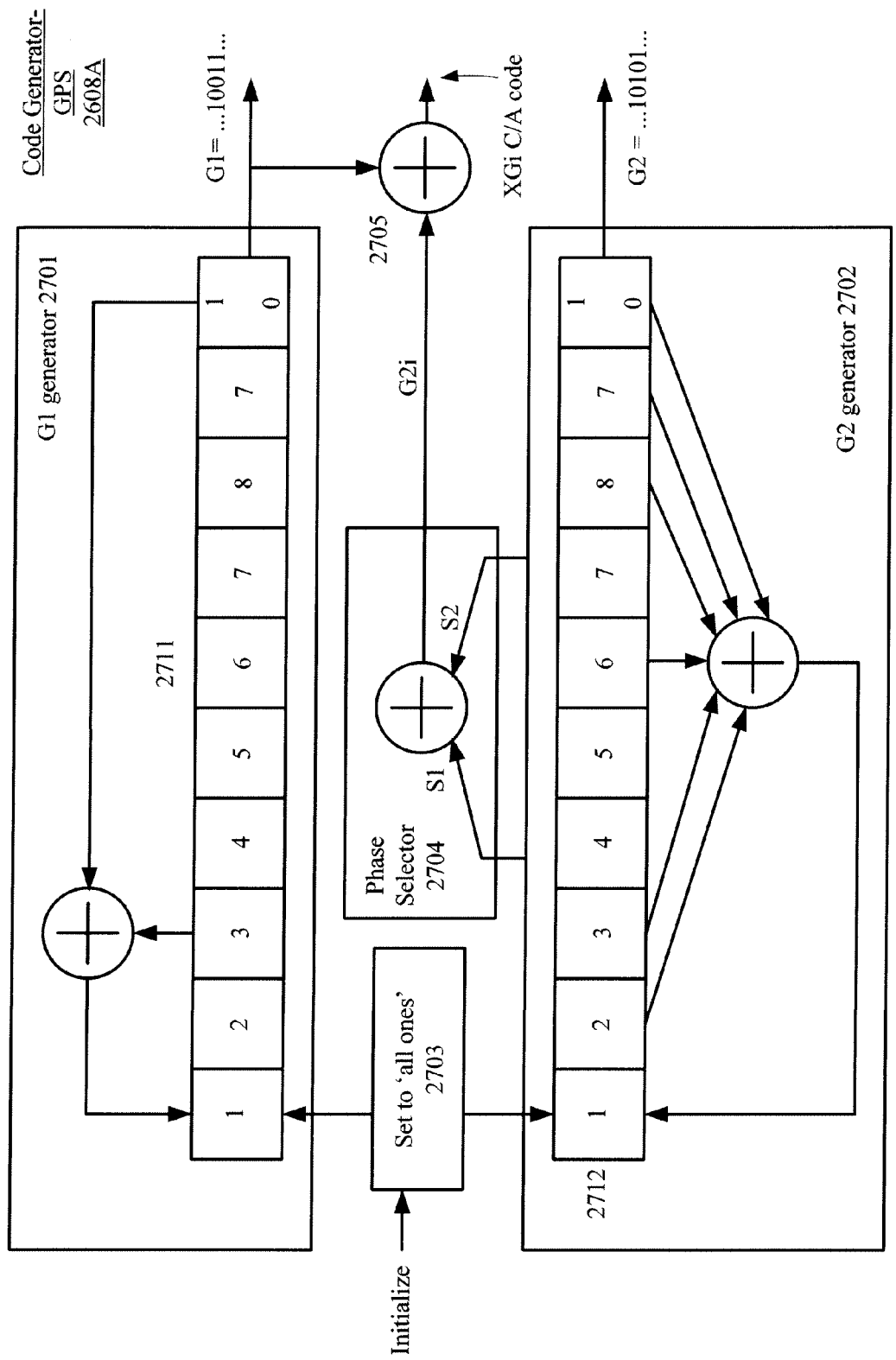
FIG. 27 illustrates an exemplary GPS code generator.

FIG. 27 illustrates an exemplary code generator 2608A for GPS (code generator 2608A forming part of code generator 2608, FIG. 26). In this embodiment, code generator 2608A includes a G1 generator 2701 for generating the G1 code, a G2 generator 2702 for generating the G2 code, an initialize block 2903, a phase selector 2704, and an adder 2705 for generating the XGi C/A code. Note that in phase selector 2704, S1 and S2 indicate which bits of shift register 2712 of G2 generator 2702 are added to create the G2$i$ output at each epoch. Further note that S1 and S2 are different for the different satellites. For example, PRN 1 can be generated by adding bits 2 and 6 from shift register 2712 to form the G2$i$ bit, whereas PRN 2 can be formed by adding bits 3 and 7 to form the G2$i$ bit. The XGi C/A code can be created by:

Loading both the shift registers (2711 and 2712) in G1 generator 2701 and G2 generator 2702 with all ones using initialize block 2703.

Computing the sums from all the XOR operations to determine the output bit for the current epoch.

Shifting both registers of G1 generator 2701 and G2 generator 2702 one element to the right.

Loading the leftmost elements of G1 generator 2701 and G2 generator 2702 with the appropriately calculated bits from just prior to the shift.

Going back to step 2.

The C/A code sequences for GPS are combined by XOR-ing two PRN sequences G1 and G2. The code frequency is around 1.023 MHz. In one embodiment (shown in FIG. 27), the polynomials corresponding to the LFSRs, which generate G1 and G2, are $$G1(x)=1+x^3+x^{10}$$

$$G2(x)=1+x^2+x^3+x^6+x^8+x^9+x^{10}$$

Figure 28:
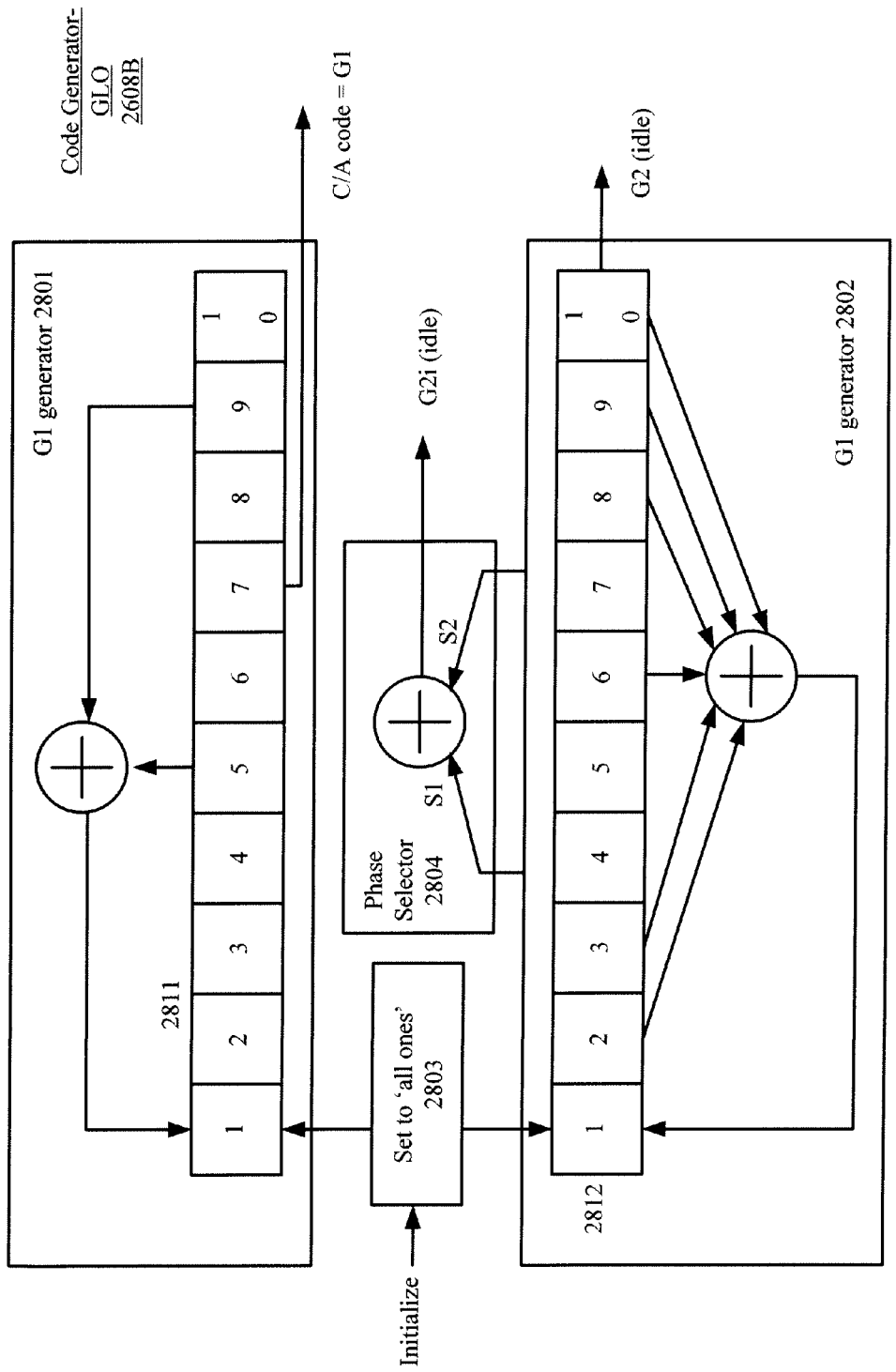
FIG. 28 illustrates an exemplary GLONASS code generator.

FIG. 28 illustrates an exemplary code generator 2608B for GLONASS (code generator 2608B forming part of code generator 2608, FIG. 26). In this embodiment, code generator 2608B includes a G1 generator 2801 for generating the G1/CA code, a G2 generator 2802 for generating the G2 (idle) code, an initialize block 2803, and a phase selector 2804. Note that in phase selector 2804, S1 and S2 indicate which bits of shift register 2812 of G2 generator 2802 are added to create the G2$i$ (idle) output at each epoch.

In the configuration of code generator 2608B shown in FIG. 28, the C/A code sequence can depend on G1 only, and the code frequency can be 511 kHz. In one embodiment, the polynomials corresponding to the LFSRs, which generate G1 and G2, are $$G1(x)=1+x^5+x^9$$

$$G2(x)=1+x^2+x^3+x^6+x^8+x^9+x^{10}$$

The code sequence for GLONASS is 511 chips with 1 ms duration. The code sequence can be generated by a 9-stage maximum length shift register (MLSR). The generation polynomial $G(x)=1+x^5+x^9$, and all the initial states are set to one (using initialize block 2803). In one embodiment, code generator 2608B can be implemented using a reconfigurable code generator 2608A.

Figure 29:
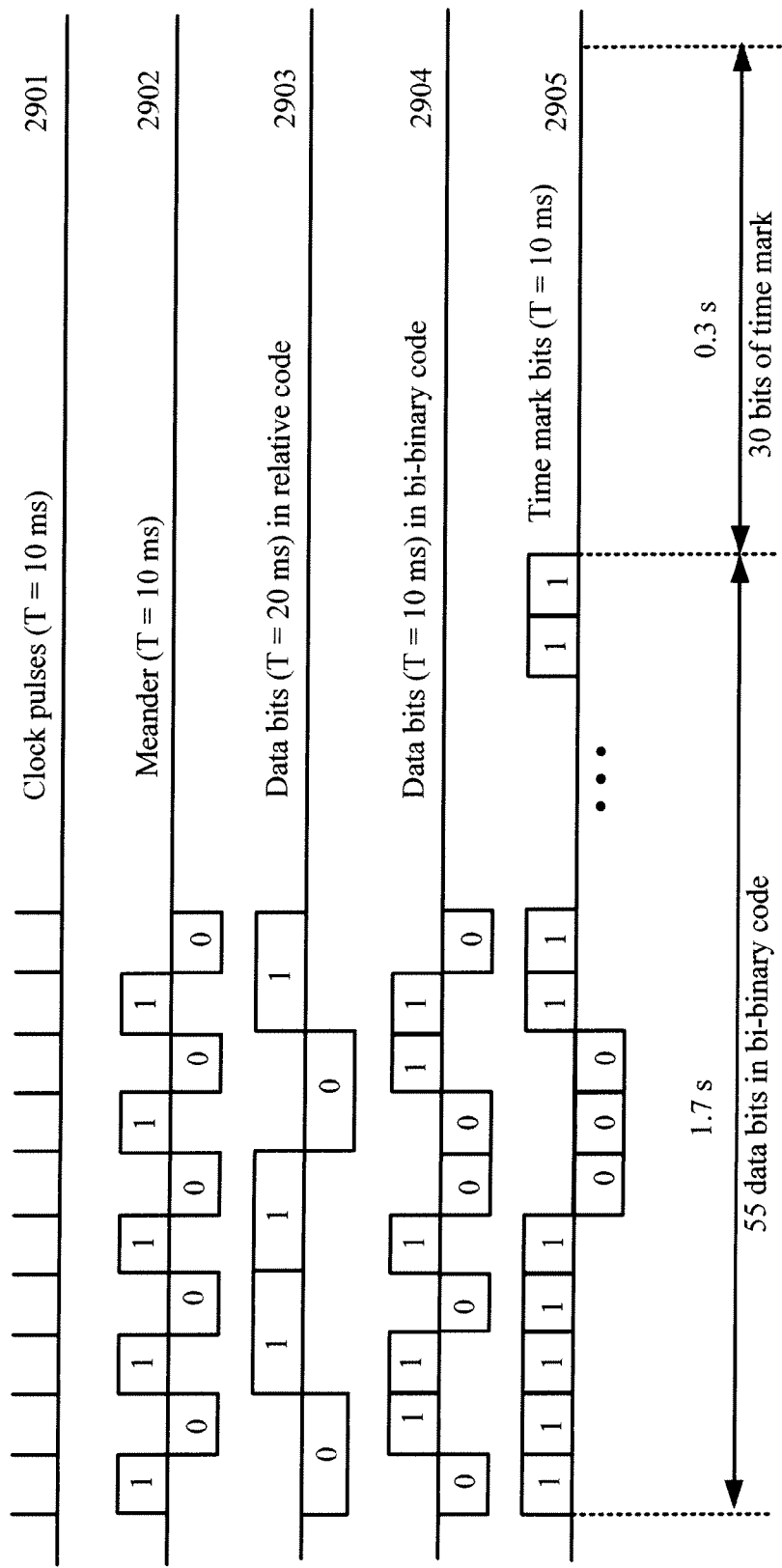
FIG. 29 illustrates an exemplary GLONASS data sequence generation.

FIG. 29 illustrates an exemplary GLONASS data sequence generation. Line 2901 shows clock pulses with a period T=10 ms; line 2902 shows meander signals (T=10 ms); line 2903 shows data bits in relative code (T=20 ms); line 2904 shows data bits in bi-binary code (T=10 ms); and line 2905 shows time mark bits (T=10 ms). In FIG. 29, each string consists of 1.7 sec of navigation data and 0.3 sec of time mark sequence. In one embodiment, 85 data bits with 20 ms period can be modulated by the meander sequence that changes polarity every 10 ms. This polarity change results in an effective data bit duration of 10 ms. The last 0.3 sec is the time mark sequence that consists of 30 bits, each bit being 10 ms long. The 30 bits of the time mark pattern are, in this case, [111110001101110101000010010110].

Tracking Engines & Pre-Correlation Noise Estimators

Figure 30:
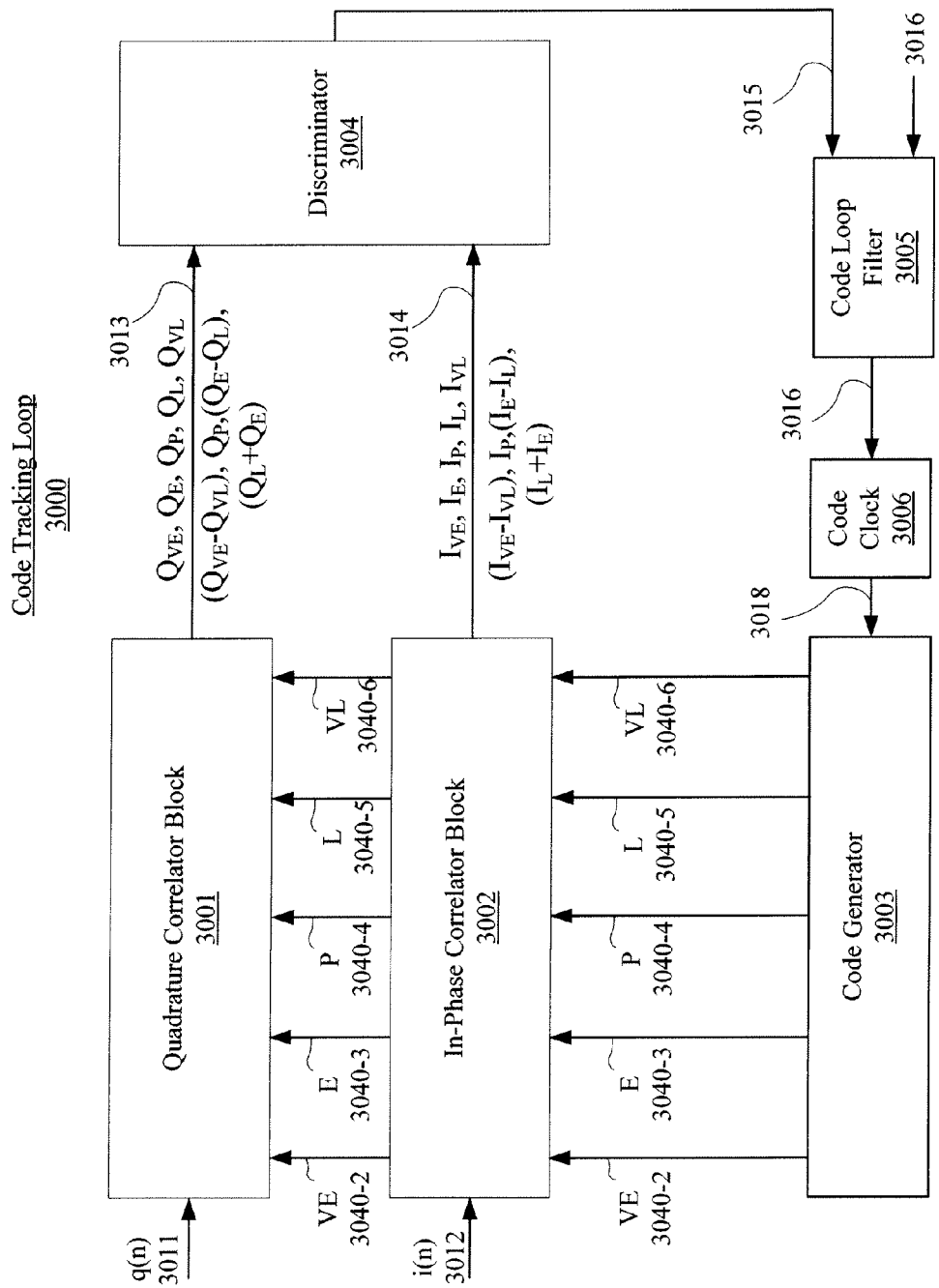
FIG. 30 illustrates an exemplary code tracking loop.

FIG. 30 illustrates an exemplary code tracking loop 3000 within a receiver. In this embodiment, tracking loop 3000 includes a quadrature correlator block 3001, an in-phase correlator block 3002, a code generator 3003, a discriminator 3004, a code loop filter 2705, a code clock generator 3006.

Code generator 3003 is configured to locally generate a PRN code sequence, associated with a PRN code sequence of a specific satellite, based on certain sequence parameters and a PRN clock signal 3018. Code generator 3003 may generate a plurality of phase-shifted versions of the PRN code sequence ranging from degrees of early through degrees of late with respect to an associated satellite signal.

In one embodiment, code generator 3003 generates five PRN signals 3040 (3040-2 through 3040-6), corresponding to a very early (VE) 3040-2, early (E) 3040-3, prompt (P) 3040-4, late (L) 3040-5, and very late (VL) 3040-6 phase of the PRN code sequence. For example, the very early 3040-2 signal may be offset from the prompt 3040-4 signal by 0.75 chip times; symmetrically, the very late 3040-6 signal may be offset from the prompt 3040-4 signal by 0.75 chip times. The early signal 3040-3 may be early by 0.25 chip times with respect to the prompt signal 3040-4 in time, while the late signal 3040-4 may be late by 0.25 chip times with respect to the prompt signal 3040-4. The timing of the prompt signal 3040-4 corresponds to a current timing and phase estimate within code tracking loop 2700 for a corresponding satellite signal.

In-phase correlator block 3002 receives the PRN signals 3040 and an in-phase signal i(n) 3012, such as the in-phase component output from switch matrix 2406. In-phase correlator block 3002 is configured to generate in-phase correlation samples 3014 based on the in-phase input i(n) 3012 and the PRN signals 3040. For example, the in-phase correlation samples 3014 may include a IVE (in-phase, very early) signal corresponding to a correlation function between in-phase signal i(n) 3012 and very early PRN signal 3040-2.

The quadrature correlator block 3001 receives the PRN signals 3040 and a quadrature signal q(n) 3011, such as the quadrature component output from switch matrix 2406. Quadrature correlator block 3001 is configured to generate quadrature correlation samples 3013 based on the quadrature signal q(n) 3011 and the PRN signals 3040.

The quadrature correlation samples 3013 and in-phase correlation samples 3014 are transmitted to discriminator 3004. Using these correlation samples, discriminator 3004 is configured to detect phase differences between the in-phase input i(n) 3013 and the prompt PRN signal 3040-4. Discriminator 3004 generates a discriminator output signal 3015, which indicates whether the phase of the prompt PRN code 3040-4 is ahead of, behind, or aligned with the input i(n) 3013. In other words, the discriminator output signal 3015 indicates a phase difference between the PRN code sequence generated locally by code generator 3003 and the satellite signal received at the antenna of the receiver.

The discriminator output signal 3015 and a rate aiding signal 3016 are combined within the code loop filter 3005 to generate a code clock control signal 3016. In one embodiment, the rate aiding signal 3016 corresponds to a coarse timing signal acquired from an associated satellite signal. Code loop filter 3005 should be configured to implement a low-pass operation on the discriminator output signal 3015.

The code clock 3006 generates the PRN clock signal 3018 based on the code clock control signal 3016. Code clock generator 3006, code generator 3003, quadrature correlator block 3001, in-phase correlator block 3002, discriminator 3004, and code loop filter 3005 form a negative-feedback control loop configured to track phase alignment of the incoming code sequence of in-phase input i(n) 3012. When code tracking loop 3000 is properly tracking input i(n) 3012, transitions on the prompt PRN signal 3040-4 are phase-aligned with transitions within the i(n) 3012 signal. Phase differences between the received PRN sequence (in phase input i(n) 3012) and the locally generated PRN sequence are reflected in the discriminator output signal 3015 and the code clock control signal 3016, which controls code clock generator 3006 and resulting phase of the PRN clock signal 3018. The phase of the PRN clock signal 3018 determines the phase of the locally generated PRN sequence. Code clock generator 3006 may compensate for phase differences indicated in the code clock control signal 3016 by adjusting the PRN clock signal 3018 using a frequency adjustment, a phase adjustment, or both a frequency and a phase adjustment, according to specific implementation requirements.

When the locally generated PRN sequence is ahead of the received PRN sequence in phase, the discriminator output signal 3015 indicates a positive phase difference, causing code clock generator 3006 to adjust the PRN clock signal 3018 accordingly (decrease frequency, decrease phase shift). When the locally generated PRN sequence is behind the received PRN sequence in phase, the discriminator output signal 3015 indicates a negative phase difference, causing code clock generator 3006 to adjust the PRN clock signal 3018 accordingly (increase frequency, increase phase shift). In one embodiment, inputs q(n) 3011 and i(n) 3012 arrive phase-aligned within code tracking loop 3000, however, quadrature signal q(n) 3011 is sampled on a 90 degree offset from i(n) 3012 within the ADC. Persons skilled in the art will recognize that a certain threshold of phase difference between the received PRN code sequence and the locally generated PRN code sequence may exist at any time during normal operation without degrading proper phase lock in the negative-feedback control loop.

The discriminator output signal 3015 represents a phase error estimate between the PRN clock signal 3018 and the in-phase input i(n) 3012. The phase error estimate is used to adjust code clock generator 3006 to track the phase and frequency of the in-phase input i(n) 3012. Carrier information, such as a pseudorange rate of change based on Doppler shifts in the GPS carrier may be used to adjust bandwidth of code loop filter 3005 to implement beneficial trade-offs between noise performance and dynamic performance. The carrier information may be conveyed via the rate aiding signal 3016.

Figure 31:
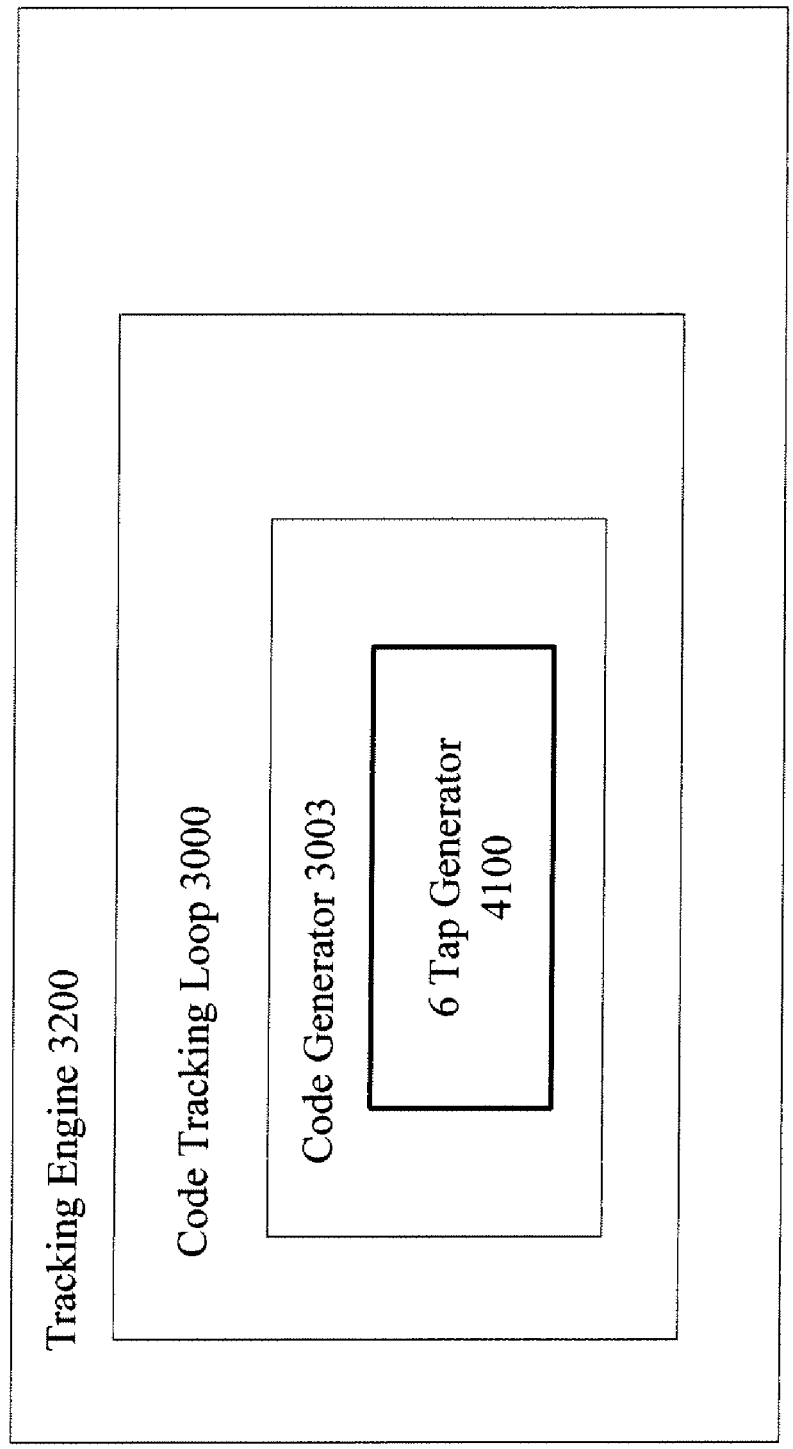
FIG. 31 illustrates an exemplary interface between the code tracking loop and the tracking engines.
Figure 41:
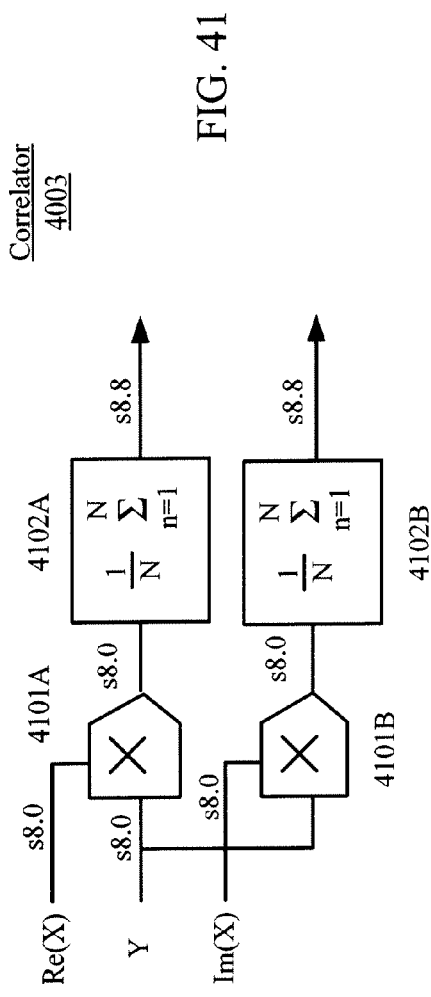
FIG. 41 illustrates an exemplary correlator for the calibration configuration shown in FIG. 40.

FIG. 31 illustrates an exemplary relationship between a tracking engine 3200 (described in reference to FIG. 32), code tracking loop 3000 and code generator 3303 (described in reference to FIG. 30), and a 6-tap generator 4100 (described in reference to FIG. 41). As shown in FIG. 31, 6-tap generator 4100 is included in code generator 3003, which in turn is included in code tracking loop 3000, which in turn is included in tracking engine 3200. Note that the specific coupling between these components is described in reference to FIGS. 30, 32, and 41.

After acquisition of GPS and/or GLONASS satellites by search engines 105A, tracking engines 105B can track each of the identified satellites in view to provide continuous real-time position determination. In one embodiment, the GPS tracking engine and the GLONASS tracking engines (which form part of tracking engines 105B) can have substantially similar components. The differences between the GPS and GLONASS tracking engines are described in further detail below.

As noted above, GLONASS uses an FDMA system instead of a CDMA system. However, because the channel frequency offsets in the channel mixers of dual mode interface 104 can be removed, the same input sampling rate and data bit-width for tracking GPS and GLONASS satellites can be used. GLONASS has the same navigation bit duration as GPS (20 ms/bit), but these navigation bits are Module-2 modulated with a 10 ms meander sequence. That meander sequence leads to 10 ms bit transitions, which limit the coherent integration time for FLL (Frequency Lock Loop) and DLL (Delay Lock Loop) before string sync is detected. Further note that GLONASS has twice the C/A chip duration (around 2 us), which leads to larger code phase error in meters than GPS.

Figure 32:
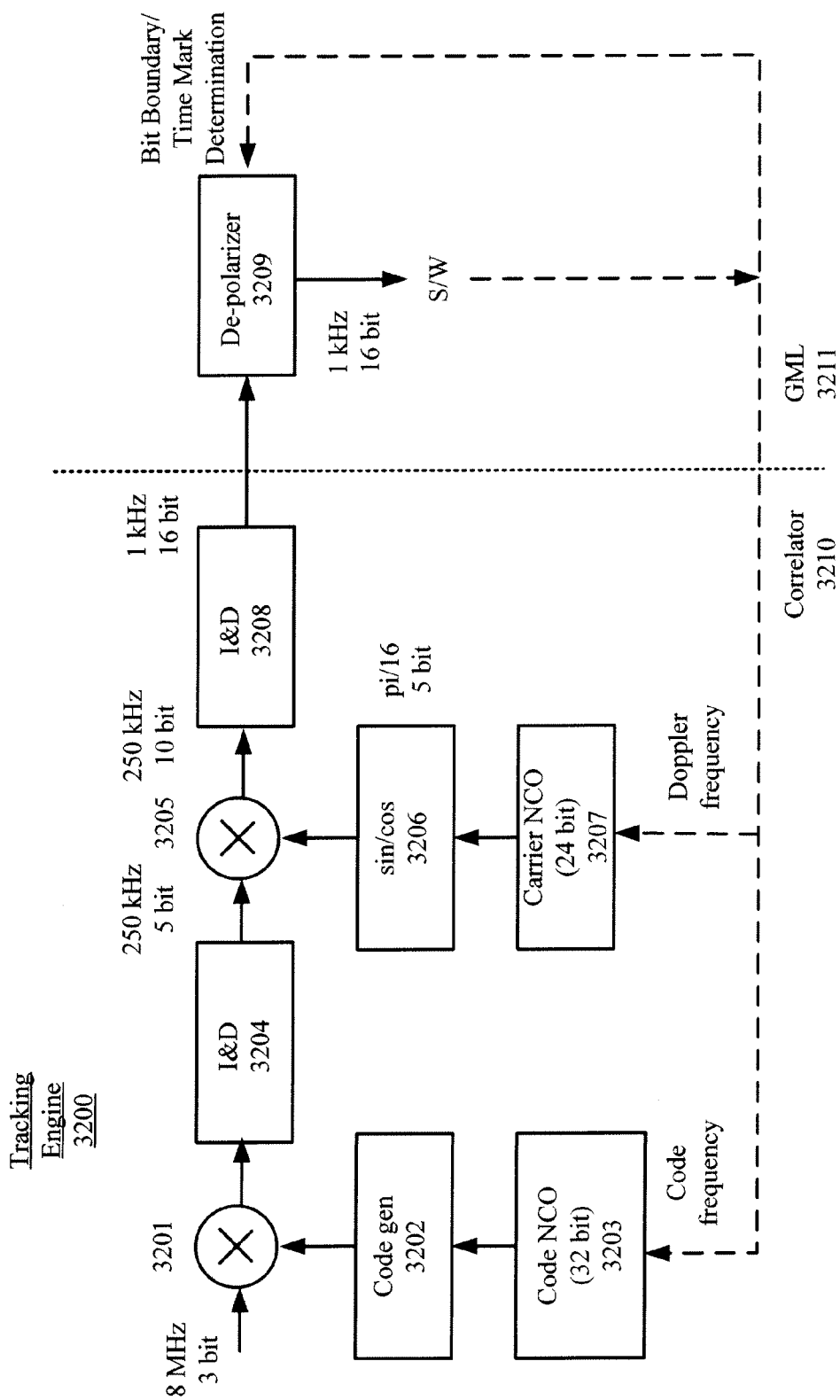
FIG. 32 illustrates an exemplary tracking engine.

FIG. 32 illustrates an exemplary tracking engine 3200 that includes a hardware based correlator 3210 and a firmware-based GML algorithm 3211. In this embodiment, correlator 3210 includes a mixer 3201, an integrate and dump (I&D) block 3204, a mixer 3205, and an I&D block 3208, all coupled in series. A code NCO 3203 (e.g. 32 bit) can provide its output to a code generator 3202, which in turn provides its output to mixer 3201. A carrier NCO 3207 (e.g. 24 bit) can provide its output to a sin/cos table 3206, which in turn provides its output to mixer 3205. Depolarizer 3209, which is part of GML 3211, can depolarize the results output by I&D block 3208. These polarized results can be used (by software) to provide tracking control, DLL, FLL, bit boundary determination, time mark determination, and data bit extraction. Note that software can provide a code frequency to code NCO 3203 and a Doppler frequency to carrier NCO 3207. In one embodiment, correlator 3210 can be the same for GPS and for GLONASS, except code generator 3202 (see, e.g. GPS code generator 2608A (FIG. 29), and GLONASS code generator 2608B (FIG. 30)).

Figure 33:
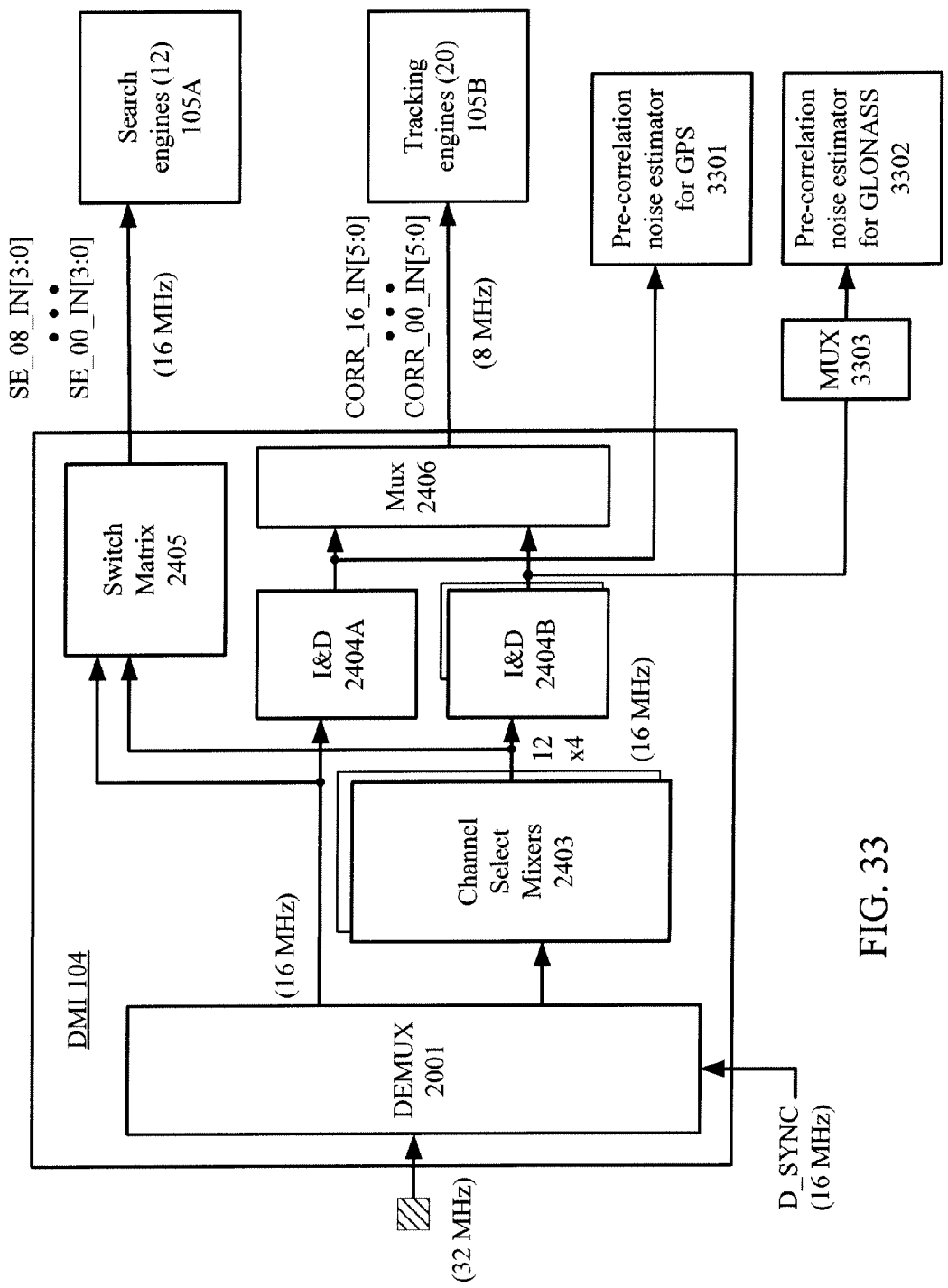
FIG. 33 illustrates an exemplary position for pre-correlation noise estimators.

GPS signal is immersed in thermal noise. For example, a typical signal power is less than −130 dBm, whereas thermal noise (over 1 MHz of bandwidth) is typically about −110 dBm. Note that noise power can be measured to determine the relative quality of the signal. In one embodiment shown in FIG. 33, to provide this function, a pre-correlation GPS noise estimator 3301 and a pre-correlation GLONASS noise estimator 3302 can be used to measure the noise power before correlation. Note that pre-correlation GPS noise estimator 3301 (i.e. before correlator 3210 of tracking engine 3200) can be shared by all GPS tracking channels (outputs of I&D 2404A). In contrast, pre-correlation GLONASS noise estimator 3302 can tune to a specific GLONASS channel by selecting the input (one of outputs from I&D 2404B) with a multiplexer (not shown).

In one embodiment, conventional noise-tap-based noise estimators can be retained inside the tracking channels in tracking engine 3200. That is, a conventional tracking engine includes a plurality of taps, each tap for a different code phase to correlate with the incoming signal. For the data lock loop to work (thereby allowing accurate location determination), a prompt tap, an early tap, and a late tap can be used. In this configuration, if the prompt tap value is the highest value (power), and the values of the early and late taps are balanced, then tracking is characterized as good. In one embodiment, a noise tap can also be provided a few chips away from the prompt tap. The value of this noise tap should be negligible and can be used to compute the signal-to-noise ratio (SNR). The SNR can be used along with the values of the prompt, early, and late tabs to adjust the data lock loop. Unfortunately, this SNR computation arrives late because it follows correlation, which is relatively slow (each ms provides only one measurement). Therefore, several milliseconds may be needed to provide a stable data lock loop. The pre-correlation noise estimators (for GPS and GLONASS) 3301 and 3302 can facilitate a fast SNR computation under most conditions.

Note that pre-correlation noise estimators 3301 and 3302 may be more vulnerable to narrow band interference than the noise-tap based noise estimator, because the noise-tap based noise estimator does not reflect the impact of interference on the correlation output. Therefore, as mentioned above, in one embodiment, the conventional noise-tap noise estimators can be retained in the system. In this case, pre-correlation noise estimators 3301 and 3302 can be used to complement the conventional noise estimators and enhance performance.

FIG. 34 illustrates an exemplary GPS pre-correlation noise estimator 3301. The input signal can be an 8 MHz signal with I and Q components. A summation block 3402 and a dump block 3402 can perform a fixed ratio 8:1 integrate-and-dump operation to remove out-of-band noise. The outputs of dump block 3402 are provided to absolute value blocks 3403A and 3403B. The outputs of absolute value blocks 3403A and 3403B can be added together by adder 3404. Another summation block 3405 and a dump block 3406 can perform an integrate-and-dump operation on the output of adder 3404. In this embodiment, the dump can be driven by a 1 ms clock. Note that the number of accumulations in each dump may vary from dump to dump (ratio count:1).

In one embodiment, summation block 3405 can include a counter to provide an accurate count of each dump. This count value as well as the accumulator output generated by dump block 3406 can be passed to GML 3211 (FIG. 32) to compute an accurate average. Alternatively, a nominal value of $$\frac{f_{BB}}{16} \times 1 \text{ ms}$$

can approximate the count value, where $f_{BB}$ is the clock rate in the baseband (e.g. 16 MHz). The output of GPS noise estimator 3301 can be passed to GML 3211 every 1 ms to calculate the estimated noise power. Note that because different GPS satellites occupy the same frequency band, only one GPS noise estimator 3301 is needed for all GPS tracking channels.

FIG. 35 illustrates an exemplary GLONASS pre-correlator noise estimator 3302. Note that GLONASS noise estimator 3302 includes the same components as GPS noise estimator 3301, but has different decimation ratios and bit widths for the intermediate blocks.

Because GLONASS is an FDMA system, one GLONASS noise estimator 3302 could be provided for every channel (after removing the channel frequency offset). In one resource-efficient embodiment, one pre-correlation noise estimator for GLONASS 3302 can be time-shared for use with all active GLONASS channels. This embodiment relies on noise power being a stable measurement. Referring back to FIG. 33, MUX 3303 can select a desired channel and passes the signal on that channel to pre-correlation noise estimator 3302. In one embodiment, a counter can be included as part of accumulator 3405 to count the number of accumulations. This count can ensure proper normalization if the integration time varies between different channels.

The results from GPS pre-correlation noise estimator 3301, GLONASS pre-correlation noise estimator 3302, and the conventional taps in tracking engines 105B can be used to determine whether only white noise is present (e.g. when results from the pre-correlation noise estimator and the conventional taps are substantially the same), an interferer is present (e.g. when results from the pre-correlation noise estimator and the conventional taps are different), and which satellite(s) should be de-weighted or perhaps not even used for location determination. In one embodiment, the difference of the two noise measurements can be compared to a threshold to determine if there exists significant interference. In another embodiment, this information can be combined with the estimated signal power to determine if the corresponding satellite should be excluded from being used to determine the user position due to degraded quality.

Figure 37:
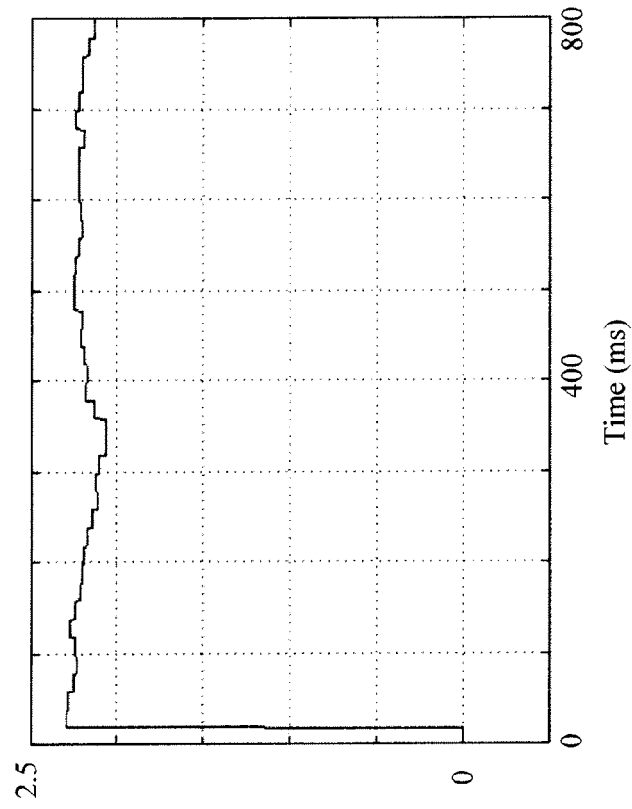
FIGS. 36 and 37 illustrate exemplary simulation graphs of the estimated noise power vs time for a pre-correlation noise estimator (i.e. the GPS pre-correlation noise estimator or the GLONASS pre-correlation noise estimator) and a conventional noise-tap estimator, respectively.
Figure 36:
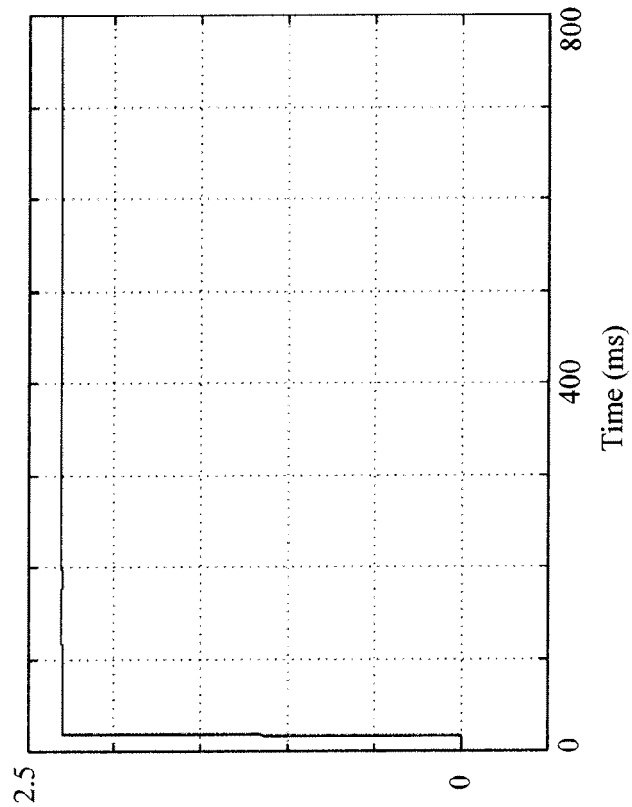

FIGS. 36 and 37 illustrate exemplary simulation graphs of the estimated noise power vs time for a pre-correlation noise estimator (e.g. GPS pre-correlation noise estimator 3301 or GLONASS pre-correlation noise estimator 3302) and a conventional noise-tap estimator, respectively. In these simulations, a total of 800 observations are recorded continuously. As shown by comparing FIGS. 36 and 37, a pre-correlation noise estimator can provide a significantly more stable estimation compared to a conventional noise-tap estimator. Providing stable noise power estimation can allow the GML to quickly obtain an accurate C/N0 estimation.

Flexible 6-Tap Generator

A conventional generator supports 4 taps in each tracking channel: E (early), P (prompt), L (late), and N (noise). In this generator, the minimum tap spacing is ½, ¼, and ⅛ chip for 2, 4, and 8 MHz of Shift Register Rate (SRR), respectively. In accordance with one feature of an improved tracking engine, a 6-tap generator can be included.

A 6-tap generator can be advantageously used when double delta (DD) delay lock loops capable of multipath mitigation are included in the GML. In one embodiment, $1^{st}$-$5^{th}$ taps (i.e. VE (very early), E (early), P (prompt), L (late), and VL (very late)) can be used to form a discriminator, and the $6^{th}$ tap can be used as a noise tap.

Figure 38:
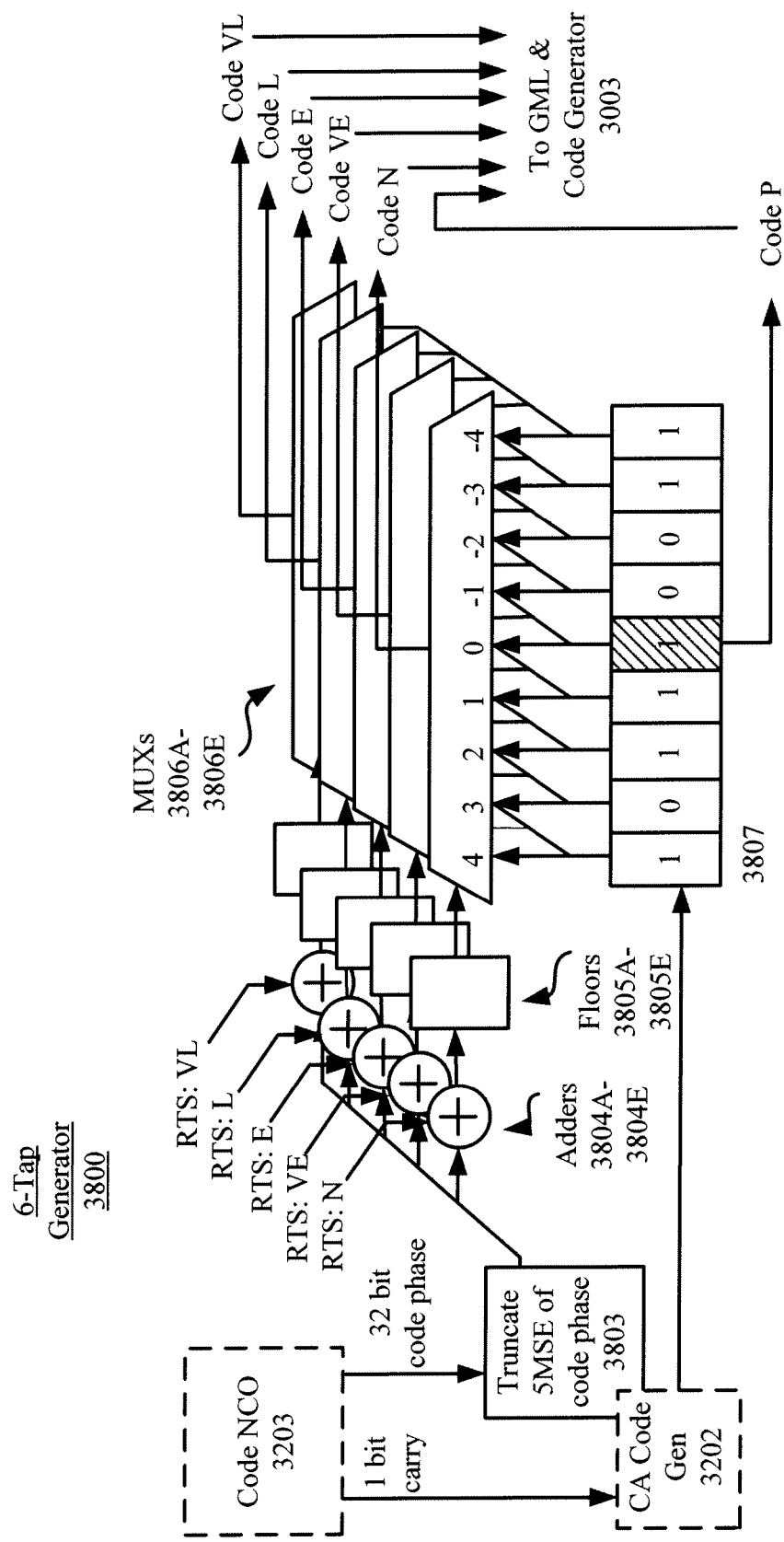
FIG. 38 illustrates an exemplary 6-tap generator that supports an advanced double-delta code discriminator.

FIG. 38 illustrates an exemplary 6-tap code generator 3800 that supports an advanced double-delta code discriminator. In this embodiment, code NCO 3203 (shown for context) can count the instantaneous code phase for the Prompt tap. Its carry (e.g. a 1 bit carry) drives CA code generator 3202 (also shown for context) to produce the code sequence which is buffered in a 9-stage shift register 3207. The middle bit (shown with a fill pattern) in shift register 3807 can store the current code bit for the Prompt tap (code P). The code sequences of all the other taps are generated with reference to that of the Prompt tap. Their code phases (codes N, VE, E, L, and VL) can be computed based on the Prompt tap code phase and the relative tap spacing (RTS)(which is determined by software). The computed code phases can then be used as addresses to select the appropriate bits in shift register 3807 to output the appropriate chips. Note that a conventional tap generator stores chip samples. Therefore, 6-tap generator 3800 can advantageously minimize storage resources.

Figure 39:
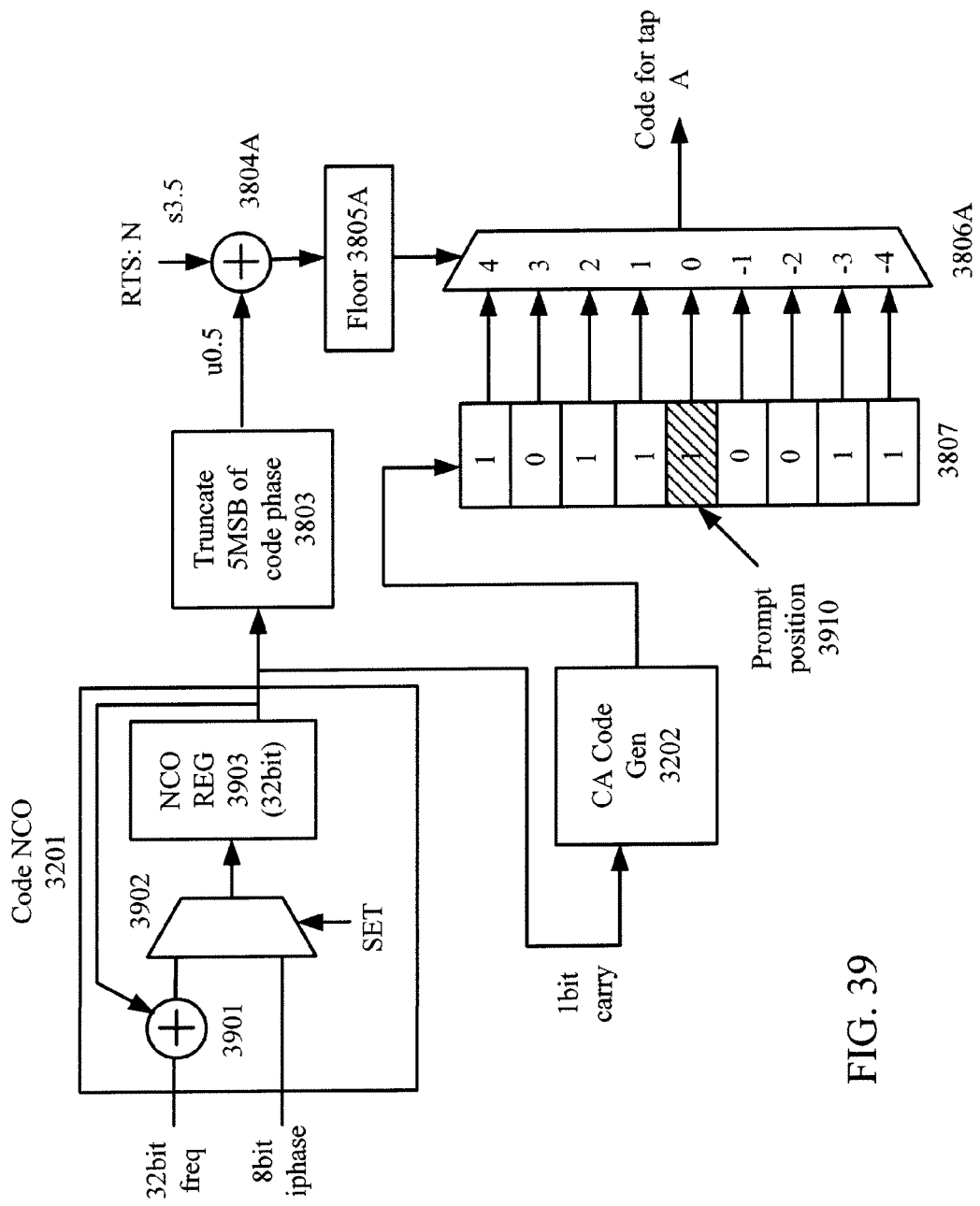
FIG. 39 illustrates an exemplary code numerically-controlled oscillator (NCO) for the 6-tap generator shown in FIG. 38.

FIG. 39 illustrates an exemplary code NCO 3201 that includes an adder 3901 receiving a 32 bit frequency signal and generating an input to a multiplexer 3902. The other input to multiplexer 3902 is an 8 bit phase signal. Multiplexer 3902 can provide its output (selected by a SET signal generated by the GML to either initialize the NCO or update the NCO by increments) to a 32 bit NCO register 3903. The 1 bit carry signal of code NCO 3903 is used to drive the clock of the CA code generator 3202. The output of NCO register 3903 is provided as a second input to adder 3901 as well as to a truncate block 3803. Truncate block 3803 truncates the code phase to its 5 most significant bits (MSB)(which provides $\frac{31}{32}$ chip resolution). In this configuration, shift register 3807 can be effectively clocked by the carry signal, i.e. the content can be shifted every time a new chip is generated.

The chip at the "Prompt" tap (i.e. prompt position 3910) is stored in the center of register 3807 (indexed as 0 in multiplexer 3806A) at any given time as a reference. Its fractional code phase of the chip is stored in a 32-bit NCO register 3903. The code phase of any other tap can be computed by adder 3801A using the prompt tap code phase output by truncate block 3803 and the relative tap spacing (RTS) to the prompt tap (in FIG. 39, RTS:N). The computed code phase is then floored by floor block 3805A (i.e. floor block 3805A uses only an integer portion of the sum generated by adder 3804A), wherein the floored value is then used as an address to select (via MUX 3806A) the desired chip from shift register 3807. The RTS values (N=noise, VE=very early, E=early, L=late, and VL=very late) are in s3.5 format and the upper 5 bits of the P tap fractional code phase are formatted to u0.5, such that the tap spacing solution is $\frac{1}{32}$ chip and the final chip span is from −4 to 4 chips.

Referring back to FIG. 38, a plurality of adders 3804B-3804E, floors 3805B-3805E, and multiplexers 3806B-3806E function similarly to adder 3804A, floor 3805A, and multiplexer 3806A. Therefore, each register of shift register 3807 can hold a different chip, thereby eliminating the tradeoff between tap spacing and tap span.

Note that to obtain 8 MHz correlation resolution, the phase update in CA code generator 3202 and floor blocks 3805A-3805E (i.e. the chip selectors) can also be run at 8 MHz. Shift register 3807, CA code generator 3202, and the chip indexing for all taps can be driven by their carry signal (e.g. the carrier signal or the overflow of NCO reg 3903) to save power. In one embodiment with lower correlation resolution with power-saving features, the phase update in CA code generator 3202 and floor blocks 3805A-3805E can also be run at 2 or 4 MHz (i.e. a lower frequency).

Advantageously, because of the shared configurations discussed above, location determination system 100 can operate in one of three modes: GPS only, GPS and GLONASS (always on, fixed), and GPS and GLONASS (dynamic). In one embodiment, the selected mode can be based on the power currently available (i.e. low power availability can trigger a GPS only mode, whereas high power availability can trigger a GPS and GLONASS (fixed) mode). In one embodiment, the difference of noise associated with GPS and GLONASS (because of the slight difference in operating frequency) can determine whether a GPS only mode or a GPS and GLONASS mode is selected.

In one embodiment, the GPS and GLONASS (dynamic) mode can be selected based on the number of GPS satellites identified by search engines 105A (e.g. when sufficient GPS satellites are in view, then GLONASS can be turned off, and when insufficient GPS satellites are in view, then GLONASS can be turned on). In one embodiment, even when sufficient GPS satellites are in view, GLONASS satellites can be used to further refine the location determination. That is, the GPS satellites may be able to provide timing and basic location information. With this information, an almanac of GLONASS satellites, and a rough Doppler frequency, a fast, efficient acquisition of one or more GLONASS satellites can be performed, thereby facilitating refinement of the location determination.

Hardware Latency Calibration

GPS and GLONASS receivers are sensitive to processing latency from the antenna to the search engines/tracking engines. If the latency is constant, the impact can be absorbed into the clock offset and is therefore transparent to the PVT (position, velocity, and time) solution. However, if the latency is different for search engines and tracking engines, then the delta must be calibrated to ensure proper handover between acquisition and tracking. Moreover, if this latency is different for GLONASS and GPS, then the delta must be calibrated to eliminate systematic bias. Furthermore, if the latency is different in different hardware modes, then the delta also needs to be calibrated for consistent 1 PPS generation.

Latency in Analog Circuits

SAW filter 202 may have a different group delay in the GPS band and the GLONASS band. For example, a group delay delta of up to 8 ns between GPS and GLONASS has been noted, and up to 5 ns across GLONASS channels in various GLONASS devices. In one embodiment, a constant offset can be added to limit the worst case. For example, if the variation is between −9 ns and +3 ns, then adding a constant 3 ns will make the worst case absolute error 6 ns instead of 9 ns. In another embodiment, a look-up table can include group delay deltas based on temperature changes and/or process corners. In one embodiment, a temperature sensor can be used to know when calibration should be performed. In another embodiment, a temperature sensor can be used to adjust the correction amount.

Note that the group delay delta in LNA 201 and mixer set 204 is very small, i.e. on the order of −0.1 ns. Therefore, no calibration is needed for either LNA 201 or mixer set 204.

A group delay of GPS polyphase filter 205A (i.e. the delay going through this filter) can be 100 ns, whereas a group delay of the GLONASS polyphase filter 205B can be 80 ns in the band center and 160-210 ns at the band edges. Therefore, calibration of polyphase filters 205A and 205B is desirable.

Figure 40:
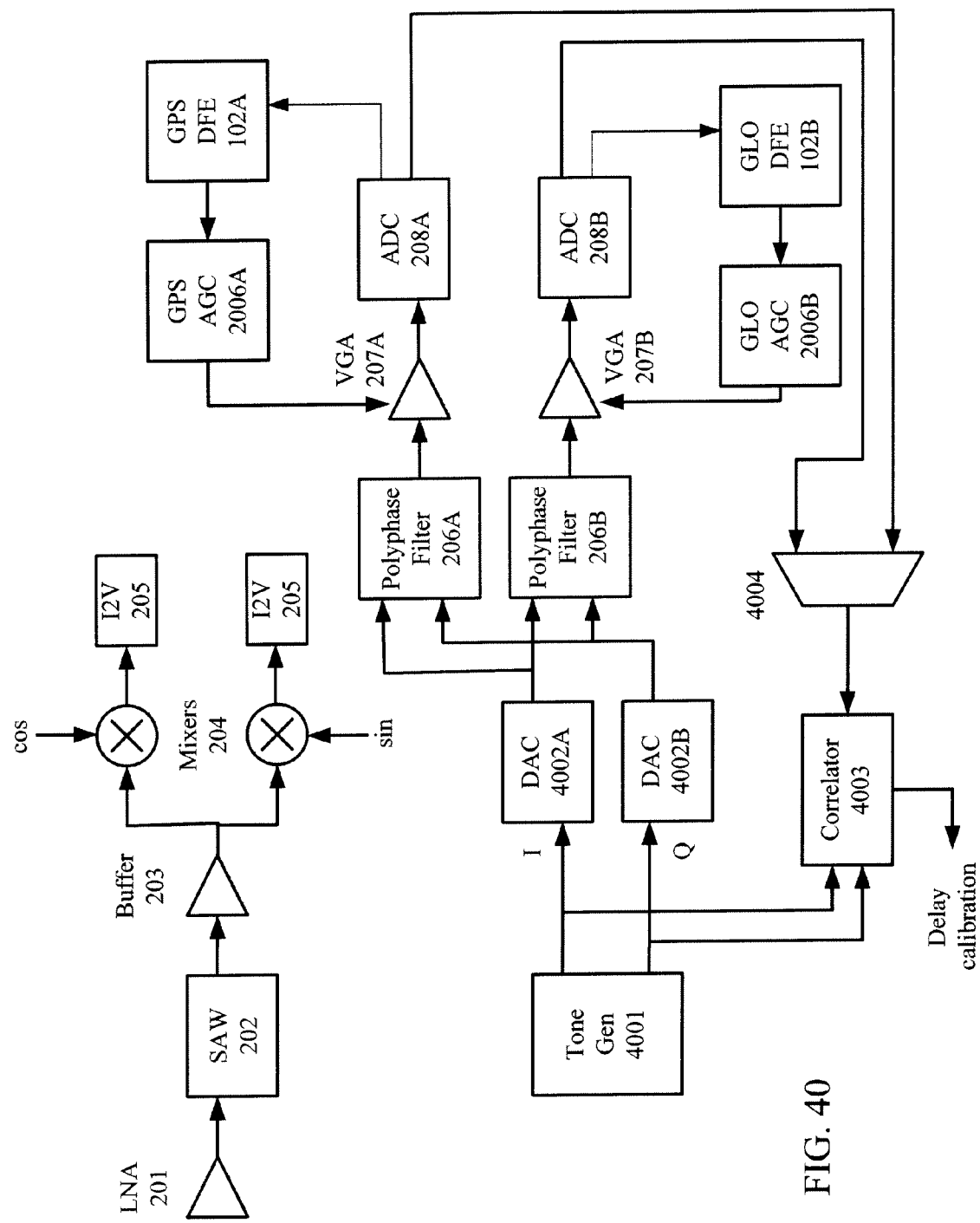
FIG. 40 illustrates an exemplary calibration configuration of the AFE shown in FIG. 2A to compensate for different latencies in the polyphase filters.

FIG. 40 illustrates an exemplary calibration configuration of AFE 101 to compensate for different latencies in polyphase filters 206A and 206B. In one embodiment, polyphase filter 206A is for GPS, and polyphase filter 206B is for GLONASS. In this configuration, mixers 204 are coupled to current to voltage converters (I2V 205) which may be coupled to polyphase filters 206A, 206B during normal use. In a calibration configuration, polyphase filters 206A and 206B may be coupled to receive inputs from a pair of DACs 4002A and 4002B, respectively. This coupling may be provided by multiplexers, transistors or any other technically feasible means. DACs 4002A and 4002B, which receive I and Q inputs from a tone generator 4001, generate a complex tone, which can then be injected into polyphase filters 206A and 206B. In one embodiment, DACs 4002A and 4002B can be "borrowed" from other on-chip circuits (e.g. from a Bluetooth transmitter). In one embodiment, a calibration can be performed at bootup. In another embodiment, calibration can also be performed after any significant temperature change that affects group delay (e.g. on the order of milliseconds).

The ADCs 208A and 208B can be coupled to a multiplexer 4004 (note that connections to the DFEs should remain for AGC operation). Multiplexer 4004 selects between the outputs of ADC 208A and 208B and provides its output to a correlator 4003, which correlate each ADC output with its corresponding DAC input. The correlation value, i.e. the delay calibration, can be reported to software and then converted to phase offset by software. This process can be repeated at a series of frequencies to compute the group delay.

FIG. 41 illustrates an exemplary correlator 4003 including combination multipliers/saturation components 4101A and 4101B as well as accumulation blocks 4102A and 4102B. The X input is the complex test tone (Re(X) and Im(X)), whereas the Y input is the real ADC output. Suppose:

$$X=A(\cos(\omega t)+j\sin(\omega t)) \text{ and } Y=B\cos(\omega t+\theta),$$

where A is magnitude of the test tone, B is the magnitude the received signal at ADC output, $\omega$ is the frequency of test tone, t is the time, and $\theta$ is the phase of the received signal.

Then, the N-point average of the correlation (where N>>1) is:

$$Z = \frac{1}{N}\sum_{n=1}^{N} X_n \cdot Y_n = \frac{AB}{2}(\cos\theta - j\sin\theta)$$

Therefore, the phase offset can be computed as $\theta$=−angle (Z). At this point, a series of frequencies can be used to yield a slope of the phase. The group delay can be computed by finding the derivative of the phase.

The DAC output range can be designed so that with the maximum gain of the IF filter and VGA, the output at the ADC can reach full scale. If the output at ADC is not full range due to insufficient gain, then the estimation error can increase.

Note that polyphase filters 206A and 206B are different because one is for GPS and one is for GLONASS. In one embodiment, correlator 4003 can determine this variation to perform an RF built-in-self-test (RBIST). For example, tone generator 4001 can generate different tones and correlator 4003 can perform a power measurement based on those different tones (e.g. +/−1 Hz from the normal center). Based on power comparisons from these tones, correlator 4003 can compute the filter offset, and then tune the capacitor and register value in the filter to re-center the filter. Thus, correlator 4003 can also be configured to compensate for manufacturing variations.

Latency in Digital Circuits

Figure 42:
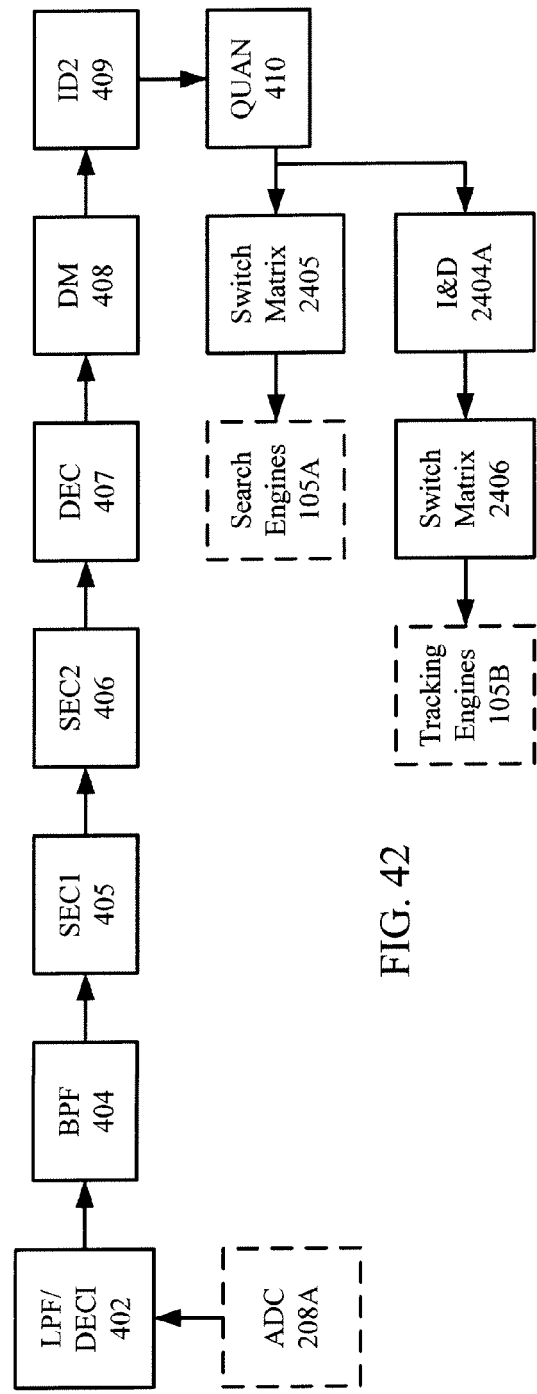
FIG. 42 illustrates exemplary components from the GPS DFE and GPS-used components of the dual mode interface that may contribute to latency.
Figure 43:
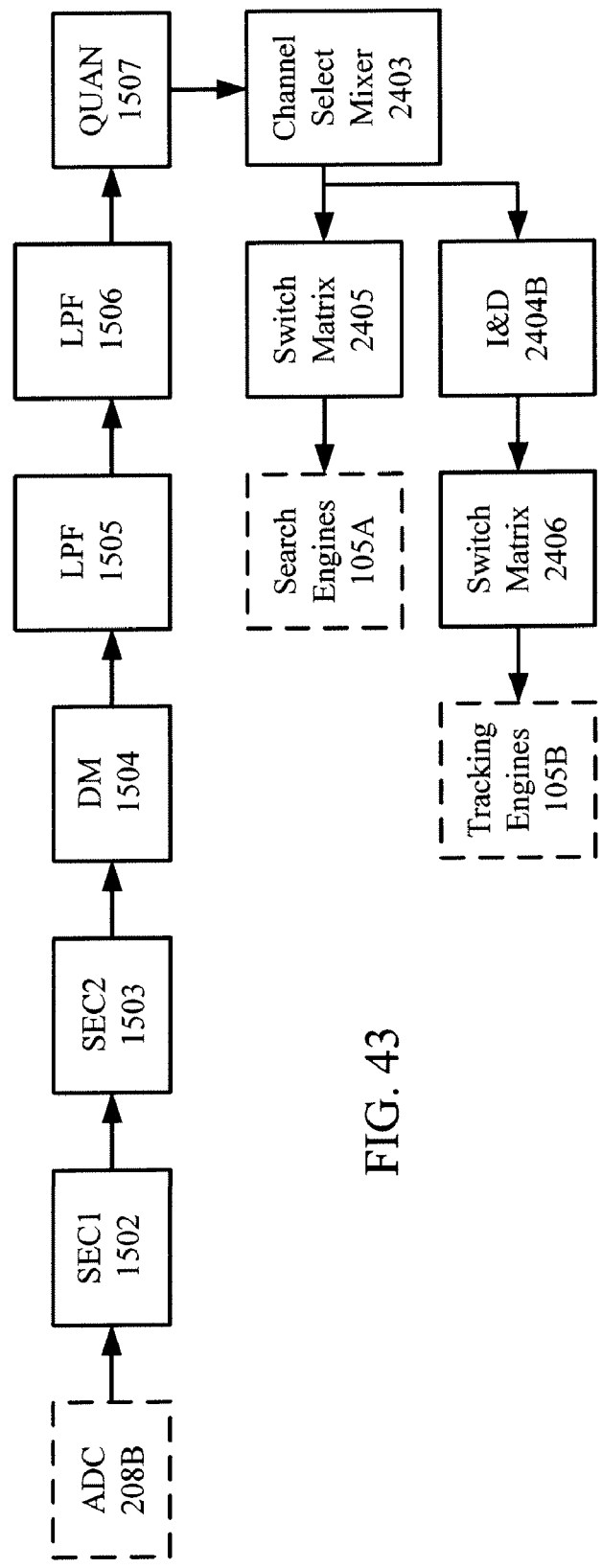
FIG. 43 illustrates exemplary components from the GLONASS DFE and GLONASS-used components of the dual mode interface that may contribute to latency.

The latency in the digital circuits of the location determination system depends on the specific digital processing chain, i.e. GPS or GLONASS. FIG. 42 illustrates exemplary components from DFE_GPS 102A and GPS-used components of dual mode interface 104 that may contribute to latency (ADC 208A, search engines 105A, and tracking engines 105B shown for context). FIG. 43 illustrates exemplary components from DFE_GLO 102B and GLONASS-used components of dual mode interface 104 that may contribute to latency (ADC 208B, search engines 105A, and tracking engines 105B shown for context). Note that because different components are provided in the GPS vs. GLONASS digital processing chains, these chains will inherently have different latencies. However, the latency for each chain is deterministic and therefore can be used to compensate for the latency of the other chain.

Latency Lookup Table

In one embodiment, the processing latency of each module can be counted deterministically and saved in a lookup table. The latency can be specified in number of ADC clock cycles.

Logically, if a block is bypassed, then its associated latency is eliminated. In one embodiment, the lookup table can include all modes and/or configurations of each component in the RTL design, and take into account different clock rates and/or temperatures. The delta can be used to calibrate the code phase between acquisition and tracking, and between GPS and GLONASS.

In one embodiment, calibration can be performed using live GPS signals. This calibration uses a known position and the live GPS signals to determine a new position. With known user location and known satellite location, the actual radio signal travel time from satellite to user can be computed. The difference between the actual travel time and measured travel time can then be mapped to the hardware latency.

Applying Calibration for Different Satellites

The latency delta between GPS and GLONASS, or across different GLONASS channels, can be compensated for the PVT solution, i.e. adjusting the code phase measurement accordingly before the LS (Least Square) or the Kalman filter (which estimates a state of a linear dynamic system from a series of noisy measurements). This adjustment can be done in GML, other measurement SW, or navigation SW.

Blanking

In one embodiment, when there is strong interference at the input of the GPS/GLONASS receiver, the signal can be "blanked" to avoid generating erroneous AGC measurements, acquisition results, and tracking results. The control signal triggering blanking can be controlled by a plurality of sources. In one embodiment, blanking can be controlled by up to four sources, e.g. (1) the peak detector of the LNA in the GLONASS receiver, which triggers when saturation is detected at the LNA (internal), (2) the transmit indicator of the coexisting BT system (internal), (3) the WiFi transmit indicator (external, optional), and (4) a cell phone transmit indicator (external, optional).

In one embodiment, the two internal control signals can be combined to one signal. For example, referring to FIG. 44, an AND gate 4401 can receive the peak detector (Peak Det) and a first enable signal (en1), whereas an AND gate 4402 can receive the transmit indicator (BT Tx1) and a second enable signal. The first and second enable signals en1 and en2 can trigger blanking by the peak detector and the BT transmitter, respectively. The outputs of AND gates 4401 and 4402 can be received by an OR gate 4403, wherein the output of OR gate 4403, which provides the blank enable (blank_en) signal, can be connected to a general purpose input/output (GPIO) pin on the baseband chip.

Figure 44:
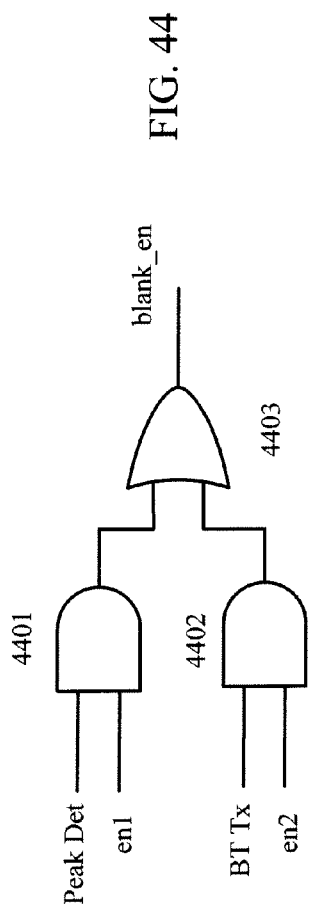
FIG. 44 illustrates an exemplary circuit for combining multiple control signals to generate a blank enable signal.

In one embodiment, there may be two other GPIO pins on the baseband chip for the WiFi and cell phone transmit signal to control blanking, with similar logic described with respect to FIG. 44 to consolidate all control signals. The term "blank_en" refers herein to the overall consolidated blanking control signal.

At any point in time, a Bluetooth signal occupies just 1 MHz of bandwidth, but the center frequency changes up to 1600 times per second (625 us per slot). The master device transmits during even-numbered slots while the slave devices transmit during odd-numbered slots. The current Bluetooth specification also allows multi-slot transmissions where packets occupy multiple consecutive slots (three or five).

Figure 45:
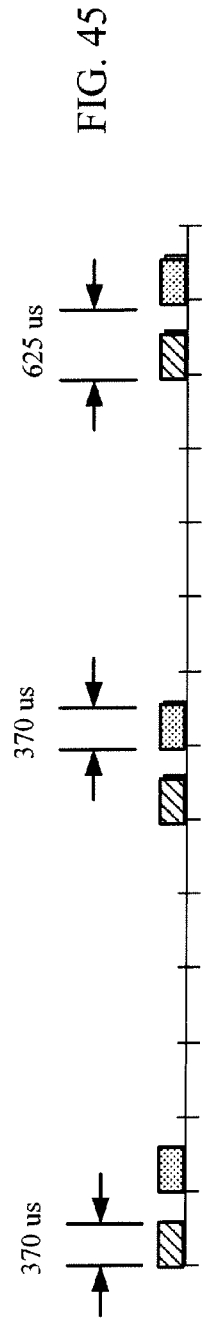
FIG. 45 illustrates an exemplary HV3 transmission, which is used in Bluetooth.

The most typical Bluetooth packet type used in headset and hands-free application is HV3. HV3 repeats every 6 slots, where a master transmits in slot 0, a slave transmits in slot 1, and slots 2-5 are idle. The actual air time of the transmission is around 370 us, less than one slot. The activity is shown in FIG. 45. Because GPS is co-located with the master (e.g. smart-phone) or the slave (e.g. PND), the effective on-time is 0.37 ms and off-time is 3.38 ms.

In contrast, WiFi uses CSMA and is asynchronous. The packet length varies from tens of microseconds to tens of milliseconds. Moreover, the gap between transmission can also vary significantly depending on the user activity.

With respect to cell phone transmission, each GSM frequency channel is divided into 4.615 ms frames. One frame is divided into 8 slots, and each slot is 577 us. A GSM handset uses one of the slots to communicate to the base station. Therefore, the on-time is 0.58 ms, and off time is about 4.04 ms. CDMA cell-phones transmit continuously.

Blanking AGC

When strong interference is present, the ICD output increases and causes the AGC to reduce the gain. This reduction in gain is undesirable because when the interference goes away, it takes time for the AGC to back the gain up. To avoid this delay, the AGC operation can be frozen when blank_en is equal to a predetermined value (e.g. when blank_en=1).

GML runs AGC periodically every 67 ms. Four 10 ms measurements can be taken in each 67 ms period. AGC accumulates all 4 measurements before making any gain change decisions.

Figure 46:
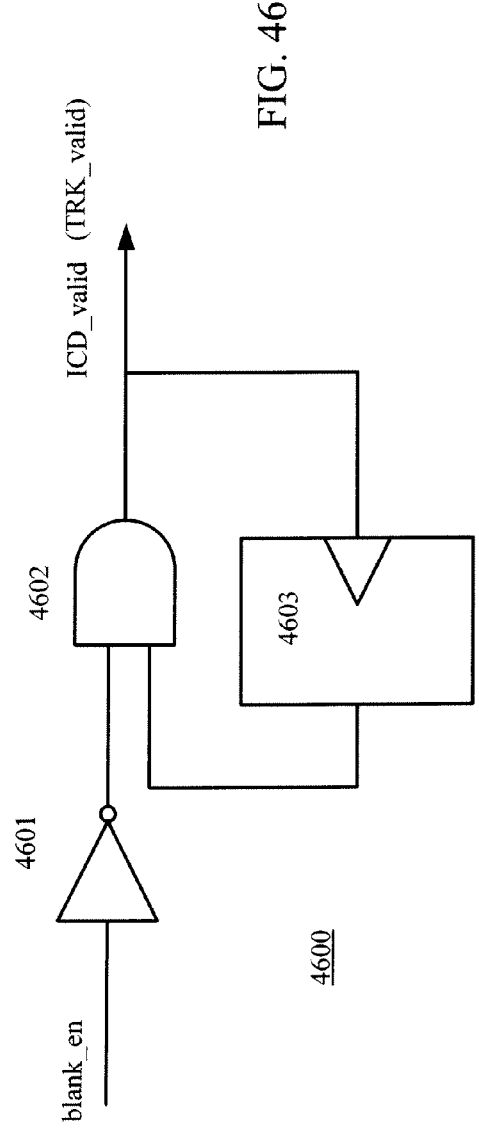
FIG. 46 illustrates an exemplary circuit for receiving a blank enable signal and generating an ICD valid signal.

If blank_en=1 during the measurement, the corresponding result is invalid. In one embodiment, the ICD can generate an ICD_valid bit using a circuit 4600 shown in FIG. 46. Circuit 5700 includes an inverter 4601 that receives the blank_en signal. AND gate 4602 receives an inverted blank_en signal and an output of a register 4603. The output of AND gate 4602 is the ICD_valid signal. In one embodiment, the register is initialized to 1. During the time of interest, if blank_en goes to 1, the ICD_valid signal is locked to 0 due to the feedback of register 4603.

An exemplary AGC operation with blanking can include the following steps. In a first step, HW initializes the ICD_valid signal to 1 before the AGC measurement. In a second step, if blank_en=1 at any time during the measurement, then the ICD_valid signal is set to 0. The bit stays at 0 even when blank_en goes back to 0. In a third step, GML checks the result after the measurement is complete. If ICD_valid=0, then the result is discarded. If GML cannot get 4 consecutive valid ICD measurements, then no gain change is made.

Blanking Tracking Channel

The 3-bit input of the tracking channel is in two's complimentary format. In one embodiment, when a blank enable bit (blank_en) is "1", that 3-bit input is set to all zeros to generate real 0's. If blank_en=1 is generated during the integration, the corresponding tracking results are invalid. In one embodiment, each tracking channel sets a valid tracking bit (TRK_valid) based on blank_en (see, FIG. 46). In one embodiment, the operation can include the following steps.

In a first step, HW initializes TRK_valid to 1 before starting the tracking channel. In a second step, if blank_en=1 at any time during the integration, then TRK_valid is set to 0. The bit stays at 0 even when blank_en goes back to 0. In a third step, at the code epoch boundary, the tracking results and the TRK_valid bit are saved in the hardware to be passed to GML. TRK_valid can be reset to 1 before the next code epoch. Steps 2 and 3 can be repeated for each epoch. Note that the code epoch is the C/A code boundary of the tracking channel, not the TME epoch. Each tracking channel should generate its own valid bit.

The data unit to be discarded can be the 1 ms integration result, or the PDI ms of integration results. If choose the ms interval is chosen, then the measurements for the missing ms(s) should be adjusted, which is more coding and more CPU usage. However, this adjusting can minimize the impact of blanking and therefore should have better performance. If the PDI interval is chosen, then the PDI interval fits better in the current code structure, but the impact of blanking is not minimal. In one embodiment, the PDI interval is used.

When tracking results are invalid, the tracking loops need to cruise, i.e. the frequency of carrier and code NCO does not change. If the blanking period is long, then this period may cause the signal to drift away, and pull-in may be necessary after the signal comes back.

Blanking Search Engines

In one embodiment, the input to the search engines is in 2-bit (sign, magnitude) format. This input can be converted to two's complimentary in the integrate-and-dump unit. When blank_en=1, then the converted signal is set to all zeros, thereby ensuring real 0's instead of +1's.

Utilizing data during blanking is most complicated for acquisition, because acquisition result is accumulated from many milliseconds of coherent and non-coherent integration. There are different approaches that trade off complexity with efficiency.

A first approach is to make no changes to software and use the integration results as usual. This approach works well if blanking only takes away a negligible portion of the signal energy and does not degrade the detection probability. However, if blanking occupies a significant portion of the integration period, then the integrated value will not likely pass the threshold. Moreover, if different integration values are blanked unevenly, then there is a bias between different integration results, which may lead to higher false alarm.

A second approach is to generate a single ACQ_valid bit during the entire integration period and discard the integration results if ACQ_valid=0. A discarded search can be retried later. This approach works well only for short integration duration and occasional interference, otherwise the cost of retrying is too high and the retry success rate is too low.

A third approach is to check validity with finer granularity (e.g. ⅛ of an epoch) and accumulate the valid bit to compute the percentage of blanked period in each integration result. The information can be passed to software to accept/reject the result accordingly.

Although illustrative embodiments of the invention have been described in detail herein with reference to the accompanying figures, it is to be understood that the invention is not limited to those precise embodiments.

For example, in one embodiment, the location accuracy differential between GPS and GLONASS is taken into account. That is, GLONASS has twice the error rate of GPS. Therefore, the signals from GLONASS and GPS can be weighted differently, i.e. the GPS signals can be given more weight than the GLONASS signals (a weighted-least-squares solution), thereby optimizing system performance.

The embodiments described herein are not intended to be exhaustive or to limit the invention to the precise forms disclosed. As such, many modifications and variations will be apparent. For example, in one embodiment, the above-described tracking engines can be implemented with dedicated tracking engines, search engines used for tracking purposes (e.g. eliminate tracking engines 105B in FIG. 1, use only search engines 105A), or a combination of dedicated tracking engines and search engines performing tracking. Accordingly, it is intended that the scope of the invention be defined by the following Claims and their equivalents.

The invention claimed is:

1. A receiver for receiving global positioning system (GPS) signals and global navigation satellite system (GLONASS) signals, the receiver comprising:
an analog front end (AFE);
a GPS digital front end (DFE) and a GLONASS DFE for receiving an output signal of the AFE;
a dual mode interface (DMI) for receiving outputs of the GPS and GLONASS DFEs; and
search engines for receiving outputs of the DMI,
wherein front-end components of the AFE are configured to process both the GPS signals and the GLONASS signals,
wherein the GPS DFE includes:
a low pass filter (LPF) for filtering and decimating the output signal of the AFE; and
a multiplexer for selecting one of the output signal of the AFE and an output signal of the LPF.

2. The receiver of claim 1, wherein the multiplexer selects the output signal of the LPF when the output signal of the AFE is 64 MHz, and wherein the LPF includes a 2:1 decimator that generates a 32 MHz signal.

3. The receiver of claim 1, wherein the GPS DFE includes a bandpass filter for filtering out interference from an output signal of the multiplexer, the bandpass filter including programmable coefficients to allow a tradeoff between interference rejection and signal loss.

4. The receiver of claim 1, wherein the GPS DFE includes at least one spur estimation cancellation (SEC) block for cancelling a known spur frequency from the output signal of the multiplexer.

5. The receiver of claim 4, wherein each SEC block includes a numerically-controlled oscillator (NCO) for generating a phase of a spur based on a sample, the sample being a spur frequency/analog-to-digital converter (ADC) frequency.

6. The receiver of claim 5, wherein each SEC block further includes a sin/cos table for generating a four quadrant phasor based on the phase provided by the NCO.

7. The receiver of claim 6, wherein each SEC block further includes a conjugate multiplier for multiplying a conjugate of the four quadrant phasor and the output signal of the AFE.

8. The receiver of claim 7, wherein each SEC block further includes a summation block for averaging results of the conjugate multiplier over a large block size.

9. The receiver of claim 8, wherein each SEC block further includes a complex-by-complex multiplier for multiplying a dumped value from the summation block and the four quadrant phasor.

10. The receiver of claim 9, wherein each SEC block further includes an adder for adding the output signal of the AFE and a real result of the complex-by-complex multiplier.

11. The receiver of claim 1, wherein the GPS DFE includes a first spur estimation cancellation (SEC) block and a second SEC block, wherein an output signal of the first SEC block is in s8.4 format and an output signal of the second SEC block is in s6.4 format.

12. The receiver of claim 1, wherein the GPS DFE includes a DC estimation and cancellation (DEC) block for performing an accumulator function, which is normalized by sample counts.

13. The receiver of claim 12, wherein an output signal of the DEC block includes fractional bits to reduce quantization error.

14. The receiver of claim 13, wherein the output signal of the DEC block is in s6.4 format.

15. The receiver of claim 1, wherein the GPS DFE includes a digital mixer for converting an intermediate frequency (IF) signal to a baseband signal.

16. The receiver of claim 15, wherein the digital mixer provides a residual frequency offset after converting that is greater than a maximum Doppler frequency.

17. The receiver of claim 15, wherein the digital mixer has a one path 8-bit in, two path (I/Q) out configuration.

18. The receiver of claim 15, wherein the GPS DFE includes an integrate and dump decimation (ID2) block that receives output signals of the digital mixer.

19. The receiver of claim 18, wherein the ID2 block includes a 2:1 decimator that generates a 16 MHz signal.

20. The receiver of claim 18, wherein the GPS DFE includes a quantizer block that converts output signals of the ID2 block into a sign bit and a magnitude bit.

21. The receiver of claim 20, wherein the quantizer block combines the sign and magnitude bits in a two-bit format compatible with legacy devices.

22. The receiver of claim 20, wherein the magnitude bit is compared with a threshold, which is based on parameters including a desired signal power relative to a maximum power at an output of the GPS DFE, and a desired signal power relative to a maximum power at an input of the quantizer block.

23. A receiver for receiving global positioning system (GPS) signals and global navigation satellite system (GLONASS) signals, the receiver comprising:
an analog front end (AFE);
a GPS digital front end (DFE) and a GLONASS DFE for receiving an output of the AFE;
a dual mode interface (DMI) for receiving outputs of the GPS and GLONASS DFEs; and
search engines for receiving outputs of the DMI,
wherein front-end components of the AFE are configured to process both the GPS signals and the GLONASS signals,
wherein the GLONASS DFE includes at least one spur estimation cancellation (SEC) block for cancelling a known spur frequency,
wherein each SEC block includes a numerically-controlled oscillator (NCO) for generating a phase of a spur based on a sample, the sample being a spur frequency/analog-to-digital converter (ADC) frequency.

24. The receiver of claim 23, wherein each SEC block further includes a sin/cos table for generating a four quadrant phasor based on the phase provided by the NCO.

25. The receiver of claim 24, wherein each SEC block further includes a conjugate multiplier for multiplying a conjugate of the four quadrant phasor and an output signal of the AFE.

26. The receiver of claim 25, wherein each SEC block further includes a summation block for averaging results of a mixer over a large block size.

27. The receiver of claim 26, wherein each SEC block further includes a complex-by-complex multiplier for multiplying a dumped value from the summation block and the four quadrant phasor.

28. The receiver of claim 27, wherein each SEC block further includes an adder for adding the output signal of the AFE and a real result of the complex-by-complex multiplier.

29. The receiver of claim 23, wherein the GLONASS DFE includes a digital mixer for converting an intermediate frequency (IF) signal based on the output of the AFE to a baseband signal.

30. The receiver of claim 29, wherein the digital mixer has a one path 8-bit in, two path (I/Q) out configuration.

31. The receiver of claim 30, wherein the GLONASS DFE includes at least one low pass filter (LPF) for filtering and decimating an output signal of the digital mixer.

32. The receiver of claim 31, wherein each LPF includes a 2:1 decimator.

33. The receiver of claim 32, wherein the GLONASS DFE includes a quantizer block that converts output signals of a last LPF into a sign bit and a magnitude bit.

34. The receiver of claim 33, wherein the quantizer block combines the sign and magnitude bits in a two-bit format compatible with legacy devices.

35. The receiver of claim 33, wherein the magnitude bit is compared with a threshold, which is based on parameters including a desired signal power relative to a maximum power at an output of the GLONASS DFE, and a desired signal power relative to a maximum power at an input of the quantizer block.

* * * * *